US009556500B2

(12) United States Patent
Boudreault et al.

(10) Patent No.: US 9,556,500 B2
(45) Date of Patent: Jan. 31, 2017

(54) PROCESSES FOR TREATING RED MUD

(71) Applicant: ORBITE ALUMINAE INC., Saint-Laurent (CA)

(72) Inventors: Richard Boudreault, Saint-Laurent (CA); Joel Fournier, Carignan (CA); Denis Primeau, Ste-Julie (CA); Marie-Maxime Labrecque-Gilbert, Laval (CA)

(73) Assignee: ORBITE TECHNOLOGIES INC., Saint-Laurent (CA)

( * ) Notice: Subject to any disclaimer, the term of this patent is extended or adjusted under 35 U.S.C. 154(b) by 0 days.

(21) Appl. No.: 14/687,909

(22) Filed: Apr. 15, 2015

(65) Prior Publication Data
US 2015/0275330 A1   Oct. 1, 2015

Related U.S. Application Data

(63) Continuation of application No. 14/371,374, filed as application No. PCT/CA2013/000021 on Jan. 10, 2013, now Pat. No. 9,023,301.

(60) Provisional application No. 61/584,993, filed on Jan. 10, 2012, provisional application No. 61/706,074, filed on Sep. 26, 2012, provisional application No. 61/713,719, filed on Oct. 15, 2012.

(51) Int. Cl.
| | |
|---|---|
| C22B 34/00 | (2006.01) |
| C22B 34/12 | (2006.01) |
| C01B 13/18 | (2006.01) |
| C01F 7/06 | (2006.01) |
| C01F 7/22 | (2006.01) |
| C01F 7/30 | (2006.01) |
| C01G 23/00 | (2006.01) |
| C01G 23/02 | (2006.01) |
| C01G 23/053 | (2006.01) |
| C01G 23/07 | (2006.01) |
| C01G 49/06 | (2006.01) |
| C01G 51/00 | (2006.01) |
| C01G 51/04 | (2006.01) |
| C01G 53/00 | (2006.01) |
| C01G 53/04 | (2006.01) |
| C01D 5/02 | (2006.01) |
| C22B 21/00 | (2006.01) |
| C22B 7/00 | (2006.01) |

(52) U.S. Cl.
CPC ........... *C22B 34/1245* (2013.01); *C01B 13/18* (2013.01); *C01D 5/02* (2013.01); *C01F 7/066* (2013.01); *C01F 7/22* (2013.01); *C01F 7/306* (2013.01); *C01G 23/001* (2013.01); *C01G 23/022* (2013.01); *C01G 23/0536* (2013.01); *C01G 23/07* (2013.01); *C01G 49/06* (2013.01); *C01G 51/003* (2013.01); *C01G 51/04* (2013.01); *C01G 53/003* (2013.01); *C01G 53/04* (2013.01); *C22B 7/007* (2013.01); *C22B 21/0023* (2013.01); *C22B 34/1259* (2013.01); *Y02P 20/129* (2015.11)

(58) Field of Classification Search
CPC ............ C01F 7/066; C01F 7/306; C01F 7/22; C01B 13/18; C01G 23/047; C01G 23/022; C01G 23/07; C01G 23/0536; C01G 23/04; C01G 23/043; C22B 34/1245; C22B 34/1259; C22B 21/0023; C22B 7/007
USPC .......................................... 423/609, 610, 82
See application file for complete search history.

(56) References Cited

U.S. PATENT DOCUMENTS

| | | | |
|---|---|---|---|
| 558,726 | A | 4/1896 | Gooch |
| 650,763 | A | 5/1900 | Raynaud |
| 1,494,029 | A | 5/1924 | Scofield et al. |
| 1,501,873 | A | 7/1924 | Tyrer |
| 1,519,880 | A | 12/1924 | Heinrich et al. |
| 1,701,510 | A | 2/1929 | Sieurin |
| 1,760,962 | A | 6/1930 | Phillips et al. |
| 1,778,083 | A | 10/1930 | Marburg |
| 1,868,499 | A | 7/1932 | Guertler |
| 1,906,467 | A | 5/1933 | Heath |
| 1,931,515 | A | 10/1933 | Fritz et al. |
| 1,956,139 | A | 4/1934 | Staufer et al. |
| 1,962,498 | A | 6/1934 | Frost |
| 1,999,773 | A | 4/1935 | McMichael |
| 2,024,026 | A | 12/1935 | Coleman et al. |
| 2,189,376 | A | 2/1940 | Burman |

(Continued)

FOREIGN PATENT DOCUMENTS

| | | |
|---|---|---|
| AU | 631226 | 2/1991 |
| AU | 4375001 | 12/2001 |

(Continued)

OTHER PUBLICATIONS

Becze et al., "Precipitation of Hematite and Recovery of Hydrochloric Acid from Concentrated Chloride Solutions by a Novel Hydrolytic Decomposition Process", TMS (The Minerals & Materials Society, 2001.

(Continued)

*Primary Examiner* — Steven Bos
(74) *Attorney, Agent, or Firm* — Bereskin & Parr LLP/S.E.N.C.R.L., s.r.l.

(57) ABSTRACT

There are provided processes for treating red mud. For example, the processes can comprise leaching red mud with HCl so as to obtain a leachate comprising ions of a first metal (for example aluminum) and a solid, and separating said solid from said leachate. Several other metals can be extracted from the leachate (Fe, Ni, Co, Mg, rare earth elements, rare metals, etc.). Various other components can be extracted from solid such as $TiO_2$, $SiO_2$ etc.

14 Claims, 13 Drawing Sheets

(56) References Cited

U.S. PATENT DOCUMENTS

| | | |
|---|---|---|
| 2,354,133 A | 7/1944 | Lyons |
| 2,376,696 A | 5/1945 | Hixson et al. |
| 2,398,493 A | 4/1946 | Butt et al. |
| 2,406,577 A | 8/1946 | Alessandroni |
| 2,413,709 A | 1/1947 | Hoffman |
| 2,471,844 A | 5/1949 | Strelzoff |
| 2,473,534 A | 6/1949 | Lloyd |
| 2,489,309 A | 11/1949 | Mills et al. |
| 2,642,337 A | 6/1953 | Newsome |
| 2,648,595 A | 8/1953 | Kennedy |
| 2,663,620 A | 12/1953 | Hinsdale, III |
| 2,707,149 A | 4/1955 | McKinley |
| 2,722,471 A | 11/1955 | Hirsch et al. |
| 2,761,760 A * | 9/1956 | Kamlet ............... C22B 34/1222 423/386 |
| 2,769,686 A | 11/1956 | Michener, Jr. et al. |
| 2,771,344 A | 11/1956 | Michel et al. |
| 2,780,525 A | 2/1957 | Wendell, Jr. et al. |
| 2,804,375 A * | 8/1957 | Kamlet ............... C22B 34/1213 423/142 |
| 2,806,766 A | 9/1957 | Anderson |
| 2,815,264 A | 12/1957 | Calkins et al. |
| 2,824,783 A | 2/1958 | Peppard et al. |
| 2,848,398 A | 8/1958 | Inagaki |
| 2,914,381 A | 11/1959 | Wainer |
| 2,914,464 A | 11/1959 | Burton et al. |
| 2,992,893 A | 7/1961 | Soudan et al. |
| 3,013,859 A | 12/1961 | Kuhlman, Jr. et al. |
| 3,104,950 A | 9/1963 | Ellis |
| 3,159,452 A | 12/1964 | Lerner |
| 3,192,128 A | 6/1965 | Brandmair et al. |
| 3,211,521 A | 10/1965 | George et al. |
| 3,473,919 A | 10/1969 | Metcalfe et al. |
| 3,479,136 A | 11/1969 | Michener, Jr. et al. |
| 3,540,860 A | 11/1970 | Cochran |
| 3,545,920 A | 12/1970 | George et al. |
| 3,586,477 A | 6/1971 | Flood |
| 3,620,671 A | 11/1971 | Maurel et al. |
| 3,642,441 A | 2/1972 | Van Weert |
| 3,649,185 A | 3/1972 | Sato et al. |
| 3,658,483 A | 4/1972 | Lienau et al. |
| 3,682,592 A | 8/1972 | Kovacs |
| 3,751,553 A | 8/1973 | Oslo et al. |
| 3,816,605 A | 6/1974 | Schwandorf |
| 3,852,430 A | 12/1974 | Lienau et al. |
| 3,862,293 A | 1/1975 | Maurel et al. |
| 3,903,239 A | 9/1975 | Berkovich |
| 3,922,164 A | 11/1975 | Reid et al. |
| 3,944,648 A | 3/1976 | Solymar et al. |
| 3,946,103 A | 3/1976 | Hund |
| 3,957,504 A | 5/1976 | Ho et al. |
| 3,966,909 A | 6/1976 | Grunig et al. |
| 3,983,212 A | 9/1976 | Lowenstein et al. |
| 4,042,664 A | 8/1977 | Cardwell et al. |
| 4,045,537 A | 8/1977 | Hrishikesan |
| 4,048,285 A | 9/1977 | Szepesi et al. |
| 4,069,296 A | 1/1978 | Huang |
| 4,083,923 A * | 4/1978 | Lippman ............... C01B 33/08 423/135 |
| 4,085,190 A | 4/1978 | Shiah |
| 4,098,868 A | 7/1978 | Tolley |
| 4,107,281 A | 8/1978 | Reh et al. |
| 4,110,399 A | 8/1978 | Gaudernack et al. |
| 4,124,680 A | 11/1978 | Cohen et al. |
| 4,130,627 A | 12/1978 | Russ et al. |
| 4,133,677 A | 1/1979 | Matsui et al. |
| 4,158,042 A | 6/1979 | Deutschman |
| 4,172,879 A | 10/1979 | Miller et al. |
| 4,177,242 A | 12/1979 | Cohen et al. |
| 4,193,968 A | 3/1980 | Sullivan et al. |
| 4,198,231 A | 4/1980 | Gusset |
| 4,222,989 A | 9/1980 | Belsky et al. |
| 4,224,287 A | 9/1980 | Ziegenbalg et al. |
| 4,226,844 A | 10/1980 | Reh et al. |
| 4,233,273 A | 11/1980 | Meyer et al. |
| 4,237,102 A | 12/1980 | Cohen et al. |
| 4,239,735 A | 12/1980 | Eisele et al. |
| 4,241,030 A | 12/1980 | Cohen et al. |
| 4,259,311 A | 3/1981 | Shah |
| 4,297,326 A | 10/1981 | Gjelsvik et al. |
| 4,318,896 A | 3/1982 | Schoonover |
| 4,362,703 A | 12/1982 | Boybay et al. |
| 4,370,422 A | 1/1983 | Panda et al. |
| 4,378,275 A | 3/1983 | Adamson et al. |
| 4,392,987 A | 7/1983 | Laine et al. |
| 4,402,932 A | 9/1983 | Miller et al. |
| 4,414,196 A | 11/1983 | Matsumoto et al. |
| 4,435,365 A | 3/1984 | Morris |
| 4,437,994 A | 3/1984 | Baker |
| 4,465,566 A | 8/1984 | Loutfy et al. |
| 4,465,659 A | 8/1984 | Cambridge et al. |
| 4,486,393 A | 12/1984 | Baksa et al. |
| 4,490,338 A | 12/1984 | De Schepper et al. |
| 4,530,819 A | 7/1985 | Czeglédi et al. |
| 4,560,541 A | 12/1985 | Davis |
| 4,567,026 A | 1/1986 | Liosowyj |
| 4,585,645 A | 4/1986 | Sucech |
| 4,634,581 A | 1/1987 | Cambridge et al. |
| 4,650,541 A | 3/1987 | Ciszek |
| 4,652,433 A | 3/1987 | Ashworth et al. |
| 4,666,694 A | 5/1987 | Jons et al. |
| 4,676,838 A | 6/1987 | Franz et al. |
| 4,678,482 A | 7/1987 | Müller et al. |
| 4,710,369 A | 12/1987 | Bergman |
| 4,741,831 A | 5/1988 | Grinstead |
| 4,797,271 A | 1/1989 | Fleming et al. |
| 4,798,717 A | 1/1989 | Morency |
| 4,816,233 A | 3/1989 | Rourke et al. |
| 4,820,498 A | 4/1989 | Newkirk |
| 4,826,671 A | 5/1989 | Arndt et al. |
| 4,830,507 A | 5/1989 | Bagatto et al. |
| 4,898,719 A | 2/1990 | Rourke et al. |
| 4,913,884 A | 4/1990 | Feuling |
| 4,938,871 A | 7/1990 | Musikas et al. |
| 4,965,053 A | 10/1990 | Herchenroeder et al. |
| 4,968,504 A | 11/1990 | Rourke et al. |
| 4,980,141 A | 12/1990 | Kimura et al. |
| 4,988,487 A | 1/1991 | Lai et al. |
| 4,995,984 A | 2/1991 | Barkatt et al. |
| 5,006,753 A | 4/1991 | Hasker et al. |
| 5,008,089 A | 4/1991 | Moody et al. |
| 5,011,665 A | 4/1991 | Cailly et al. |
| 5,015,447 A | 5/1991 | Fulford et al. |
| 5,019,362 A | 5/1991 | Rourke et al. |
| 5,030,424 A * | 7/1991 | Fulford ................... C01F 7/066 423/111 |
| 5,035,365 A | 7/1991 | Birmingham |
| 5,037,608 A | 8/1991 | Tarcy et al. |
| 5,039,336 A | 8/1991 | Feuling |
| 5,043,077 A | 8/1991 | Chandler et al. |
| 5,045,209 A | 9/1991 | Snyder et al. |
| 5,053,144 A | 10/1991 | Szirmai et al. |
| 5,061,474 A | 10/1991 | Pauli et al. |
| 5,071,472 A | 12/1991 | Traut et al. |
| 5,080,803 A | 1/1992 | Bagatto et al. |
| 5,091,159 A | 2/1992 | Connelly et al. |
| 5,091,161 A | 2/1992 | Harris et al. |
| 5,093,091 A | 3/1992 | Dauplaise et al. |
| 5,104,544 A | 4/1992 | Shimizu et al. |
| 5,106,797 A | 4/1992 | Allaire |
| 5,112,534 A | 5/1992 | Guon et al. |
| 5,120,513 A | 6/1992 | Moody et al. |
| 5,124,008 A | 6/1992 | Rendall et al. |
| 5,149,412 A | 9/1992 | Allaire |
| 5,160,482 A | 11/1992 | Ash et al. |
| 5,180,563 A | 1/1993 | Lai et al. |
| 5,188,809 A | 2/1993 | Crocker et al. |
| 5,192,443 A | 3/1993 | Delloye et al. |
| 5,244,649 A | 9/1993 | Ostertag et al. |
| 5,274,129 A | 12/1993 | Natale et al. |
| 5,368,736 A | 11/1994 | Horwitz et al. |
| 5,409,677 A | 4/1995 | Zinn |
| 5,409,678 A | 4/1995 | Smith et al. |
| 5,433,931 A | 7/1995 | Bosserman |

(56) References Cited

U.S. PATENT DOCUMENTS

| | | |
|---|---|---|
| 5,443,618 A | 8/1995 | Chapman |
| 5,492,680 A | 2/1996 | Odekirk |
| 5,500,043 A | 3/1996 | Harada et al. |
| 5,505,857 A | 4/1996 | Misra et al. |
| 5,512,256 A | 4/1996 | Bray et al. |
| 5,531,970 A | 7/1996 | Carlson |
| 5,571,308 A | 11/1996 | Duyvesteyn et al. |
| 5,585,080 A | 12/1996 | Andersen et al. |
| 5,597,529 A | 1/1997 | Tack |
| 5,622,679 A | 4/1997 | Yuan et al. |
| 5,632,963 A | 5/1997 | Schwab et al. |
| 5,639,433 A | 6/1997 | Yuan et al. |
| 5,645,652 A | 7/1997 | Okinaka et al. |
| 5,665,244 A | 9/1997 | Rothenberg et al. |
| 5,720,882 A | 2/1998 | Stendahl et al. |
| 5,723,097 A | 3/1998 | Barnett et al. |
| 5,766,478 A | 6/1998 | Smith et al. |
| 5,787,332 A | 7/1998 | Black et al. |
| 5,792,330 A | 8/1998 | Petersen et al. |
| 5,795,482 A | 8/1998 | Ehle et al. |
| 5,876,584 A | 3/1999 | Cortellini |
| 5,885,545 A | 3/1999 | Pitzer |
| 5,904,856 A | 5/1999 | Kvant et al. |
| 5,911,967 A | 6/1999 | Ruthner |
| 5,922,403 A | 7/1999 | Tecle |
| 5,942,199 A | 8/1999 | Jokinen et al. |
| 5,955,042 A | 9/1999 | Barnett et al. |
| 5,962,125 A | 10/1999 | Masaki |
| 5,993,758 A | 11/1999 | Nehari et al. |
| 5,997,828 A | 12/1999 | Rendall |
| 6,033,579 A | 3/2000 | Riemer et al. |
| 6,045,631 A | 4/2000 | Tarcy et al. |
| 6,077,486 A | 6/2000 | Spitzer |
| 6,093,376 A | 7/2000 | Moore |
| 6,153,157 A | 11/2000 | McLaughlin |
| 6,214,306 B1 | 4/2001 | Aubert et al. |
| 6,221,233 B1 | 4/2001 | Rendall |
| 6,238,566 B1 | 5/2001 | Yoshida et al. |
| 6,248,302 B1 * | 6/2001 | Barnett ............... C01G 23/00 423/132 |
| 6,254,782 B1 | 7/2001 | Kreisler |
| 6,267,936 B1 | 7/2001 | Delmas et al. |
| 6,302,952 B1 | 10/2001 | Mobbs et al. |
| 6,309,441 B1 | 10/2001 | Benz et al. |
| 6,312,653 B1 | 11/2001 | Delmau et al. |
| 6,337,061 B1 | 1/2002 | Iyatomi et al. |
| 6,348,154 B1 | 2/2002 | Stewart |
| 6,365,121 B1 | 4/2002 | Wurmbauer |
| 6,377,049 B1 | 4/2002 | Benz et al. |
| 6,383,255 B1 | 5/2002 | Sundkvist |
| 6,395,062 B2 | 5/2002 | Olafson et al. |
| 6,395,242 B1 | 5/2002 | Allen et al. |
| 6,406,676 B1 | 6/2002 | Sundkvist |
| 6,447,738 B1 | 9/2002 | Rendall et al. |
| 6,468,483 B2 * | 10/2002 | Barnett ............... C01F 7/26 423/132 |
| 6,500,396 B1 | 12/2002 | Lakshmanan et al. |
| 6,524,549 B1 | 2/2003 | Mohri et al. |
| 6,565,733 B1 | 5/2003 | Sportel et al. |
| 6,576,204 B2 | 6/2003 | Johansen |
| 6,716,353 B1 | 4/2004 | Mirzadeh et al. |
| 6,843,970 B1 | 1/2005 | Hard |
| 6,893,474 B2 | 5/2005 | Jäfverström et al. |
| 7,090,809 B2 | 8/2006 | Harel et al. |
| 7,118,719 B2 | 10/2006 | Fugleberg |
| 7,182,931 B2 | 2/2007 | Turnbaugh, Jr. et al. |
| 7,220,394 B2 | 5/2007 | Sreeram et al. |
| 7,282,187 B1 | 10/2007 | Brown et al. |
| 7,294,319 B2 | 11/2007 | Lahtinen et al. |
| 7,381,690 B1 | 6/2008 | Ding et al. |
| 7,442,361 B1 | 10/2008 | Gloeckler et al. |
| 7,498,005 B2 | 3/2009 | Yadav |
| 7,651,676 B2 | 1/2010 | Beaulieu et al. |
| 7,781,365 B2 | 8/2010 | Okamoto |
| 7,837,961 B2 | 11/2010 | Boudreault et al. |
| 7,892,426 B2 | 2/2011 | Hayashi et al. |
| 7,906,097 B2 | 3/2011 | Beaulieu et al. |
| 7,972,412 B2 | 7/2011 | Bergeron et al. |
| 8,038,969 B2 | 10/2011 | Kondo et al. |
| 8,147,795 B2 | 4/2012 | Dolling et al. |
| 8,216,532 B1 | 7/2012 | Vierheilig |
| 8,241,594 B2 | 8/2012 | Boudreault et al. |
| 8,287,826 B2 | 10/2012 | Pettey |
| 8,337,789 B2 | 12/2012 | Boudreault et al. |
| 8,568,671 B2 | 10/2013 | Guo et al. |
| 8,597,600 B2 | 12/2013 | Boudreault et al. |
| 9,023,301 B2 | 5/2015 | Boudreault et al. |
| 9,150,428 B2 | 10/2015 | Boudreault et al. |
| 9,181,603 B2 | 11/2015 | Boudreault et al. |
| 2001/0051121 A1 * | 12/2001 | Barnett ............... C01F 7/26 423/127 |
| 2002/0014416 A1 | 2/2002 | Van Weert |
| 2002/0050230 A1 | 5/2002 | Meisen |
| 2002/0071802 A1 | 6/2002 | Fulton et al. |
| 2003/0075021 A1 | 4/2003 | Young et al. |
| 2003/0152502 A1 | 8/2003 | Lewis et al. |
| 2003/0183043 A1 | 10/2003 | Wai et al. |
| 2004/0042945 A1 | 3/2004 | Rao et al. |
| 2004/0062695 A1 | 4/2004 | Horwitz et al. |
| 2005/0166706 A1 | 8/2005 | Withers et al. |
| 2006/0018813 A1 | 1/2006 | Bray |
| 2006/0066998 A1 | 3/2006 | Ishiguro |
| 2007/0062669 A1 | 3/2007 | Song et al. |
| 2007/0278106 A1 | 12/2007 | Shaw |
| 2008/0047395 A1 | 2/2008 | Liu et al. |
| 2008/0069748 A1 | 3/2008 | Lien et al. |
| 2008/0115627 A1 | 5/2008 | Wang et al. |
| 2008/0286182 A1 | 11/2008 | Costa et al. |
| 2009/0241731 A1 | 10/2009 | Pereira et al. |
| 2009/0272230 A1 | 11/2009 | Mackowski et al. |
| 2010/0018347 A1 | 1/2010 | Holden et al. |
| 2010/0078382 A1 | 4/2010 | Naganawa et al. |
| 2010/0129277 A1 | 5/2010 | Kondo et al. |
| 2010/0150799 A1 | 6/2010 | Boudreault et al. |
| 2010/0160144 A1 | 6/2010 | Kim et al. |
| 2010/0260640 A1 | 10/2010 | Shindo et al. |
| 2010/0278720 A1 | 11/2010 | Wong et al. |
| 2010/0319491 A1 | 12/2010 | Sugahara et al. |
| 2010/0329435 A1 | 12/2010 | Lian et al. |
| 2011/0017020 A1 | 1/2011 | Homma et al. |
| 2011/0044869 A1 | 2/2011 | Boudreault et al. |
| 2011/0120267 A1 | 5/2011 | Roche |
| 2011/0182786 A1 | 7/2011 | Burba, III |
| 2012/0073407 A1 | 3/2012 | Drinkard, Jr. et al. |
| 2012/0237418 A1 | 9/2012 | Boudreault et al. |
| 2013/0052103 A1 | 2/2013 | Boudreault et al. |
| 2013/0233130 A1 | 9/2013 | Boudreault et al. |
| 2014/0065038 A1 | 3/2014 | Boudreault et al. |
| 2014/0286841 A1 | 9/2014 | Boudreault et al. |
| 2014/0301920 A1 | 10/2014 | Boudreault et al. |
| 2014/0341790 A1 | 11/2014 | Kasaini |
| 2014/0348732 A1 | 11/2014 | Ozaki et al. |
| 2014/0356262 A1 | 12/2014 | Ruth et al. |
| 2014/0369904 A1 | 12/2014 | Boudreault et al. |
| 2014/0369907 A1 | 12/2014 | Boudreault et al. |
| 2014/0373683 A1 | 12/2014 | Boudreault et al. |
| 2015/0104361 A1 | 4/2015 | Boudreault et al. |
| 2015/0159239 A1 | 6/2015 | Boudreault et al. |
| 2015/0218720 A1 | 8/2015 | Picard et al. |
| 2015/0225808 A1 | 8/2015 | Boudreault et al. |
| 2015/0307965 A1 | 10/2015 | Boudreault et al. |
| 2016/0052796 A1 | 2/2016 | Boudreault et al. |

FOREIGN PATENT DOCUMENTS

| | | |
|---|---|---|
| CA | 1066872 | 11/1979 |
| CA | 1088961 | 11/1980 |
| CA | 1136480 | 11/1982 |
| CA | 1176470 | 10/1984 |
| CA | 1224327 | 7/1987 |
| CA | 1226719 | 9/1987 |
| CA | 2027519 | 4/1991 |
| CA | 2027973 | 4/1991 |
| CA | 2029623 | 5/1991 |

(56) References Cited

FOREIGN PATENT DOCUMENTS

| | | |
|---|---|---|
| CA | 2036058 | 8/1991 |
| CA | 2097809 | 7/1992 |
| CA | 2137249 | 12/1993 |
| CA | 2122364 | 2/1994 |
| CA | 2156295 | 9/1994 |
| CA | 2160488 | 11/1994 |
| CA | 2193726 | 1/1996 |
| CA | 2159534 | 4/1996 |
| CA | 2167890 | 7/1996 |
| CA | 2240067 | 6/1997 |
| CA | 2251433 | 4/1999 |
| CA | 2360447 | 8/2000 |
| CA | 2306015 | 12/2000 |
| CA | 2309225 | 12/2000 |
| CA | 2377600 | 1/2001 |
| CA | 2317692 | 3/2001 |
| CA | 2391394 | 5/2001 |
| CA | 2400673 | 8/2001 |
| CA | 2429889 | 6/2002 |
| CA | 2431466 | 6/2002 |
| CA | 2433448 | 7/2002 |
| CA | 2189631 | 11/2002 |
| CA | 2454812 | 2/2003 |
| CA | 2468885 | 7/2003 |
| CA | 2471179 | 7/2003 |
| CA | 2378721 | 9/2003 |
| CA | 2484134 | 11/2003 |
| CA | 2514830 | 8/2004 |
| CA | 2467288 | 11/2004 |
| CA | 2548225 | 11/2004 |
| CA | 2531913 | 1/2005 |
| CA | 2385775 | 5/2005 |
| CA | 2556613 | 8/2005 |
| CA | 2572190 | 1/2006 |
| CA | 2597440 | 8/2006 |
| CA | 2521817 | 3/2007 |
| CA | 2624612 | 4/2007 |
| CA | 2629167 | 5/2007 |
| CA | 2639796 | 6/2007 |
| CA | 2636379 | 7/2007 |
| CA | 2641919 | 8/2007 |
| CA | 2538962 | 9/2007 |
| CA | 2608973 | 1/2008 |
| CA | 2610918 | 2/2008 |
| CA | 2659449 | 2/2008 |
| CA | 2684696 | 11/2008 |
| CA | 2685369 | 11/2008 |
| CA | 2711013 | 11/2008 |
| CA | 2697789 | 3/2009 |
| CA | 2725391 | 11/2009 |
| CA | 2678724 | 3/2010 |
| CA | 2745572 | 7/2010 |
| CA | 2747370 | 7/2010 |
| CA | 2667029 | 11/2010 |
| CA | 2667033 | 11/2010 |
| CA | 2678276 | 3/2011 |
| CA | 2773571 | 3/2011 |
| CA | 2788965 | 8/2011 |
| CA | 2797561 | 11/2011 |
| CA | 2834356 | 12/2012 |
| CA | 2884787 | 4/2013 |
| CA | 2860491 | 8/2013 |
| CN | 1099424 | 3/1995 |
| CN | 1923730 | 3/2007 |
| CN | 101773925 | 7/2010 |
| CN | 101792185 | 8/2010 |
| CN | 102849765 | 1/2013 |
| CN | 102849767 | 1/2013 |
| CN | 103420405 | 12/2013 |
| DE | 19903011 | 8/2000 |
| EP | 157503 | 10/1985 |
| EP | 0054976 | 7/1986 |
| EP | 0238185 | 9/1987 |
| EP | 0279672 | 8/1988 |
| EP | 0327234 | 8/1989 |
| EP | 0382383 | 8/1990 |
| EP | 0399786 | 11/1990 |
| EP | 508676 | 10/1992 |
| EP | 466338 | 12/1995 |
| EP | 0449942 | 4/1996 |
| EP | 0775753 | 5/1997 |
| EP | 0829454 | 3/1998 |
| EP | 0692035 | 4/1998 |
| EP | 0834584 | 4/1998 |
| EP | 999185 | 5/2000 |
| EP | 1496063 | 1/2005 |
| EP | 2241649 | 10/2010 |
| EP | 2298944 | 3/2011 |
| FR | 2319579 | 2/1977 |
| FR | 2600635 | 12/1987 |
| GB | 120035 | 3/1919 |
| GB | 153500 | 11/1920 |
| GB | 159086 | 2/1921 |
| GB | 195295 | 3/1923 |
| GB | 230916 | 3/1925 |
| GB | 240834 | 5/1926 |
| GB | 241184 | 5/1926 |
| GB | 273999 | 7/1927 |
| GB | 409710 | 5/1934 |
| GB | 470305 | 8/1937 |
| GB | 480921 | 3/1938 |
| GB | 484136 | 5/1938 |
| GB | 490099 | 8/1938 |
| GB | 574818 | 1/1946 |
| GB | 745601 | 2/1956 |
| GB | 798750 | 7/1958 |
| GB | 857245 | 12/1960 |
| GB | 858026 | 1/1961 |
| GB | 1021326 | 3/1966 |
| GB | 1056488 | 1/1967 |
| GB | 1307319 | 2/1973 |
| GB | 2013164 | 8/1979 |
| GB | 1552918 | 9/1979 |
| GB | 2018230 | 10/1979 |
| GB | 2238813 | 6/1991 |
| JP | 05287405 | 11/1993 |
| JP | 6056429 | 3/1994 |
| OA | 010034 | 10/1996 |
| WO | 8603521 | 6/1986 |
| WO | 9103424 | 3/1991 |
| WO | 9213637 | 8/1992 |
| WO | 9313017 | 7/1993 |
| WO | 9418122 | 8/1994 |
| WO | 9600698 | 1/1996 |
| WO | 9621619 | 7/1996 |
| WO | 9624555 | 8/1996 |
| WO | 9722554 | 6/1997 |
| WO | 0017408 | 3/2000 |
| WO | 0104366 | 1/2001 |
| WO | 2004056468 | 7/2004 |
| WO | 2004056471 | 7/2004 |
| WO | 2004101833 | 11/2004 |
| WO | 2005123591 | 12/2005 |
| WO | 2006084682 | 8/2006 |
| WO | 2007074207 | 7/2007 |
| WO | 2007079532 | 7/2007 |
| WO | 2008067594 | 6/2008 |
| WO | 2008104250 | 9/2008 |
| WO | 2008141423 | 11/2008 |
| WO | 2008154995 | 12/2008 |
| WO | 2009085514 | 7/2009 |
| WO | 2009153321 | 12/2009 |
| WO | 2010002059 | 1/2010 |
| WO | 2010009512 | 1/2010 |
| WO | 2010056742 | 5/2010 |
| WO | 2010079369 | 7/2010 |
| WO | 2010133284 | 11/2010 |
| WO | 2011025440 | 3/2011 |
| WO | 2011094858 | 8/2011 |
| WO | 2011100820 | 8/2011 |
| WO | 2011100821 | 8/2011 |
| WO | 2011147867 | 12/2011 |
| WO | 2012126092 | 9/2012 |
| WO | 2012145797 | 11/2012 |

(56) References Cited

FOREIGN PATENT DOCUMENTS

| WO | 2012149642 | 11/2012 |
|---|---|---|
| WO | 2013037054 | 3/2013 |
| WO | 2013142957 | 10/2013 |
| WO | 2014029031 | 2/2014 |
| WO | 2014047728 | 4/2014 |
| WO | 2014075173 | 5/2014 |
| WO | 2014094155 | 6/2014 |
| WO | 2014094157 | 6/2014 |
| WO | 2014124539 | 8/2014 |
| WO | 2015179973 | 12/2015 |

OTHER PUBLICATIONS

Demopoulos et al., "New Technologies for HCl Regeneration in Chloride Hydrometallurgy", World of Metallurgy—ERZMETALL 61 (2008) No. 2.
English Abstract of CN103964480(A), "Process for Producing Aluminum Oxide by Using Hydrochloric Acid Method", published on Aug. 6, 2014.
English Abstract of CN203922759(U), "Device for Preparing Aluminum Oxide by Roasting Aluminum Chloride Hexahydrate Crystal through Rotary Kiln", published on Nov. 5, 2011.
English Abstract of EP0850881(A1), "Process and Apparatus for the Preparation of Iron Oxides from Solutions Containing Hydrochloric Acid Iron Oxide Chloride", published on Jul. 1, 1998.
English Abstract of JPH0543252A, "Method for Removing Halogen Radical in Ferric Oxide", published on Feb. 23, 1993.
English Abstract of JPH0656429(A), "Production of Plate-Like Iron Oxide Particulate Powder", published on Mar. 1, 1994.
English Abstract of WO2008070885(A2), "Method for Increasing the Specific Surface of Iron Oxides in Spray Roasting Plants", published on Jun. 19, 2008.
Partial Translation of Abtract and Claims of CN1099424A, "Method for Treating Blast Furnace Slag with Diluted Chlorhydric Acid", published on Mar. 1, 1995.
Weissenbaeck et al., "Development of Chloride Based Metal Extraction Techniques", Paper presented at ALTA 2013, Perth, WA.
English Abstract of JPH04354836(A), "Method for leaching silicomagnesionickel ore", published on Dec. 9, 1992.
English Abstract of WO 2007122720, published on Nov. 1, 2007.
English Abstract of WO 2004085719, published on Oct. 7, 2004.
English Abstract of SU 1 734 395, published on Oct. 27, 1996.
English Abstract of RU2416655, published on Apr. 20, 2011.
English Abstract of RU2008113385, published on Oct. 20, 2009.
English Abstract of RU2361941, published on Jul. 20, 2009.
English Abstract of RU2257348, published on Jul. 27, 2005.
English Abstract of RU2247788, published on Mar. 10, 2005.
English Abstract of RU2236375, published on Sep. 20, 2004.
English Abstract of RU2205242, published on May 27, 2003.
English Abstract of RU2201988, published on Apr. 10, 2003.
English Abstract of RU2196184, published on Jan. 10, 2003.
English Abstract of RU2189358, published on Sep. 20, 2002.
English Abstract of RU2176680, published on Dec. 10, 2001.
English Abstract of RU2162898, published on Feb. 10, 2001.
English Abstract of RU2162112, published on Jan. 20, 2001.
English Abstract of RU2158170, published on Oct. 27, 2000.
English Abstract of RU2147623, published on Apr. 20, 2000.
English Abstract of RU2147622, published on Apr. 20, 2000.
English Abstract of RU2140998, published on Nov. 10, 1999.
English Abstract of RU2119816, published on Oct. 10, 1998.
English Abstract of KR20070028987, published on Mar. 13, 2007.
English Abstract of JP9324227, published on Dec. 16, 1997.
English Abstract of JP9324192, published on Dec. 16, 1997.
English Abstract of JP9291320, published on Nov. 11, 1997.
English Abstract of JP9249672, published on Sep. 22, 1997.
English Abstract of JP9248463, published on Sep. 22, 1997.
English Abstract of JP9208222, published on Aug. 12, 1997.
English Abstract of JP9194211, published on Jul. 29, 1997.
English Abstract of JP9176756, published on Jul. 8, 1997.
English Abstract of JP9143589, published on Jun. 3, 1997.
English Abstract of JP8232026, published on Sep. 10, 1996.
English Abstract of JP5051208, published on Mar. 2, 1993.
English Abstract of JP4198017, published on Jul. 17, 1992.
English Abstract of JP4183832, published on Jun. 30, 1992.
English Abstract of JP4046660, published on Feb. 17, 1992.
English Abstract of JP3173725, published on Jul. 29, 1991.
English Abstract of JP2179835, published on Jul. 12, 1990.
English Abstract of JP2080530, published on Mar. 20, 1990.
English Abstract of JP2011116622, published on Jun. 16, 2011.
English Abstract of JP2011046588, published on Mar. 10, 2011.
English Abstract of JP2010270359, published on Dec. 2, 2010.
English Abstract of JP2008194684, published on Aug. 28, 2008.
English Abstract of JP2007327126, published on Dec. 20, 2007.
English Abstract of JP2007254822, published on Oct. 4, 2007.
English Abstract of JP2006348359, published on Dec. 28, 2006.
English Abstract of JP2006028187, published on Feb. 2, 2006.
English Abstract of JP2005139047, published on Jun. 2, 2005.
English Abstract of JP2000313928, published on Nov. 14, 2000.
English Abstract of JP10158629, published on Jun. 16, 1998.
English Abstract of AU2008286599A1, "A process of smelting monazite rare earth ore rich in Fe", published on Feb. 19, 2009.
English Abstract of KR820001546, "Production of Titanium Metal Valves", published on Aug. 31, 1982.
English Abstract of KR100927466, published on Nov. 19, 2009.
English Abstract of RU 2 069 180, published on Nov. 20, 1996.
English Abstract of RU 2 068 392, published on Oct. 27, 1996.
English Abstract of RU 2 062 810, published on Jun. 27, 1996.
English Abstract of RU 2 055 828, published on Mar. 10, 1996.
English Abstract of RU 2 049 728, published on Dec. 10, 1995.
English Abstract of RU 1 704 483, published on Oct. 27, 1996.
English Abstract of SU1567518, published on May 30, 1990.
English Abstract of SU1424174, published on Jul. 23, 1991.
English Abstract of RU2038309, published on Jun. 27, 1995.
English Abstract of HU51574, published on May 28, 1990.
English Abstract of JP2008253142, published on Oct. 23, 2008.
English Abstract of JP2005152756, published on Jun. 16, 2005.
English Abstract of JP2005082462, published on Mar. 31, 2005.
English Abstract of JP2005219938, published on Aug. 18, 2005.
English Abstract of JP2004036003, published on Feb. 5, 2004.
English Abstract of WO2011092292, published on Aug. 4, 2011.
English Abstract of CN101157453, published on Apr. 9, 2008.
English Abstract of AU2737892, published on May 13, 1993.
English Abstract of JPH09249420, published on Sep. 22, 1997.
English Abstract of CN102515590, published on Jun. 27, 2012.
English Abstract of CN102502745, published on Jun. 20, 2012.
English Abstract of WO2007082447, published on Jul. 26, 2007.
English Abstract of CN102694218, published on Sep. 26, 2012.
English Abstract of RU2183225, published on Jun. 10, 2012.
English Abstract of JP2009249674, published on Oct. 29, 2009.
English Abstract of CN102719674, published on Oct. 10, 2012.
English Abstract of 102680423, published on Sep. 19, 2012.
English Abstract of JP2005112636, published on Apr. 28, 2005.
English Abstract of CN101285127, published on Oct. 15, 2008.
Australie Minerals & Mining Group Ltd, "AMMG Updates Process Design for HPA Chemical Project", Oct. 3, 2014, pp. 1-4.
Adham et al., "Fluid Bed Dehydration of Magnesium Chloride", Magnesium Technology 2012, TMS (The Minerals, Metals & Materials Society), 2012, pp. 49-53.
Dutrizac et al., "Fundamentals of Serpentine Leaching in Hydrochloric Acid Media", Magnesium Technology 2000, The Minerals, Metals & Materials Society, 2000, pp. 41-51.
English Abstract of CN1044126(C), "Stretched polypropylene film", published on Jul. 14, 1999.
Kumar et al., "Refining of a low-grade molybdenite concentrate", Hydrometallurgy 86 (2007) 56-62.
Wang et al., "Metallurgical processes for scandium recovery from various resources: A review", Hydrometallurgy 108 (2011) 100-108.
Fang et al., "Recovery of gallium from coal fly ash", Hydrometallurgy 41 (1996) 187-200.

(56) References Cited

OTHER PUBLICATIONS

Gutiérrez et al., "Recovery of gallium from coal fly ash by a dual reactive extraction process", Waste Management & Research (1997) 16, 371-382.
English Abstact of RU2237111 (C1), "Method of Recovering Magnesium From Silicon-Containing Wastes", published on Sep. 27, 2004.
Hudson et al., "Direct Calcination of AICI3 •6H2O with Off-Gas use for Crystallization", United States Department of the Interior Bureau of Mines, Contract No. J0188096, 1979, pp. 1-28.
Elsner et al., "Alumina via hydrochloric acid leaching of high silica bauxites—Process Development", 1984, pp. 411-429.
Maysilles et al., "Aluminum Chloride Hexahydrate Crystallization by HCI Gas Sparging", U.S. Dept. of the Interior, Bureau of Mines, 1982, pp. 1-38.
English Translation of CN102452677, published on May 16, 2012.
Brand et al., "Formation of α-Al2O3 by thermal decomposition of basic aluminum chlorides at low temperatures", Crystal Research and Technology 1989 (24) 671-675.
Park et al., "Manufacture of low-soda alumina from clay", Industrial and Engineering Chemistry 1996 (35) 4379-4385.
Yanagida et al., "The role of water vapor in formation of alpha alumina from transient alumina" Journal of Ceramic Association Japan 1966 (74) 371-77.
Pijolat et al., "Influence of additives and water vapor on the transformation of transition aluminas into alpha alumina", Thermochimica Acta 1987 (122) 71-77.
Bagwell et al., "Effect of seeding and water vapor on the nucleation and growth of α-Al2O3 from γ-Al2O3", Journal of the American Ceramic Society 1999 (82) 825-832.
Hrabe et al., "The influence of water vapor on thermal transformations of boehmite", Journal of Material Research 1992 (7) 444-449.
English Abstract of Petzold et al., "Thermoanalytical studies on the decomposition of aluminum chloride hexahydrate", Journal of thermal analysis 1981 (20) 71-86.
Hoffman et al., "Development of a hydrochloric acid process for the production of alumina from clay", Journal of research of the national bureau of standards 1946 (37) 409-428.
Marchessaux et al., "Thermal decomposition of aluminum hexahydrate chloride (AlCl3 x 6H2 O) for alumina production", Light metals 1979 (1) 189-204.
Miller et al., "Fluidized-bed decomposition of aluminum chloride hexahydrate", Light Metals: Proceedings of Sessions, AIME Annual Meeting (Warrendale, Pennsylvania), 1983 253-271.
English Abstract of CN101781719, "Method for recovering rare earth from oil shale waste slag", published on Jul. 21, 2010.
Shanks et al., "Options in the HC1 process for the production of alumina from clay", Light Metals 1986, R.E. Miller, Editor, p. 1089.
Bengston et al., "Alumina process feasibility study and preliminary pilot plant design. Task 3 report: preliminary design of 25 ton per day pilot plant.", vol. 1, Process Technology and Costs. Bureau of Mines Open File Report PB81-125031, 1979.
Liu et al., "High Purity Alumina Powders Extracted from Aluminum Dross by the Calcining-Leaching Process", TMS (The Minerals, Metals & Materials Society), 2011, pp. 197-200.
English Abstract of RU2158787, "Process of Winning of Magnesium", published on Nov. 10, 2000.
English Abstract of JP10121164, published on May 12, 1998.
English Abstract of EP1817437, published on Aug. 15, 2007.
English Abstract of CN2292806, published on Sep. 30, 1998.
English Abstract of CN1986895, published on Jun. 27, 2007.
English Abstract of CN1796608, published on Jul. 5, 2006.
English Abstract of CN1699609, published on Nov. 23, 2005.
English Abstract of CN1410599, published on Apr. 16, 2003.
English Abstract of CN1397653, published on Feb. 19, 2003.
English Abstract of CN1192479, published on Sep. 9, 1998.
English Abstract of CN1478600, published on Mar. 3, 2004.
English Abstract of CN1140148, published on Jan. 15, 1997.
English Abstract of CN1127791, published on Jul. 31, 1996.
English Abstract of CN1131200, published on Sep. 18, 1996.
English Abstract of CN1061246, published on May 20, 1992.
English Abstract of CN1043752, published on Jul. 11, 1990.
English Abstract of CN102153128, published on Aug. 17, 2011.
English Abstract of CN102139943, published on Aug. 3, 2011.
English Abstract of CN102127641, published on Jul. 20, 2011.
English Abstract of CN102071317, published on May 25, 2011.
English Abstract of CN102071315, published on May 25, 2011.
English Abstract of CN102061392, published on May 18, 2011.
English Abstract of CN102030355, published on Apr. 27, 2011.
English Abstract of CN102021343, published on Apr. 20, 2011.
English Abstract of CN102011010, published on Apr. 13, 2011.
English Abstract of CN101824555, published on Sep. 8, 2010.
English Abstract of CN1045812, published on Oct. 3, 1990.
English Abstract of CN101407879, published on Apr. 15, 2009.
English Abstract of CN101307384, published on Nov. 19, 2008.
English Abstract of CN101161834, published on Apr. 16, 2008.
English Abstract of CN1844421, published on Oct. 11, 2006.
English Abstract of CN101182601, published on May 21, 2008.
English Abstract of CN1043752C, published on Jun. 23, 1999.
English Abstract of CN87101034, published on Aug. 28, 1991.
English Abstract of RU2079431, published on May 20, 1997.
English Abstract of RU2063458, published on Jul. 10, 1996.
English Abstract of RU 2 048 565, published on Nov. 20, 1995.
English Abstract of RU 2 040 587, published on Jul. 25, 1995.
English Abstract of RU 2 034 074, published on Apr. 30, 1995.
English Abstract of RU 2 031 168, published on Mar. 20, 1995.
English Abstract of RU 2 020 175, published on Sep. 30, 1994.
English Abstract of RU 2 010 876, published on Apr. 15, 1994.
English Abstract of RU 2 094 374, published on Oct. 27, 1997.
English Abstract of RU 2 081 831, published on Jun. 20, 1997.
English Abstract of RU 2 070 596, published on Dec. 20, 1996.
An English translation of Zhang et al., "Research on the Kinetics of Alumina from Kaolinite Leaching in Sulphuric Acid", Journal of Hefei University of Technology, vol. 24, No. 1, Feb. 2001, pp. 71-74.
An English translation of Zhang et al., "Research of the Controlling Steps of the Reaction of Kaolin and Hydrochloric Acid", Journal of Hefei University of Technology, vol. 21, No. 1, Feb. 1998, pp. 50-53.
An English translation of Zhang et al., "Kinetics Research on Alumina in Kaolinite Leached by Hydrochloric Acid", Journal of Hefei University of Technology, vol. 22, No. 2, Apr. 1999, pp. 33-36.
Certification of translation from Park IP Translations dated May 14, 2012.
An English Abstract of CN101450811 "Method for extracting alumina from coal gangue", published on Jun. 10, 2009.
An English Abstract of JP2001162108 "Method for Manufacturing Iron-Aluminum Combined Flocculant", published on Jun. 19, 2001.
English Translation of Abstract of CN101462757, "Preparation of nano Na-beat-alumina powder", Jun. 24, 2009.
An English Abstract of JP57145027 "Preparation of Granular Alumina", published on Sep. 7, 1982.
An English Abstract of CA1065068 "Method of Selectively Precipitating Metals From Solutions", published on 1979-10-23.
English Translation of Abstract of CN101289705, "Process for abstracting vanadium from iron-smeltin waste slag of vanadium-containing iron ore", Jul. 14, 2010.
English Translation of Abstract of CN102220487, "Method for extracting vanadium and aluminum from vanadium-containing stone coal and clay vanadium ore", Oct. 19, 2011.
English Translation of Abstract of CN102241410, "Ecological and Comprehensive Utilization Method of Coal Ash", Nov. 16, 2011.
English Translation of Abstract of RU2363748, "Method of Producing Aluminium", Aug. 10, 2009.
English Translation of Abstract of ES2194586, "Separation procedure for contaminatory metals present in acid solutions involves liquid-liquid extraction with mixtures based on phosphonated dialkyl alkyl, trialkyl phosphates and acid phosphates", Mar. 1, 2005.
English Translation of Abstract of WO2009005115, "Composition for promotion of reduction in size of adipocyte", Jan. 8, 2009.

(56) References Cited

OTHER PUBLICATIONS

English Translation of Abstract of CN101434484, "Processes for producing alumina ceramic valve body and use thereof", May 20, 2009.
English Translation of Abstract of CN101045543, "Method for preparing sheet alumina using coal series kaolin rock or flyash as raw material", Oct. 3, 2007.
English Translation of Abstract of CN101249965, "Method for preparing ultra-fine white carbon black and nano alumina by using kaolinite as raw material", Aug. 27, 2008.
English Translation of Abstract of CN101045538, "Method for preparing modified silicon oxide using coal series kaolin rock or flyash", Oct. 3, 2007.
Smirnov, V., "Alumina production in Russia Part I: Historical background", Journal of Materials, vol. 48, Issue 8, 1996, pp. 24-26.
Wei, X. et al., "Recovery of Iron and Aluminium from Acid Mine Drainage by selective precipitation", Environmental Engineering Science, vol. 22, No. 6, 2005, pp. 745-755.
Ajemba et al., "Application of the Shrinking Core Model to the Analysis of Alumina Leaching From Ukpor Clay Using Nitric Acid", International Journal of Engineering Research & Technology (IJERT), ISSN: 2278-0181, vol. 1 Issue 3, May 2012.
Zhou et al., "Extraction of Scandium from red mud by modified activated carbon and kinetics study", Rare Metals, vol. 27, No. 3, Jun. 2008, pp. 223-227.
Wang et al., "A novel recovery process of metal values from the cathode active materials of the lithium-ion secondary batteries", Hydrometallurgy 99 (2009) 194-201.
Yatsenko et al., "Red Mud Pulp Carbonization with Scandium Extraction during alumina Production", ISSN 0040-5795, Theoretical Foundations of Chemical Engineering, 2010, vol. 44, No. 4, pp. 563-568.
Ouellet, Dissertation 9689, (Extraction de l'alumine de l'argile de la région de Murdochville, Québec, Canada), "Extraction of Alumina from Clay in the Murdochville region of Quebec", Canada—Universite Laval—Original French Version, Oct. 2004.
Ouellet, Dissertation 9689, (Extraction de l'alumine de l'argile de la région de Murdochville, Québec, Canada), "Extraction of Alumina from Clay in the Murdochville region of Quebec", Canada—Universite Laval—English Translation, Oct. 2004.
Translator Certification—Sep. 10, 2012.
Wang et al., "Recovery of scandium from synthetic red mud leach solutions by solvent extraction with D2EHPA", Separation and Purification Technology (2013), pp. 1-14.
Andritz Metals, "Regeneration Systems for Hydrochloric Waste Pickling Solutions", 2011.
Aluminium for Future Generations, "Bauxite Residual Management", http://bauxite.world-aluminium.org/refining/bauxite-residue-management.html.
Vedanta Aluminium Limited, Lanjigarh, "Red Mud Filtration and Recovery of Valuable Metals", 2001, http://marvels.engineeringwatch.in/eea025/.
English Abstract BE1019347, "Hydrometallurgical Reactor", published on Jun. 5, 2012.
Abstract Kao et al., "Solvent extraction of La(III) and Nd(III) from nitrate solutions with 2-ethylhexylphosphonic acid mono-2-ethylhexyl ester", Chemical Engineering Journal, vol. 119, Issues 2-3, Jun. 15, 2006, pp. 167-174.
English Abstract CN102690954, "Back extraction and removement method for aluminium", published on Sep. 26, 2012.
English Abstract CN101781719, "Method for recovering rare earth from oil shale waste slag", published on Jul. 21, 2010.
English Abstract CN102643985, "Method for extracting valuable metals from high-iron bauxite with step-by-step acid leaching", published on Aug. 22, 2012.
English Abstract CN102628105, "Method for comprehensively recycling and using baric waste slag in refined aluminum production process", published on Aug. 8, 2012.
Gunnar et al., Abstract of "Extraction of iron compounds from wood from the Vasa", Department of Chemistry, Swedish University of Agricultural Sciences, vol. 60, No. 6, pp. 678-684, 2006.
Elmolla et al., "Effect of Photo-Fenton Operating Conditions on the Performance of Photo-Fenton-SBR Process for Recalcitrant Wastewater Treatment", Journal of Applied Sciences 10 (24): 3236-3242, 2010.
Cohen et al., "Precipitation of iron from concentrated chloride solutions: Literature observations, challenges and preliminary experimental results", Minerals Engineering 18 (2005), pp. 1344-1347.
Tceisele, "Primary Metal Production", Dec. 3, 2007.
US EPA, "Alumina & Aluminum", Office of Resource Conservation and Recovery, Apr. 2, 2012.
Cablik, "Characterization and applications of red mud from bauxite processing", VSB-Technical University of Ostrava, Faculty of Mining and Geology, pp. 27-37, 2007.
Wahab et al., "Alumina Recovery From Iraqi Kaolinitic Clay by Hydrochloric Acid Route", Iraqi Bulletin of Geology and Mining, vol. 2, No. 1, 2006, pp. 67-76.
Abstract of Dash et al., "Acid dissolution of alumina from waste aluminium dross", Hydrometallurgy, vol. 92, issues 1-2, May 2008, pp. 48-53.
Khan et al., "Production of Aluminum Sulphate from Indigenous Bauxite without Precalcination of the Ore", Jour. Chem Soc. Pak., vol. 17, No. 4, pp. 213-216, 1995.
Sahoo et al., "Characterization of $\gamma$- and $\alpha$-Fe2O3 nano powders synthesized by emulsion precipitation-calcination route and rheological behavior of $\alpha$-Fe2O3", International Journal of Engineering, Science and Technology, vol. 2, No. 8, pp. 118-126, 2010.
Bharathi et al., "Highly mesoporous $\alpha$-Fe2O3 nanostructures: preparation, characterization and improved photocatalytic performance towards Rhodamine B (RhB)", J. Phys. D: Appl. Phys. 43 015501, pp. 1-9, 2010.
"Industrial Inorganic Pigments", Wiley—VCH Verlag GmbH and Co. KgaA, pp. 105-112, 1993.
Andrieux et al., Abstract of: "Hydrothermal synthesis of dioctahedral smectites: The Al—Fe3+ chemical series: Part I: Influence of experimental conditions", Universite de Poitiers, 2009.
Bazin et al., "Alumina from clays", Department of Mining, Metallurgical and Materials Engineering; Alcan International Limitee; Groupe Conseil PROCD Inc.; Conseil de Developpement economique de Murdochville, pp. 24-38, 2005.
Aleksandrovich, "The receipt of alumina from clay materials", 2011.
Copson et al., "Extraction of Alumina from Clays by the Lime-sinter Modification of the Pedersen Process", New York Meeting, Feb. 1944, pp. 241-254.
Al-Zahrani et al., "Extraction of Alumina from Local Clays by Hydrochloric Acid Process", JKAU: Eng. Sci., vol. 20, No. 2, pp. 29-41, 2009.
Dutrizac et al., "The Precipitation of Hematite from Ferric Chloride Media at Atmospheric Pressure", Mining and Mineral Sciences Laboratories, vol. 30B, Dec. 1999, pp. 993-1001.
Riveros et al., "The precipitation of hematite from ferric chloride media", Mining and Mineral Sciences Laboratories, Hydrometallurgy 46 (1997), pp. 85-104.
Becze et al., "Precipitation of Hematite and Recovery of Hydrochloric Acid from Concentrated Chloride Solutions by a Novel Hydrolytic Decomposition Process", TMS (The Minerals & Materials Society, Jan. 2011.
English Translation—Chi et al., Derwent Acc-No. 2010-L68306 for the patent family including CN 101811712 A, published on Apr. 27, 2010.
English Translation of CN102849765(A), "Method for preparing alumina from low-grade bauxite by acid leaching",published on Jan. 2, 2013.
English Translation of CN102849767(A), "Method for preparing alumina by using power plant fly ash", published on Jan. 2, 2013.
English Translation of CN103420405(A), "Method for extracting aluminum oxides from aluminum-containing waste residues", published on Dec. 4, 2013.

(56) References Cited

OTHER PUBLICATIONS

Demopoulos et al., "New Technologies for HCl Regeneration in Chloride Hydrometallurgy", World of Metallurgy—ERZMETALL 61 (Jan. 2008) No. 2.
English Abstract of CN1099424(A), "Method for treating blast furnace slag with diluted chlorhydric acid", published on Mar. 1, 1995.
English Abstract of CN103964480(A), "Processes for producing aluminum oxide by using hydrochloric acid method", published on Aug. 6, 2014.
English Abstract of CN203922759(U), "Devide for preparing aluminum oxide by roasting aluminum chloride heahydrate crystal through rotary kiln", published on Nov. 5, 2014.
English Abstract of EP0850881(A1), Processe and apparatus for the preparation of iron oxides solutions containing hydrochloric acid iron oxide chloride, published on Jul. 1, 1998.
English Abstract of JPH0656429(A), "Production of Plate-Like Oxide Particulate Powder", published on Mar. 1, 1994.
English Abstract of RU2158787(C2), "Process of winning of magnesium", published on Nov. 10, 2000.
English Abstract of CN101509072(A), "Method for extracting valuable metals from laterite nickel mine with hydrochloric acid full-closed circulation method", published on Aug. 19, 2009.
English Abstract of CN101121536(A), "Combination preparation method for anhydrous magnesium chloride and potassium sulphate", published on Feb. 13, 2008.
English Abstract of RU2237111(C1), "Method of Recovering Magnesium from Silicon-Containing Wastes", published on Sep. 27, 2004.
Perander et al., "The Nature and Impacts of Fines in Smelter-Grade Alumina", Journal of Minerals, Metals & Materials Society 61.11 (2009): 33-39. Springer Link. Web. Aug. 12, 2015. <http://link.springer.com/article/10.1007/02Fs11837-009-0164-x>.
Weissenbaeck et al., "Development of Chloride Based Metal Extraction Techniques", Paper presented at ALTA May 2013, Perth, WA.
English Abstract of RU2375306(C1), "Method of Producing Hydrate of Metal Oxide", published on Dec. 10, 2009.
Tomaszewska et al., "The influence of salt in solutions on hydrochloric acid recovery by membrane distillation", Separation and Purification Technology 14 (Mar. 6, 1998) 183-188.
English Abstract of RU2048556(C1), "Method for Recovery of Aluminium, Calcium and Rare-Earth Metals From Red Mud", published on Nov. 20, 1995.
English Abstract of JP2001017939(A), "Treatment of Cement Kiln Waste Gas Dust", Published on Jan. 23, 2001.
English Translation—Machine Generated of CN101767807(A), "Method for extracting high purity aluminum oxide and silica gel from beauxite", published on Jul. 7, 2010.
English Abstract of RU2424332(C2), Procedure for leaching at presence of hydrochloric acid for regeneration of valuable metal from ore, published on Jul. 20, 2011.

\* cited by examiner

PROCESSES FOR TREATING RED MUD

CROSS-REFERENCE TO RELATED APPLICATIONS

The present application is a continuation of U.S. patent application Ser. No. 14/371,374 filed on Jul. 9, 2014 that is a 35 USC 371 national stage entry of PCT/CA2013/000021 filed on Jan. 10, 2013 that claims priority on U.S. 61/584,993 filed on Jan. 10, 2012, on U.S. 61/706,074 filed on Sep. 26, 2012, and on U.S. 61/713,719 filed on Oct. 15, 2012. These documents are hereby incorporated by reference in their entirety.

TECHNICAL FIELD

The present disclosure relates to improvements in the field of processes for treating industrial waste materials. For example, it relates to processes for treating red mud. For example, these processes can be effective for extracting various materials from red mud such as alumina and various metals and oxides thereof, silica, rare earth elements, rare metals etc.

BACKGROUND OF THE DISCLOSURE

Red mud is a solid waste product generated during a process for the production of alumina. For example, red mud is produced during the Bayer process for alumina production, the principal industrial means of refining bauxite in order to provide alumina as raw material for the electrolysis of aluminum by the Hall-Héroult process. A typical plant produces one to two times as much red mud as alumina. This ratio is dependent on the type of bauxite or ore used in the refining process.

Generally, red mud comprises mixture of solid and metallic oxide-bearing impurities, and presents one of the aluminum industry's most important disposal problems. The red colour can be caused, for example, by the oxidised iron present therein. Red mud cannot be disposed of easily. In most countries where red mud is produced, it is pumped into holding ponds. Red mud is thus a problem since it takes up land area and can neither be built on nor farmed, even when dry. Red mud is, for example, highly basic. For example, the pH can be ranging from 10 to 13. Several methods have been developed to lower the alkaline pH to an acceptable level to decrease the impact on the environment. Several researches have been done to find a suitable way to utilize the mud for other applications, but drying the mud requires much energy (latent heat for water evaporation) and can represent high costs if fossil fuels have to be used in the drying process.

The quantities of red mud worldwide continue to grow. In 2010 alone, 80 million tonnes of alumina were produced throughout the world, creating over 120 million tonnes of red mud. It is estimated that red mud inventory in the world has actually reached well over 2.5 billion tonnes. This figure will only continue to grow as increasing demand for aluminium drives the demand of alumina, and in turn for bauxite, which means increased production of toxic red mud residues.

There is thus a need for an alternative process for treating red mud.

SUMMARY OF THE DISCLOSURE

According to one aspect, there is provided a process for treating red mud, the process comprising:

leaching red mud with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid; and heating the precipitate under conditions effective for converting $AlCl_3$ into $Al_2O_3$.

According to another aspect, there is provided a process for treating red mud, the process comprising:

leaching red mud with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid; and heating the precipitate under conditions effective for converting $AlCl_3$ into $Al_2O_3$ and recovering gaseous HCl so-produced.

According to another aspect, there is provided a process for treating red mud, the process comprising:

leaching red mud with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid; and heating the precipitate under conditions effective for converting $AlCl_3$ into $Al_2O_3$ and recovering gaseous HCl so-produced.

According to another aspect, there is provided a process for treating red mud, the process comprising:

leaching red mud with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid; and heating the precipitate under conditions effective for converting $AlCl_3$ into $Al_2O_3$ and recovering gaseous HCl so-produced.

According to another aspect, there is provided a process for preparing alumina and/or other products, the process comprising:

leaching red mud with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid; and heating the precipitate under conditions effective for converting $AlCl_3$ into $Al_2O_3$ and recovering gaseous HCl so-produced.

According to one aspect, there is provided a process for preparing aluminum, the process comprising:

leaching red mud with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid;

heating the precipitate under conditions effective for converting $AlCl_3$ into $Al_2O_3$; and treating the $Al_2O_3$ under conditions effective for converting it into aluminum.

According to another aspect, there is provided a process for preparing aluminum, the process comprising:

leaching red mud with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid;

heating the precipitate under conditions effective for converting $AlCl_3$ into $Al_2O_3$ and recovering gaseous HCl so-produced; and treating the $Al_2O_3$ under conditions effective for converting it into aluminum.

According to another aspect, there is provided a process for treating red mud comprising:

leaching red mud with an acid so as to obtain a leachate and a solid residue, and separating the leachate from the solid residue;

at least partially removing iron ions from the leachate by substantially selectively precipitating the iron ions at a pH greater than 10 by reacting the leachate with a base and at least partially removing the precipitated iron ions from the leachate, thereby obtaining an Al-rich composition comprising $Al^{3+}$ ions;

optionally purifying the $Al^{3+}$ ions; and optionally converting the $Al^{3+}$ ions into alumina.

According to another aspect, there is provided a process for preparing alumina and optionally other products, the process comprising:

leaching an aluminum-containing material with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid;

heating the precipitate under conditions effective for converting $AlCl_3$ into $Al_2O_3$ and recovering gaseous HCl so-produced; and recycling the gaseous HCl so-produced by contacting it with water so as to obtain a composition having a concentration higher than HCl azeotrope concentration (20.2 weight %) and reacting the composition with a further quantity of aluminum-containing material so as to leaching it.

According to another aspect, there is provided a process for preparing alumina and optionally other products, the process comprising:

leaching an aluminum-containing material with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid;

heating the precipitate under conditions effective for converting $AlCl_3$ into $Al_2O_3$ and recovering gaseous HCl so-produced; and recycling the gaseous HCl so-produced by contacting it with water so as to obtain a composition having a concentration of about 18 to about 45 weight % or about 25 to about 45 weight % and reacting the composition with a further quantity of aluminum-containing material so as to leaching it.

According to another aspect, there is provided a process for preparing alumina and optionally other products, the process comprising:

leaching an aluminum-containing material with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid;

heating the precipitate under conditions effective for converting $AlCl_3$ into $Al_2O_3$ and recovering gaseous HCl so-produced; and recycling the gaseous HCl so-produced by contacting it with water so as to obtain a composition having a concentration of about 18 to about 45 weight % or about 25 to about 45 weight % and using the composition for leaching the aluminum-containing material.

According to another aspect, there is provided a process for preparing alumina and optionally other products, the process comprising:

leaching an aluminum-containing material with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid;

heating the precipitate under conditions effective for converting $AlCl_3$ into $Al_2O_3$ and recovering gaseous HCl so-produced; and recycling the gaseous HCl so-produced by contacting it with the leachate so as to precipitate the aluminum ions in the form of $AlCl_3.6H_2O$.

According to another aspect, there is provided a process for preparing alumina and optionally other products, the process comprising:

leaching an aluminum-containing material with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid; and heating the precipitate under conditions effective for converting $AlCl_3$ into $Al_2O_3$.

According to another aspect, there is provided a process for preparing alumina and optionally other products, the process comprising:

leaching an aluminum-containing material with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid; and heating the precipitate under conditions effective for converting $AlCl_3$ into $Al_2O_3$ and optionally recovering gaseous HCl so-produced.

According to one aspect, there is provided a process for preparing aluminum and optionally other products, the process comprising:

leaching an aluminum-containing material with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid;

heating the precipitate under conditions effective for converting $AlCl_3$ into $Al_2O_3$; and converting $Al_2O_3$ into aluminum.

According to another aspect, there is provided a process for preparing aluminum and optionally other products, the process comprising:

leaching an aluminum-containing material with HCl so as to obtain a leachate comprising aluminum ions and a solid, and separating the solid from the leachate;

reacting the leachate with HCl so as to obtain a liquid and a precipitate comprising the aluminum ions in the form of $AlCl_3$, and separating the precipitate from the liquid;

heating the precipitate under conditions effective for converting $AlCl_3$ into $Al_2O_3$ and optionally recovering gaseous HCl so-produced; and converting $Al_2O_3$ into aluminum.

According to another aspect, there is provided a process for preparing aluminum comprising:

obtaining alumina produced by a process as defined in the present disclosure; and treating the alumina under conditions effective for converting it into aluminum.

According to another aspect, there is provided a process for treating red mud, the process comprising:

leaching red mud comprising a first metal with HCl so as to obtain a leachate comprising ions of the first metal and a solid, and separating the solid from the leachate;

reacting the leachate with HCl so as to obtain a liquid and a precipitate comprising a chloride of the first metal, and separating the precipitate from the liquid; and heating the precipitate under conditions effective for converting the chloride of the first metal into an oxide of the first metal.

According to another example, there is provided a process for preparing titanium oxide, the process comprising:

leaching red mud with HCl so as to obtain a first leachate comprising ions from at least one metal and a solid, and separating the solid from the first leachate;

at least substantially isolating the ions of the at least one metal from the first leachate;

leaching the solid with HCl optionally in the presence of a chloride so as to obtain a second leachate comprising titanium chloride; or reacting the solid with $Cl_2$ and a carbon source so as to obtain a liquid portion comprising the titanium chloride and a solid portion, and separating the liquid portion form the solid portion; and converting the titanium chloride into titanium oxide.

According to another example, there is provided a process for preparing titanium oxide, the process comprising:

leaching red mud with HCl so as to obtain a first leachate comprising ions from at least one metal and a solid, and separating the solid from the first leachate;

at least substantially isolating the ions of the at least one metal from the first leachate;

leaching the solid with HCl optionally in the presence of a chloride so as to obtain a second leachate comprising titanium chloride; and converting the titanium chloride into titanium oxide.

According to another example, there is provided a process for preparing titanium chloride, the process comprising:

leaching red mud with HCl so as to obtain a first leachate comprising ions from at least one metal and a solid, and separating the solid from the first leachate;

at least substantially isolating the ions of the at least one metal from the leachate; and leaching the solid with HCl optionally in the presence of a chloride so as to obtain a second leachate comprising titanium chloride.

According to another example, there is provided a process for preparing titanium chloride, the process comprising:

leaching red mud with HCl so as to obtain a first leachate comprising ions from at least one metal and a solid, and separating the solid from the leachate;

at least substantially isolating the ions of the at least one metal from the first leachate; and reacting the solid with $Cl_2$ and a carbon source so as to obtain a liquid portion comprising the titanium chloride and a solid portion, and separating the liquid portion form the solid portion.

It was found that the processes of the present disclosure can be useful for treating various starting materials such like various ores. Moreover, it was found that in addition of being efficient for treating such starting materials, it was possible to treat industrial waste material such as red mud with such processes. In fact, it has been found that the processes of the present disclosure are effective for providing a solution to the problem of red mud: these processes allow for efficiently treating them and recovering various valuable products from red mud. These processes are simple, efficient and can be carried out at low costs in an environment friendly manner.

BRIEF DESCRIPTION OF DRAWINGS

In the following drawings, which represent by way of example only, various embodiments of the disclosure.

DETAILED DESCRIPTION OF VARIOUS EMBODIMENTS

Figure 1:
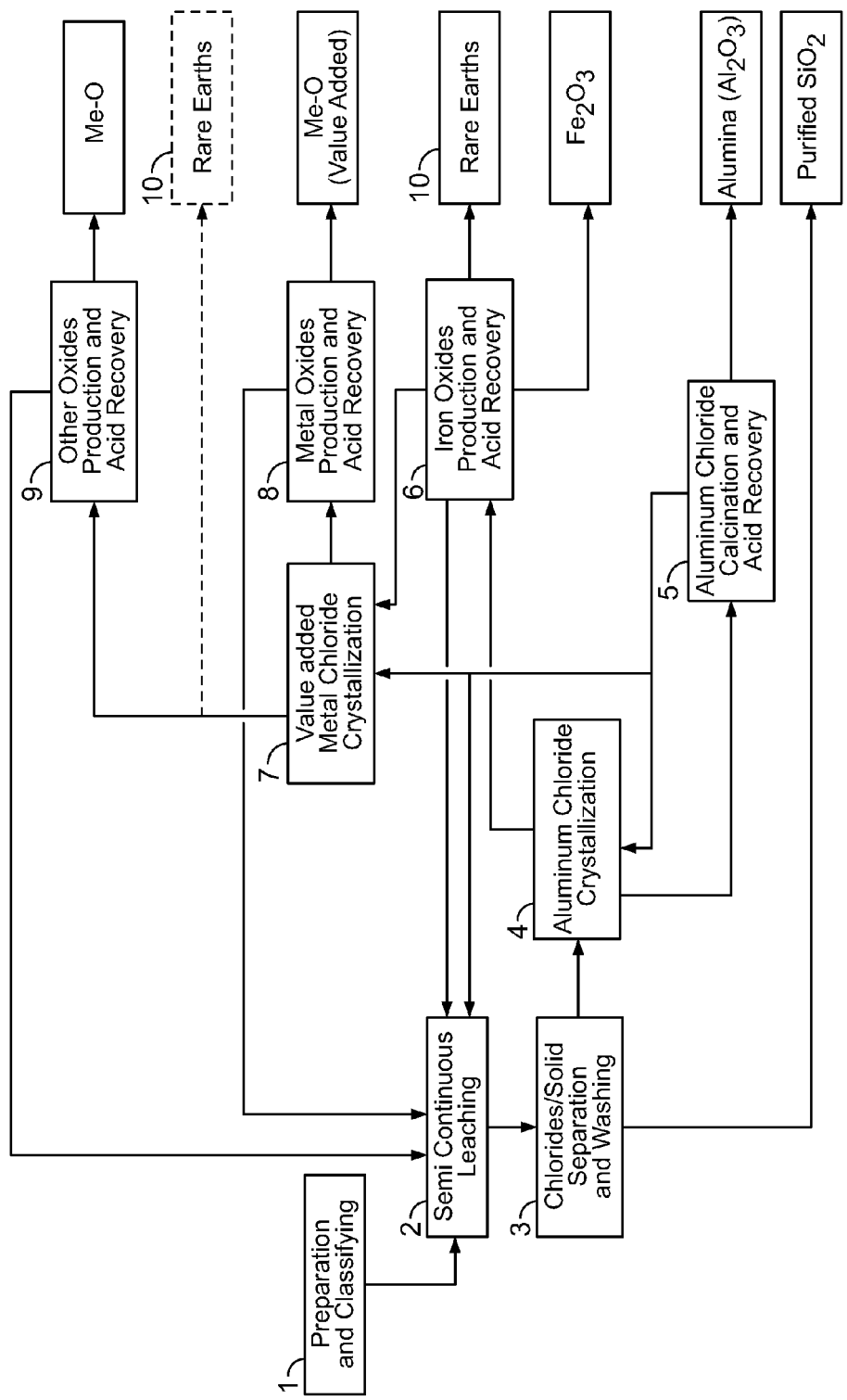
FIG. 1 shows a bloc diagram of an example of process for preparing alumina and various other products according to the present disclosure.

The following non-limiting examples further illustrate the technology described in the present disclosure.

The aluminum-containing material can be for example chosen from aluminum-containing ores (such as aluminosilicate minerals, clays, argillite, nepheline, mudstone, beryl, cryolite, garnet, spinel, bauxite, kaolin or mixtures thereof can be used). The aluminum-containing material can also be a recycled industrial aluminum-containing material such as slag, red mud or fly ashes.

The expression "red mud" as used herein refers, for example, to an industrial waste product generated during the production of alumina. For example, such a waste product can comprise silica, aluminum, iron, calcium, and optionally titanium. It can also comprise an array of minor constituents such as Na, K, Cr, V, Ni, Co, Ba, Cu, Mn, Mg, Pb, and/or Zn etc. For example, red mud can comprises about 15 to about 80% by weight of $Fe_2O_3$, about 1 to about 35% by weight $Al_2O_3$, about 1 to about 65% by weight of $SiO_2$, about 1 to about 20% by weight of $Na_2O$, about 1 to about 20% by weight of CaO, and from 0 to about 35% by weight of $TiO_2$. According to another example, red mud can comprise about 30 to about 65% by weight of $Fe_2O_3$, about 10 to about 20% by weight $Al_2O_3$, about 3 to about 50% by weight of $SiO_2$, about 2 to about 10% by weight of $Na_2O$, about 2 to about 8% by weight of CaO, and from 0 to about 25% by weight of $TiO_2$. The person skilled in the art will understand that the composition of red mud can vary depending on the bauxite origin used in the Bayer process.

The expression "fly ashes" as used herein refers, for example, to an industrial waste product generated in combustion. For example, such a waste product can contain various elements such as silica, oxygen, aluminum, iron, calcium. For example, fly ashes can comprise silicon dioxide ($SiO_2$) and aluminium oxide ($Al_2O_3$). For example, fly ashes can further comprises calcium oxide (CaO) and/or iron oxide ($Fe_2O_3$). For example fly ashes can comprise fine particles that rise with flue gases. For example, fly ashes can be produced during combustion of coal. For example, fly ashes can also comprise at least one element chosen from arsenic, beryllium, boron, cadmium, chromium, chromium VI, cobalt, lead, manganese, mercury, molybdenum, selenium, strontium, thallium, and/or vanadium. For example, fly ashes can also comprise rare earth elements and rare metals. For example, fly ashes can be considered as an aluminum-containing material.

The expression "rare earth element" (also described as "REE") as used herein refers, for example, to a rare element chosen from scandium, yttrium, lanthanum, cerium, praseodymium, neodymium, promethium, samarium, europium, gadolinium, terbium, dysprosium, holmium, erbium, thulium, ytterbium, and lutetium. The expression "rare metals" as used herein refers, for example, to rare metals chosen from indium, zirconium, lithium, and gallium. These rare earth elements and rare metals can be in various form such as the elemental form (or metallic form), under the form of chlorides, oxides, hydroxides etc. The expression "rare earths" as used in the present disclosure as a synonym of "rare earth elements and rare metals" that is described above.

The expression "at least one iron chloride" as used herein refers to $FeCl_2$, $FeCl_3$ or a mixture thereof.

The term "hematite" as used herein refers, for example, to a compound comprising $\alpha$-$Fe_2O_3$, $\gamma$-$Fe_2O_3$, $\beta$-FeO.OH or mixtures thereof.

The expression "iron ions" as used herein refers, for example to ions comprising to at least one type of iron ion chosen from all possible forms of Fe ions. For example, the at least one type of iron ion can be $Fe^{2+}$, $Fe^{3+}$, or a mixture thereof.

The expression "aluminum ions" as used herein refers, for example to ions comprising to at least one type of aluminum ion chosen from all possible forms of Al ions. For example, the at least one type of aluminum ion can be $Al^{3+}$.

The expression "at least one aluminum ion", as used herein refers, for example, to at least one type of aluminum ion chosen from all possible forms of Al ions. For example, the at least one aluminum ion can be $Al^{3+}$.

The expression "at least one iron ion", as used herein refers, for example, to at least one type of iron ion chosen from all possible forms of Fe ions. For example, the at least one iron ion can be $Fe^{2+}$, $Fe^{3+}$, or a mixture thereof.

The expression "at least one precipitated iron ion", as used herein refers, for example, to at least one type of iron ion chosen from all possible forms of Fe ions that was precipitated in a solid form. For example, the at least one iron ion present in such a precipitate can be $Fe^{2+}$, $Fe^{3+}$, or a mixture thereof.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The term "ALP" as used herein refers to Acid Leaching Plant.

The expression "titanium chloride" as used herein refers, for example, to a compound chosen from $TiCl_2$, $TiCl_3$ and $TiCl_4$ and mixtures thereof. For example, it refers to $TiCl_4$.

For example, the material can be leached with HCl having a concentration of about 10 to about 50 weight %, about 15 to about 45 weight %, of about 18 to about 45 weight % of about 18 to about 32 weight %, of about 20 to about 45 weight %, of about 25 to about 45 weight %, of about 26 to about 42 weight %, of about 28 to about 40 weight %, of about 30 to about 38 weight %, or between 25 and 36 weight %. For example, HCl at about 18 wt % or about 32 wt % can be used.

For example, the material can be leached with HCl having a concentration of about 1 M to about 12 M, about 2 M to about 10 M, about 3 M to about 9 M, about 4 M to about 8 M, about 5 M to about 7 M or about 6 M.

Leaching can also be carried out by adding dry highly concentrated acid (for example, 85%, 90% or 95%) in gas phase into the aqueous solution. Alternatively, leaching can also be carried out by using a weak acid solution (for example <3 wt %).

For example, leaching can be carried out by using HCl having a concentration of about 18 to about 32 wt % in a first reactor and then, by using HCl having concentration of about 90 to about 95% (gaseous) in a second reactor.

For example, leaching can be carried out by using HCl having a concentration of about 18 to about 32 wt % in a first reactor then, by using HCl having concentration of about 90 to about 95% (gaseous) in a second reactor; and by using HCl having concentration of about 90 to about 95% (gaseous) in a third reactor.

For example, leaching can be carried out under an inert gas atmosphere (for example argon or nitrogen).

For example, leaching can be carried out under an atmosphere of $NH_3$.

For example, the material can be leached at a temperature of about 125 to about 225° C., about 140 to about 165° C., about 145 to about 160° C., about 150 to about 200° C., about 150 to about 190° C., about 160 to about 190° C., about 185 to about 190° C., about 160 to about 180° C., about 160 to about 175° C., or about 165 to about 170° C.

For example, the material can be leached at a pressure of about 4 to about 10 barg, about 4 to about 8 barg, or about 5 to about 6 barg.

For example, the material can be leached at a pressure of about 50 to about 150 psig, about 60 to about 100 psig, or about 70 to about 80 psig.

For example, the material can be leached with HCl having a concentration of about 10 to about 50 weight %, about 15 to about 45 weight %, of about 18 to about 45 weight % of about 18 to about 32 weight %, of about 20 to about 45 weight %, of about 25 to about 45 weight %, of about 26 to about 42 weight %, of about 28 to about 40 weight %, of about 30 to about 38 weight %, or between 25 and 36 weight %. For example, HCl at about 18 wt % or about 32 wt % can be used.

Leaching can also be carried out by adding dry highly concentrated acid (for example, 85%, 90% or 95%) in gas phase into the aqueous solution. Alternatively, leaching can also be carried out by using a weak acid solution (for example <3 wt %).

For example, leaching can be carried out by using HCl having a concentration of about 18 to about 32 wt % in a first reactor and then, by using HCl having concentration of about 90 to about 95%, or about 95 to about 100% (gaseous) in a second reactor.

For example, leaching can be carried out by using HCl having a concentration of about 18 to about 32 wt % in a first reactor then, by using HCl having concentration of about 90 to about 95% (gaseous) in a second reactor; and by using HCl having concentration of about 90 to about 95% (gaseous) in a third reactor.

For example, leaching can be carried out under an inert gas atmosphere (for example argon or nitrogen).

For example, leaching can be carried out under an atmosphere of $NH_3$.

For example a first leaching can be carried out at atmospheric pressure and then, at least one further leaching (for example 1, 2 or 3 subsequent leaching steps) can be carried out under pressure.

For example, the processes can further comprise, before leaching the red mud, a pre-leaching removal of fluorine optionally contained in the red mud.

Before leaching, the material can be, for example, treated through a ball mill. For example, ted mud can be to be reduced to 80, 85 or 90% passing a 63 micron sieve.

For example, leaching can be a continuous leaching or semi-continuous.

For example, the processes of the present disclosure can be continuous or semi-continuous.

For example, the processes can further comprise recycling the gaseous HCl so-produced by contacting it with water so as to obtain a composition having a concentration of about 18 to about 45 weight %, about 26 to about 42 weight %, about 25 to about 45 weight %, about 28 to about 40 weight %, about 30 to about 38 weight %, about 18 to about 36%, or %.

For example, the processes can further comprise recycling the gaseous HCl so-produced by contacting it with water so as to obtain a composition having a concentration of about 18 to about 45 weight % or about 25 to about 45 weight % and using the composition for leaching the material.

For example, the liquid can comprise iron chloride. Iron chloride can comprise at least one of $FeCl_2$, $FeCl_3$, and a mixture thereof.

For example, the liquid can have an iron chloride concentration of at least 30% by weight; and can then be hydrolyzed at a temperature of about 155 to about 350° C.

For example, the liquid can be concentrated to a concentrated liquid having an iron chloride concentration of at least 30% by weight; and then the iron chloride can be hydrolyzed at a temperature of about 155 to about 350° C. while maintaining a ferric chloride concentration at a level of at least 65% by weight, to generate a composition comprising a liquid and precipitated hematite, and recovering the hematite.

For example, non-hydrolysable elements with hematite can be concentrated back to a concentration of about 0.125 to about 52% wt. in circulation loop in view of selective extraction.

For example, the liquid can be concentrated to a concentrated liquid having a concentration of the at least one iron chloride of at least 30% by weight; and then hydrolyzed at a temperature of about 155 to about 350° C.

For example, the liquid can be concentrated to a concentrated liquid having a concentration of the at least one iron chloride of at least 30% by weight; and then the at least one iron chloride is hydrolyzed at a temperature of about 155 to about 350° C. while maintaining a ferric chloride concentration at a level of at least 65% by weight, to generate a composition comprising a liquid and precipitated hematite, and recovering the hematite.

For example, the liquid can be concentrated to a concentrated liquid having a concentration of the at least one iron chloride of at least 30% by weight; and then the at least one iron chloride is hydrolyzed at a temperature of about 155 to about 350° C. while maintaining a ferric chloride concentration at a level of at least 65% by weight, to generate a composition comprising a liquid and precipitated hematite; recovering the hematite; and recovering rare earth elements and/or rare metals from the liquid.

For example, the at least one iron chloride can be hydrolyzed at a temperature of about, 150 to about 175, 155 to about 170 or 165 to about 170° C.

For example, the liquid can be concentrated to a concentrated liquid having an iron chloride concentration of at least 30% by weight; and then the iron chloride can be hydrolyzed at a temperature of about 155 to about 350° C. while maintaining a ferric chloride concentration at a level of at least 65% by weight, to generate a composition comprising a liquid and precipitated hematite; recovering the hematite; and recovering rare earth elements and/or rare metals from the liquid.

For example, the processes can further comprise, after recovery of the rare earth elements and/or rare metals, reacting the liquid with HCl so as to cause precipitation of $MgCl_2$, and recovering same.

For example, the processes can further comprise calcining $MgCl_2$ into MgO.

For example, the processes can further comprise calcining $MgCl_2$ into MgO and recycling the gaseous HCl so-produced by contacting it with water so as to obtain a composition having a concentration of about 25 to about 45 weight % or about 18 to about 45 weight % and using the composition for leaching the red mud.

For example, the processes can further comprises, after recovery of the rare earth elements and/or rare metals, reacting the liquid with HCl, and substantially selectively precipitating $Na_2SO_4$. For example, $Na_2SO_4$ can be precipitated by reacting the liquid with $H_2SO_4$.

For example, the processes can further comprises, after recovery of the rare earth elements and/or rare metals, reacting the liquid with HCl, and substantially selectively precipitating $K_2SO_4$. For example, $K_2SO_4$ can be precipitated by adding $H_2SO_4$.

For example, the liquid can be concentrated to a concentrated liquid having an iron chloride concentration of at least 30% by weight; and then the iron chloride can be hydrolyzed at a temperature of about 155 to about 350° C. while maintaining a ferric chloride concentration at a level of at least 65% by weight, to generate a composition comprising a liquid and precipitated hematite; recovering the hematite; and reacting the liquid with HCl. For example, such processes can further comprises reacting the liquid with $H_2SO_4$ so as to substantially selectively precipitate $Na_2SO_4$. The processes can also comprise further reacting the liquid with $H_2SO_4$ so as to substantially selectively precipitating $K_2SO_4$.

For example, the processes can comprise reacting dry individual salts (for example Na or K salts) obtained during the processes with $H_2SO_4$ and recovering HCl while producing marketable $K_2SO_4$ and $Na_2SO_4$ and recovering hydrochloric acid of about 15 to about 90% wt.

For example, sodium chloride produced in the processes can undergo a chemical reaction with sulfuric acid so as to obtain sodium sulfate and regenerate hydrochloric acid. Potassium chloride can undergo a chemical reaction with sulfuric acid so as to obtain potassium sulfate and regenerate hydrochloric acid. Sodium and potassium chloride brine solution can alternatively be the feed material to adapted small chlor-alkali electrolysis cells. In this latter case, common bases (NaOH and KOH) and bleach (NaOCl and KOCl) are produced.

For example, the processes can further comprise, after recovery of the rare earth elements and/or rare metals, recovering NaCl from the liquid, reacting the NaCl with $H_2SO_4$, and substantially selectively precipitating $Na_2SO_4$.

For example, the processes can further comprise, downstream of recovery of the rare earth elements and/or rare metals, recovering KCl from the liquid, reacting the KCl with $H_2SO_4$, and substantially selectively precipitating $K_2SO_4$.

For example, the processes can further comprise, downstream of recovery of the rare earth elements and/or rare metals, recovering NaCl from the liquid, carrying out an electrolysis to generate NaOH and NaOCl.

For example, the processes can further comprise, downstream of recovery of the rare earth elements and/or rare metals, recovering KCl from the liquid, reacting the KCl, carrying out an electrolysis to generate KOH and KOCl.

For example, the liquid can be concentrated to a concentrated liquid having a concentration of the at least one iron chloride of at least 30% by weight; and then the at least one iron chloride is hydrolyzed at a temperature of about 155 to about 350° C. while maintaining a ferric chloride concentration at a level of at least 65% by weight, to generate a composition comprising a liquid and precipitated hematite; recovering the hematite; and extracting NaCl and/or KCl from the liquid.

For example, the processes can further comprise reacting the NaCl with $H_2SO_4$ so as to substantially selectively precipitate $Na_2SO_4$.

For example, the processes can further comprise reacting the KCl with $H_2SO_4$ so as to substantially selectively precipitate $K_2SO_4$.

For example, the processes can further comprise carrying out an electrolysis of the NaCl to generate NaOH and NaOCl.

For example, the processes can further comprise carrying out an electrolysis of the KCl to generate KOH and KOCl.

For example, the processes can comprise separating the solid from the leachate and washing the solid so as to obtain silica having a purity of at least 95%, at least 96%, at least 97%, at least 98%, at least 99%, at least 99.5% or at least 99.9%.

For example, the processes can comprise reacting the leachate with gaseous HCl so as to obtain the liquid and the precipitate comprising the first metal under the form of a chloride.

For example, the processes can comprise reacting the leachate with dry gaseous HCl so as to obtain the liquid and the precipitate comprising the first metal under the form of a chloride.

For example, precipitating $AlCl_3$ can comprise crystallizing $AlCl_3.6H_2O$.

For example, the process can comprise reacting the leachate with HCl recovered during the process and a having a concentration of at least 30% as to obtain the liquid and the precipitate comprising the aluminum ions, the precipitate being formed by crystallization of $AlCl_3.6H_2O$.

For example, the first metal can be chosen from aluminum, iron, zinc, copper, gold, silver, molybdenum, cobalt, magnesium, lithium, manganese, nickel, palladium, platinum, thorium, phosphorus, uranium and titanium, and/or at least one rare earth element and/or at least one rare metal.

For example, the liquid can comprise a second metal.

For example, the second metal can be chosen from aluminum, iron, zinc, copper, gold, silver, molybdenum, cobalt, magnesium, lithium, manganese, nickel, palladium, platinum, thorium, phosphorus, uranium and titanium, and/or at least one rare earth element and/or at least one rare metal.

For example, the second metal can be iron.

For example, the process can comprise separating the precipitate from the liquid and heating the second metal in order to convert a chloride of the second metal into an oxide of the second metal.

For example, the processes can comprise:
separating the solid from the leachate;
leaching the solid with an acid so as to obtain another leachate; and
recovering a third metal from the another leachate.

For example, the third metal can be chosen from aluminum, iron, zinc, copper, gold, silver, molybdenum, cobalt, magnesium, lithium, manganese, nickel, palladium, platinum, thorium, phosphorus, uranium and titanium, and/or at least one rare earth element and/or at least one rare metal.

For example, the third metal can be titanium.

For example, the acid used for leaching can be chosen from HCl, $HNO_3$, $H_2SO_4$ and mixtures thereof.

For example, the acid can be HCl.

For example, the acid can be gaseous HCl.

For example, the process can comprise recovering the third metal from the another leachate by precipitating the third metal.

For example, the third metal can be precipitated by reacting it with HCl.

For example, the process can further comprise heating the third metal in order to convert a chloride of the third metal into an oxide of the third metal.

For example, the first metal can be aluminum.
For example, the first metal can be magnesium.
For example, the first metal can be nickel.
For example, the second metal can be magnesium.
For example, the second metal can be nickel.

For example, the processes can comprise reacting the leachate with gaseous HCl so as to obtain the liquid and the precipitate comprising the aluminum ions in the form of $AlCl_3.6H_2O$.

For example, the processes can comprise reacting the leachate with dry gaseous HCl so as to obtain the liquid and the precipitate comprising the aluminum ions in the form of $AlCl_3.6H_2O$.

For example, the processes can comprise reacting the leachate with acid of at least 30% wt. that was recovered, regenerated and/or purified as indicated in the present disclosure so as to obtain the liquid and the precipitate comprising the aluminum ions in the form of $AlCl_3.6H_2O$.

For example, the processes can comprise reacting the leachate with gaseous HCl so as to obtain the liquid and the precipitate comprising the aluminum ions, the precipitate being formed by crystallization of $AlCl_3.6H_2O$.

For example, the processes can comprise reacting the leachate with dry gaseous HCl so as to obtain the liquid and the precipitate comprising the aluminum ions, the precipitate being formed by crystallization of $AlCl_3.6H_2O$.

For example, aluminum ions can be precipitated under the form of $AlCl_3$ (for example $AlCl_3.6H_2O$) in a crystallizer, for example, by adding HCl having a concentration of about 26 to about 32 wt %.

For example, the gaseous HCl can have a HCl concentration of at least 85% wt. or at least 90% wt.

For example, the gaseous HCl can have a HCl concentration of about 90% wt. or about 90% to about 95% wt.

For example, during the crystallization of $AlCl_3.6H_2O$, the liquid can be maintained at a concentration of HCl of about 25 to about 35% by weight or about 30 to about 32% by weight.

For example, the crystallization can be carried out at a temperature of about 45 to about 65° C. or about 50 to about 60° C.

For example, crystallization of $AlCl_3.6H_2O$ can be carried out by adding concentrated gaseous HCl to reach a proprietary concentration established of free HCl in the crystalliser. The average results obtained from the crystals For example, the hexahydrate crystals can be fed to the calcination unit. $AlCl_3$ hydrolysis and conversion can occur at very low temperature (<200° C.). The crystals can pass through a first step where decomposition occurs followed by the calcination itself. The circulating fluid bed can be operated such that energy consumption is less than 30% of the energy normally required for hexahydrate crystal calcination. The alumina produced can be washed to remove unconverted salt if required.

For example, the HCl can be obtained from the gaseous HCl so-produced.

For example, in the processes of the present disclosure, a given batch or quantity of the aluminum-containing material will be leached, will then be converted into $AlCl_3$ and when the HCl generated during calcination of $AlCl_3$ into $Al_2O_3$ will be used for example to leach another given batch or quantity of the aluminum-containing material.

For example, the processes can comprise heating the precipitate at a temperature of at least 180, 230, 250, 300, 350, 400, 450, 500, 550, 600, 650, 700, 750, 800, 850, 900, 925, 930, 1000, 1100, 1200 or 1250° C. for converting $AlCl_3$ into $Al_2O_3$.

For example, converting $AlCl_3$ into $Al_2O_3$ can comprise calcination of $AlCl_3$.

For example, calcination is effective for converting $AlCl_3$ into beta-$Al_2O_3$.

For example, calcination is effective for converting $AlCl_3$ into alpha-$Al_2O_3$.

For example, converting $AlCl_3$ into $Al_2O_3$ can comprise carrying out a calcination via a two-stage circulating fluid bed reactor.

For example, converting $AlCl_3$ into $Al_2O_3$ can comprise carrying out a calcination via a two-stage circulating fluid bed reactor that comprises a preheating system.

For example, converting $AlCl_3$ into $Al_2O_3$ can comprise carrying out a calcination at low temperature, for example, about 300 to about 600° C., about 325 to about 550° C., about 350 to about 500° C., about 375 to about 450° C., about 375 to about 425° C., or about 385 to about 400° C. and/or injecting steam.

For example, converting $AlCl_3$ into $Al_2O_3$ can comprise carrying out a calcination at low temperature, for example, at least 180° C., at least 250° C., at least 300° C., at least 350° C. and/or injecting steam.

For example, converting $AlCl_3$ into $Al_2O_3$ can comprise carrying out a calcination at low temperature, for example, less than 600° C. and/or injecting steam.

For example, converting $AlCl_3$ into $Al_2O_3$ can comprise carrying out a calcination by using coal as combustion source and by using a degasification unit.

For example, the process can comprise converting $AlCl_3.6H_2O$ into $Al_2O_3$ by carrying out a calcination of $AlCl_3.6H_2O$, the calcination comprising steam injection.

For example, steam (or water vapor) can be injected at a pressure of about 200 to about 700 psig, about 300 to about 700 psig, about 400 to about 700 psig, about 550 to about 650 psig, about 575 to about 625 psig, or about 590 to about 610 psig.

For example, steam (or water vapor) can be injected and a plasma torch can be used for carrying fluidization.

For example, the steam (or water vapor) can be overheated.

For example, the steam (or water vapor) can be at a temperature of about 300 to about 400° C.

For example, acid from the offgases generated during calcination can be then treated via a gas phase purification process.

For example, converting $AlCl_3$ into $Al_2O_3$ can comprise carrying out a calcination by means of carbon monoxide (CO).

For example, converting $AlCl_3$ into $Al_2O_3$ can comprise carrying out a calcination by means of a Refinery Fuel Gas (RFG).

For example, calcination can be carried out by injecting water vapor or steam and/or by using a combustion source chosen from fossil fuels, carbon monoxide, a Refinery Fuel Gas, coal, or chlorinated gases and/or solvants.

For example, calcination can be carried out by injecting water vapor or steam and/or by using a combustion source chosen from natural gas or propane.

For example, calcination can be carried out by providing heat by means of electric heating, gas heating, microwave heating.

For example, the processes can comprise precipitating the $Al^{3+}$ ions under the form of $Al(OH)_3$. For example, precipitating the $Al^{3+}$ under the form of $Al(OH)_3$ is carried out at a pH of about 7 to about 10; about 9 to about 10; about 9.2 to about 9.8; about 9.3 to about 9.7; about 9.5; 7.5 to about 8.5; about 7.8 to about 8.2; or about 8.

For example, the iron ions can be precipitated at a pH greater than 11, a pH greater than 12, a pH comprised between 10 and 11, a pH about 11.5 to about 12.5, or a pH about 11.8 to about 12.0.

For example, the $Al^{3+}$ ions are purified.

For example, the process can comprise precipitating $Al^{3+}$ ions under the form of $AlCl_3$ so as to purify the $Al^{3+}$ ions. For example, precipitating $AlCl_3$ can be carried out by crystallizing the $AlCl_3$ under the form of $AlCl_3.6H_2O$.

For example, the process can comprise converting $AlCl_3$ into $Al_2O_3$, for example, by converting $AlCl_3$ into $Al_2O_3$ under an inert gas atmosphere or by converting $AlCl_3$ into $Al_2O_3$ under a nitrogen atmosphere.

The obtained alumina can be washed by demineralized water so as to at least partially remove NaCl and/or KCl.

For example, the fluid bed reactor can comprise a metal catalyst chosen from metal chlorides.

For example, the fluid bed reactor can comprise a metal catalyst that is $FeCl_3$, $FeCl_2$ or a mixture thereof.

For example, the fluid bed reactor can comprise a metal catalyst that is $FeCl_3$.

For example, the preheating system can comprise a plasma torch.

For example, steam can be used as the fluidization medium heating. Heating can also be electrical.

For example, a plasma torch can be used for preheating the calcination reactor.

For example, a plasma torch can be used for preheating air entering in the calcination reactor.

For example, the plasma torch can be used for generating steam that is injected into a calcination reactor.

For example, the plasma torch can be effective for generating steam that is as fluidization medium in a fluid bed reactor.

For example, a plasma torch can be used for preheating a fluid bed.

For example, the calcination medium can be substantially neutral in terms of $O_2$ (or oxidation). For example, the calcination medium can favorize reduction (for example a concentration of CO of about 100 ppm).

For example, the calcination medium is effective for preventing formation of $Cl_2$.

For example, the processes can comprise converting $AlCl_3.6H_2O$ into $Al_2O_3$ by carrying out a calcination of $AlCl_3.6H_2O$, for example, that is provided by the combustion of gas mixture that comprises:

$CH_4$: 0 to about 1% vol;
$C_2H_6$: 0 to about 2% vol;
$C_3H_8$: 0 to about 2% vol;
$C_4H_{10}$: 0 to about 1% vol;
$N_2$: 0 to about 0.5% vol;
$H_2$: about 0.25 to about 15.1% vol;
CO: about 70 to about 82.5% vol; and
$CO_2$: about 1.0 to about 3.5% vol.

Such a mixture can be efficient for reduction in off gas volume of 15.3 to 16.3%; therefore the capacity increases of 15.3 to 16.3% proven on practical operation of the circulating fluid bed. Thus for a same flow it represents an Opex of 0.65*16.3%=10.6%.

For example, the air to natural gas ratio of ($Nm^3/h$ over $Nm^3/h$) in the fluid bed can be about 9.5 to about 10

For example, the air to CO gas ratio of ($Nm^3/h$ over $Nm^3/h$) in the fluid bed can be about 2 to about 3.

For example, $O_2$ can be substantially absent from the gas mixture.

For example, the processes can comprise, before leaching the aluminum-containing material, a pre-leaching removal of optionally contained in the aluminum-containing material.

For example, the processes can comprise leaching of the aluminum-containing material with HCl so as to obtain the leachate comprising aluminum ions and the solid, separating the solid from the leachate; and further treating the solid so as to separate $SiO_2$ from $TiO_2$ that are contained therein.

For example, the processes can comprise leaching the aluminum-containing material with HCl so as to obtain the leachate comprising aluminum ions and the solid, separating the solid from the leachate; and further treating the solid so as to separate Si from Ti that are contained therein.

For example, the processes can comprise leaching the aluminum-containing material with HCl so as to obtain the leachate comprising aluminum ions and the solid, separating the solid from the leachate; and further treating the solid with HCl so as to separate Si from Ti that are contained therein.

For example, the process can comprise leaching the red mud with HCl so as to obtain the leachate comprising aluminum ions and the solid, separating the solid from the leachate; and further treating the solid with HCl, in the presence of a chloride (for example chosen from akali chlorides and alkaline earth chlorides), so as to separate Si from Ti that are contained therein.

For example, the solid can be treated with HCl and the chloride so as to obtain a liquid portion comprising Ti and a solid portion containing Si and wherein the liquid portion is separated from the solid portion.

For example, the solid can be treated with HCl and the chloride so as to obtain a liquid portion comprising $TiCl_4$.

For example, the process can further comprise converting $TiCl_4$ into $TiO_2$.

For example, $TiCl_4$ can be converted into $TiO_2$ by solvent extraction of the third liquid fraction and subsequent formation of titanium dioxide from the solvent extraction.

For example, $TiCl_4$ can be reacted with water and/or a base to cause precipitation of $TiO_2$.

For example, $TiCl_4$ can be converted into $TiO_2$ by means of a pyrohydrolysis, thereby generating HCl.

For example, $TiCl_4$ can be converted into $TiO_2$ by means of a pyrohydrolysis, thereby generating HCl that is recycled.

For example, the solid can comprise $TiO_2$ and $SiO_2$ and the solid can be treated with $Cl_2$ and carbon in order to obtain a liquid portion and a solid portion, and wherein the solid portion and the liquid portion are separated from one another.

For example, the liquid portion can comprise $TiCl_2$ and/or $TiCl_4$.

For example, the liquid portion can comprise $TiCl_4$.

For example, the process can further comprise heating $TiCl_4$ so as to convert it into $TiO_2$.

For example, obtained $TiO_2$ can be purified by means of a plasma torch.

For example, the processes can comprise leaching the aluminum-containing material with HCl so as to obtain the leachate comprising aluminum ions and the solid, separating the solid from the leachate; and further treating the solid with HCl at a concentration of less than 20% wt., at a temperature of less than 85° C., in the presence of a chloride, so as to separate Si from Ti that are contained therein For example, the chloride can be chosen from akali chlorides and alkaline earth chlorides.

For example, the chloride can be $MgCl_2$ or $CaCl_2$.

After the leaching, the titanium ions under the form of titanium chloride are in a liquid phase and the Si remains solid. Therefore, SI can thus be simply separated from Ti by a solid/liquid separation. Then, titanium chloride can be converted into $TiO_2$. It has to be noted that titanium oxychloride can also be present in the leachate.

Various methods of recovering titanium from a leachate are discussed in CA 2,513,309, which is hereby integrated by reference in its entirety.

For example, separation methods such as solvent extraction, precipitation or ion exchange can be used to remove impurities various impurities e. g. iron, chromium and vanadium, followed by recovery of titanium. Some of these techniques are discussed in the U.S. Pat. No. 6,500,396 (also integrated by reference in its entirety.

For example, in order to purify titanium ions, the leachate can be treated with an organic phase. The organic phase can be selected so that ions of a given can be selectively extracted into the organic phase, with titanium ions remaining in the aqueous solution. Thus, oxides of this given metal can also be obtained in high purity.

Examples of the organic phase are quaternary ammonium chlorides, amines (primary, secondary or tertiary), phosphoric and phosphinic acids, and esters and oxides thereof, e. g. tri-n-butyl phosphate, di-2-ethylhexyl phosphoric acid and phosphine oxide. The organic phase may be stripped from the iron values and recycled. Such an organic phase can be selected so that the titanium chloride can be soluble in the organic phase. For example, the organic phase can be selected such that the organic phase and titanium chloride may be separated by fractional distillation (for example with a separation in boiling points between the organic phase and titanium chloride.)

For example, the titanium chloride can be treated with water or a base, (for example magnesium oxide), or by raising the temperature of the solution to 85-110 C, to effect precipitation of titanium dioxide.

The titanium chloride product obtained can also be subjected to calcination in a pyrohydrolysis reactor or be treated in a plasma torch so as to convert it into $TiO_2$.

For example, converting $AlCl_3$ into $Al_2O_3$ can comprise carrying out a one-step calcination.

For example, calcination can be carried out at different temperatures with steam. Temperature applied of superheated steam can be of about 350° C. to about 550° C. or about 350° C. to about 940° C. or about 350° C. to about 1200° C.

For example, multi stage evaporation step of the hydrolyser can be carried out to reduce drastically energy consumption.

For example, the processes can be effective for providing an $Al_2O_3$ recovery yield of at least 93%, at least 94%, at least 95%, about 90 to about 95%, about 92 to about 95%, or about 93 to about 95%.

For example, the processes can be effective for providing a $Fe_2O_3$ recovery yield of at least 98%, at least 99%, about 98 to about 99.5%, or about 98.5 to about 99.5%.

For example, the processes can be effective for providing a MgO recovery yield of at least 96%, at least 97%, at least 98%, or about 96 to about 98%.

For example, the processes can be effective for providing a HCl recovery yield of at least 98%, at least 99%, or about 98 to about 99.9%.

For example, the processes can be effective for providing chlorides of rare earth elements (REE-Cl) and chlorides of rare metals (RM-Cl) in recovery yields of about 75% to about 96.5% by using internal processes via an internal concentration loop.

For example, the processes can be effective for providing hydrochloric acid recovery yield of about 99.75% with non-hydrolysable elements.

For example, the aluminum-containing material can be red mud.

For example, the aluminum-containing material can be chosen from industrial refractory materials.

For example, the aluminum-containing material chosen from aluminosilicate minerals.

For example, the processes can be effective for avoiding producing red mud.

For example, the obtained alumina and the other products are substantially free of red mud.

For example, HCl can be recycled. For example, such a recycled HCl can be concentrated and/or purified.

For example, the recovered HCl can gaseous HCl and can be treated with $H_2SO_4$ so as to reduce the amount of water present in the gaseous HCl.

For example, the recovered HCl can be gaseous HCl and can be passed through a packed column so as to be in contact with a $H_2SO_4$ countercurrent flow so as to reduce the amount of water present in the gaseous HCl.

For example, gaseous HCl can be concentrated and/or purified by means of $H_2SO_4$. For example, gaseous HCl can be passed through a packed column where it is contacted with a $H_2SO_4$ countercurrent flow. For example, by doing so, concentration of HCl can be increased by at least 50% wt., at least 60% wt., at least 70% wt., at least 75% wt., at least 80% wt., about 50% wt. to about 80% wt., about 55% wt. to about 75% wt., or about 60% wt. For example, the column can be packed with a polymer such as polypropylene (PP) or polytrimethylene terephthalate (PTT).

For example, gaseous HCl can be concentrated and/or purified by means of $CaCl_2$ or LiCl. For example, gaseous HCl can be passed through a column packed with $CaCl_2$ or LiCl. By doing, the amount of water can be reduced from HCl.

For example, the concentration of gaseous HCl is increased from a value below the azeotropic point before treatment to a value above the azeotropic point after treatment.

For example, once crystallized, the alkalis (mostly Na) can be processed so as to recovering highly concentrated hydrochloric acid (HCl). The process chosen for the conversion can generate value-added products commonly used in the chemical industry. For example, to produce bleaching agent from alkali, a sodium chloride brine solution can be fed to adapted small chlor-alkali electrolysis cells. It can be, for example, a two-step process in which the brine is submitted to high current and base (NaOH) is produced with chlorine ($Cl_2$) and hydrogen ($H_2$). $H_2$ and $Cl_2$ can then be submitted to a common flame where highly concentrated acid in gas phase is produced and can be used directly in the crystallization stages.

For example, the various products obtained by the processes of the present disclosure such as alumina, hematite, titanium oxides, magnesium oxides, rare earth elements and rare metals, etc can be further purified by means of a plasma torch. For example, they can be individually injected into a plasma torch so as to further purify them.

For example, the processes can further comprise converting alumina ($Al_2O_3$) into aluminum. Conversion of alumina into aluminum can be carried out, for example, by using the Hall-Heroult process. References is made to such a well known process in various patents and patent applications such as US 20100065435; US 20020056650; U.S. Pat. No. 5,876,584; U.S. Pat. No. 6,565,733. Conversion can also be carried out by means of other methods such as those described in U.S. Pat. No. 7,867,373; U.S. Pat. No. 4,265,716; U.S. Pat. No. 6,565,733 (converting alumina into aluminum sulfide followed by the conversion of aluminum sulfide into aluminum). For example, aluminium can be produced by using a reduction environment and carbon at temperature below 200° C. Aluminum can also be produced by reduction using potassium and anhydrous aluminum chloride (Wohler Process). For example, wherein the conversion of $Al_2O_3$ into aluminum can be carried out by converting $Al_2O_3$ into $Al_2S_3$ and then converting $Al_2S_3$ into aluminum.

For example, the process can comprise reacting the leachate with gaseous HCl so as to obtain a liquid and a precipitate comprising $MgCl_2$.

For example, the process comprises reacting the leachate with gaseous HCl so as to obtain a liquid and a precipitate comprising $MgCl_2$.

For example, NaCl recovered from the processes of the present disclosure can be reacted with $SO_2$, so as to produce HCl and $Na_2SO_4$. Such a reaction that is an exothermic reaction can generate steam that can be used to activate a turbine and eventually produce electricity.

For example, the solid can comprise $TiO_2$ and $SiO_2$ and the solid can be treated with $Cl_2$ and carbon in order to obtain a liquid portion and a solid portion, and wherein the solid portion and the liquid portion are separated from one another.

For example, the at least one metal can comprise a first metal that is chosen from aluminum, iron, zinc, copper, gold, silver, molybdenum, cobalt, magnesium, lithium, manganese, nickel, palladium, platinum, thorium, phosphorus, uranium and titanium, and/or at least one rare earth element and/or at least one rare metal.

For example, the first metal can be aluminum.

For example, the process can comprise reacting the first leachate with gaseous HCl so as to obtain the liquid and the precipitate comprising aluminum ions, the precipitate being formed by crystallization of $AlCl_3.6H_2O$.

For example, the process can comprise reacting the first leachate with dry gaseous HCl so as to obtain the liquid and the precipitate comprising aluminum ions, the precipitate being formed by crystallization of $AlCl_3.6H_2O$.

For example, the first leachate can comprise Al ions and/or Fe ions.

For example, the Al ions can be substantially selectively precipitated from the first leachate under the form of $AlCl_3.6H_2O$.

For example, the Al ions can be substantially selectively precipitated from the first leachate under the form of $AlCl_3.6H_2O$.

For example, the Fe ions can be substantially selectively extracted by converting them into $Fe_2O_3$ via an hydrolysis.

For example, the solid can comprise $TiO_2$ and $SiO_2$ and the solid is treated with $Cl_2$ and carbon in order to obtain a liquid portion comprising titanium chloride and a solid portion, and wherein the solid portion and the liquid portion are separated from one another.

For example, comprising heating titanium chloride so as to convert it into $TiO_2$.

According to one example as shown in FIG. 1, the processes can involve the following steps (the reference numbers in FIG. 1 correspond to the following steps):

1—The aluminum-containing material is reduced to an average particle size of about 50 to about 80 μm.

2—The reduced and classified material is treated with hydrochloric acid which allows for dissolving, under a predetermined temperature and pressure, the aluminum with other elements like iron, magnesium and other metals including rare earth elements and/or rare metals. The silica and titanium (if present in raw material) remain totally undissolved.

3—The mother liquor from the leaching step then undergoes a separation, a cleaning stage in order to separate the purified silica from the metal chloride in solution. The purified silica can then optionally undergo one or two additional leaching stages (for example at a temperature of about 150 to about 160° C.) so as to increase the purity of silica above 99.9%. $TiO_2$ contained in silica can be separated from silica through a leach made by using HCl and $MgCl_2$ as a lixiviant composition.

4—The spent acid (leachate) obtained from step 1 is then brought up in concentration with dry and highly concentrated gaseous hydrogen chloride by sparging this one into a crystallizer. This results into the crystallization of aluminum chloride hexahydrate (precipitate) with a minimum of other impurities. Depending on the concentration of iron chloride at this stage, further crystallization step(s) can be required. The precipitate is then separated from the liquid. For example, particle size of crystals can be about 100 to about 500 microns, about 200 to about 400 microns, or about 200 to about 300 microns. Alternatively, particle size of crystals can be about 100 to about 200 microns, about 300 to about 400 microns or about 400 to 500 microns.

5—The aluminum chloride hexahydrate is then calcined (for example by means of a rotary kiln, fluid bed, etc) at high temperature in order to obtain the alumina form. Highly concentrated gaseous hydrogen chloride is then recovered and excess is brought in aqueous form to the highest concentration possible so as to be used (recycled) in the acid leaching step. Acid can also be directly sent in gas phase to the acid purification stage to increase HCl concentration from about 30 wt % to about 95 wt %. This can be done, for example, during drying stage.

6—Iron chloride (the liquid obtained from step 4) is then pre-concentrated and hydrolyzed at low temperature in view of the $Fe_2O_3$ (hematite form) extraction and acid recovery from its hydrolysis. All heat recovery from the calcination step (step 5), the leaching part exothermic reaction (step 1) and other section of the processes is being recovered into the pre-concentrator.

10—After the removal of hematite, a solution rich in rare earth elements and/or rare metals can be processed. As it can be seen in FIG. 3, an internal recirculation can be done (after the removal of hematite) and the solution rich in rare earth elements and/or rare metals can be used for crystallization stage 4. Extraction of the rare earth elements and/or rare metals can be done as described in PCT/CA2012/000253 and/or PCT/CA2012000419. These two documents are hereby integrated by reference in their entirety.

Other non-hydrolysable metal chlorides (Me-Cl) such as $MgCl_2$ and others then undergo the following steps:

7—The solution rich in magnesium chloride and other non-hydrolysable products at low temperature is then brought up in concentration with dry and highly concentrated gaseous hydrogen chloride by sparging it into a crystallizer. This results into the precipitation of magnesium chloride as an hexahydrate, for example after sodium and potassium chloride removal.

8—Magnesium chloride hexahydrate is then calcined (either through a rotary kiln, fluid bed, etc.) and hydrochloric acid at very high concentration is thus regenerated and brought back to the leaching step.

9—Other Me-Cl undergo a standard pyrohydrolysis step where mixed oxides (Me-O) can be produced and hydrochloric acid at the azeotropic point (20.2% wt.) is regenerated.

NaCl can undergo chemical reaction with $H_2SO_4$ to produce $Na_2SO_4$ and HCl at a concentration at or above azeotropic concentration. Moreover, KCl can undergo chemical reaction with $H_2SO_4$ to produce $K_2SO_4$ and HCl having a concentration that is above the azeotropic concentration. Sodium and potassium chloride brine solution can be the feed material to adapted small chlor-alkali electrolysis cells. In this latter case, common bases (NaOH and KOH) and bleach (NaOCl and KOCl) are produced as well as HCl.

For example, the liquid can be concentrated to a concentrated liquid having an iron chloride concentration of at least 30% by weight; and then the iron chloride can be hydrolyzed at a temperature of about 155 to about 350° C. while maintaining a ferric chloride concentration at a level of at least 65% by weight, to generate a composition comprising a liquid and precipitated hematite, and recovering the hematite.

For example, the liquid can be concentrated to a concentrated liquid having an iron chloride concentration of at least 30% by weight; and then the iron chloride can be hydrolyzed at a temperature of about 155 to about 350° C. while maintaining a ferric chloride concentration at a level of at least 65% by weight, to generate a composition comprising a liquid and precipitated hematite; recovering the hematite; and recovering rare earth elements and/or rare metals from the liquid. For example, the process can further comprise, after recovery of the rare earth elements and/or rare metals, reacting the liquid with HCl so as to cause precipitation of $MgCl_2$, and recovering same.

However, the person skilled in the art will understand that the continuous processes can handle high percentages of silica (>55%) and impurities as well as relatively low percentages of aluminum (for example as low as about 15%) and still being economically and technically viable. Satisfactory yields can be obtained (>93-95%) on $Al_2O_3$ and greater than 75%, 85 or 90% on rare earth elements and/or rare metals. No pre-thermal treatment in most cases are required. The processes disclosed in the present disclosure can involve special techniques on leaching and acid recovery at very high strength, thereby offering several advantages over alkaline processes.

In step 1 the material to be treated, whether or not thermally treated is crushed, milled, dried and classified to have an average particle size of about 50 to about 80 μm.

In step 2. the milled material is introduced into the reactor and will undergo the leaching phase.

The leaching hydrochloric acid used in step 2 can be a recycled or regenerated acid from steps 5, 6, 8, 9, 10 and 11 (see FIG. 3) its concentration can vary from 15% to 45% weight. percent. Higher concentration can be obtained using membrane separation, cryogenic and/or high pressure approach. The acid leaching can be carried out under pressure and at temperature close to its boiling point thus, allowing a minimal digestion time and extended reaction extent (90%-100%), Leaching (step 2) can be accomplished in a semi-continuous mode where spent acid with residual free hydrochloric acid is replaced by highly concentrated acid at a certain stage of the reaction or allowing a reduced acid/mineral ratio, thereby reducing reaction time and improving reaction kinetics. For example, kinetic constant k can be: 0.5-0.75 g/mole·L. For example, leaching can be continuous leaching.

As previously indicated, alkali metals, iron, magnesium, sodium, calcium, potassium, rare earth elements and other elements will also be in a chloride form at different stages. Silica and optionally titanium can remain undissolved and will undergo (step 3) a liquid/solid separation and cleaning stage. The processes of the present disclosure tend to recover maximum amount of free hydrochloric acid left and chlorides in solution in order to maximize hydrochloric acid recovery yield, using techniques such as rake classifying, filtration with band filters, high pressure, rotofilters centrifugation, and others. Pure $SiO_2$ (one additional leaching stage) cleaning with nano water purity 99% min. Mother liquor free of silica is then named as spent acid (various metal chlorides and water) and goes to the crystallization step (step 4). Free HCl and chlorides recovery can be at least 99, 99.5, 99.9 or 99.99%.

In step 4, the spent acid (or leachate) with a substantial amount of aluminum chloride is then saturated with dry and highly concentrated gaseous hydrogen chloride obtained or recycled from step 5 or with aqueous HCl >30% wt., which results in the precipitate of aluminum chloride hexahydrate ($AlCl_3.6H_2O$). The precipitate retained is then washed and filtered or centrifuged before being fed to the calcination stage (step 5). The remaining of the spent acid from step 4 is then processed to acid recovery system (steps 6 to 8) where pure secondary products will be obtained.

In step 5, aluminum oxide (alumina) is directly obtained from high temperature conditions. The highly concentrated hydrogen chloride in gaseous form obtained can be fed to steps 4 and 7 for crystallization where it can be treated through hydrophobic membranes. The excess hydrogen chloride is absorbed and used as regenerated acid to the leaching step 2 as highly concentrated acid, higher than the concentration at the azeotropic point (>20.2%). For example, such a concentration can be about 18 to about 45 weight %, about 25 to about 45 weight % or between 25 and 36 weight %. Acid can also be redirected in gas phase directly (>30 wt %) to acid purification.

After step 4, various chlorides derivatives (mainly iron with magnesium and rare earth elements and rare metals) are next subjected to an iron extraction step. Such a step can be carried out for example by using the technology disclosed in WO 2009/153321, which is hereby incorporated by reference in its entirety. Moreover, hematite can be seeded for crystal growth. For example, hematite seeding can comprise recirculating the seeding.

In step 6, a hydrolysis at low temperature (155-350° C.) is carried out and pure $Fe_2O_3$ (hematite) is being produced and hydrochloric acid of at least 15% concentration is being regenerated. The method as described in WO 2009/153321 is processing the solution of ferrous chloride and ferric chloride, possible mixtures thereof, and free hydrochloric acid through a series of steps pre-concentration step, oxidation step where ferrous chloride is oxidized into ferric form, and finally through an hydrolysis step into an operational unit called hydrolyser where the ferric chloride concentration is maintained at 65 weight % to generate a rich gas stream where concentration ensures a hydrogen chloride concentration of 15-20.2% and a pure hematite that will undergo a physical separation step. Latent heat of condensation is recovered to the pre-concentration and used as the heating input with excess heat from the calcination stage (step 5).

The mother liquor from the hydrolyser (step 6) can be recirculated partially to first step crystallization process where an increase in concentration of non-hydrolysable elements is observed. After iron removal, the liquor is rich in other non-hydrolysable elements and mainly comprises magnesium chloride or possible mixture of other elements (various chlorides) and rare earth elements and rare metals that are, for example, still in the form of chlorides.

Rare earth elements and rare metals in form of chlorides are highly concentrated in percentage into the hydrolyser operational unit (step 6) and are extracted from the mother liquor (step 10) where various known techniques can be employed to extract a series of individual RE-O (rare earth oxides). Among others, the processes of the present disclosure allows to concentrate to high concentration the following elements, within the hydrolyser: scandium (Sc), galium (Ga), yttrium (Y), dysperosium (Dy), cerium (Ce), praseodynium (Pr), neodynium (Nd), europium (Eu), lanthanum (La), samarium (Sm), gadolinium, (Gd), erbium (Er), zirconium (Zr) and mixtures of thereof. Technologies that can be used for extracting rare earth elements and/or rare metals can be found, for example, in Zhou et al. in RARE METALS, Vol. 27, No. 3, 2008, p 223-227, and in US 2004/0042945, hereby incorporated by reference in their entirety. The person skilled in the art will also understand that various other processes normally used for extracting rare earth elements and/or rare metals from the Bayer process can also be used. For example, various solvent extraction techniques can be used. For certain elements, a technique involving octylphenyl acid phosphate (OPAP) and toluene can be used. HCl can be used as a stripping agent. This can be effective for recovering $Ce_2O_3$, $Sc_2O_3$, $Er_2O_3$ etc. For example, different sequence using oxalic acid and metallic iron for ferric chloride separation can be used.

The spent acid liquor from steps 6 and 10 rich in value added metals, mainly magnesium, is processed to step 7. The solution is saturated with dry and highly concentrated gaseous hydrogen chloride from step 5, which results in the precipitation of magnesium chloride hexahydrate. For example, same can be accomplished with HCl in aqueous form over 30% wt. The precipitate retained, is fed to a calcination stage step 8 where pure MgO (>98% wt.) is obtained and highly concentrated hydrochloric acid (for example of at least 38%) is regenerated and diverted to the leaching step (step 2). An alternative route for step 7 is using dry gaseous hydrochloric acid from step 8.

In step 9, metal chlorides unconverted are processed to a pyrohydrolysis step (700-900° C.) to generate mixed oxides and where hydrochloric acid from 15-20.2% wt. concentration can be recovered.

Figure 3:
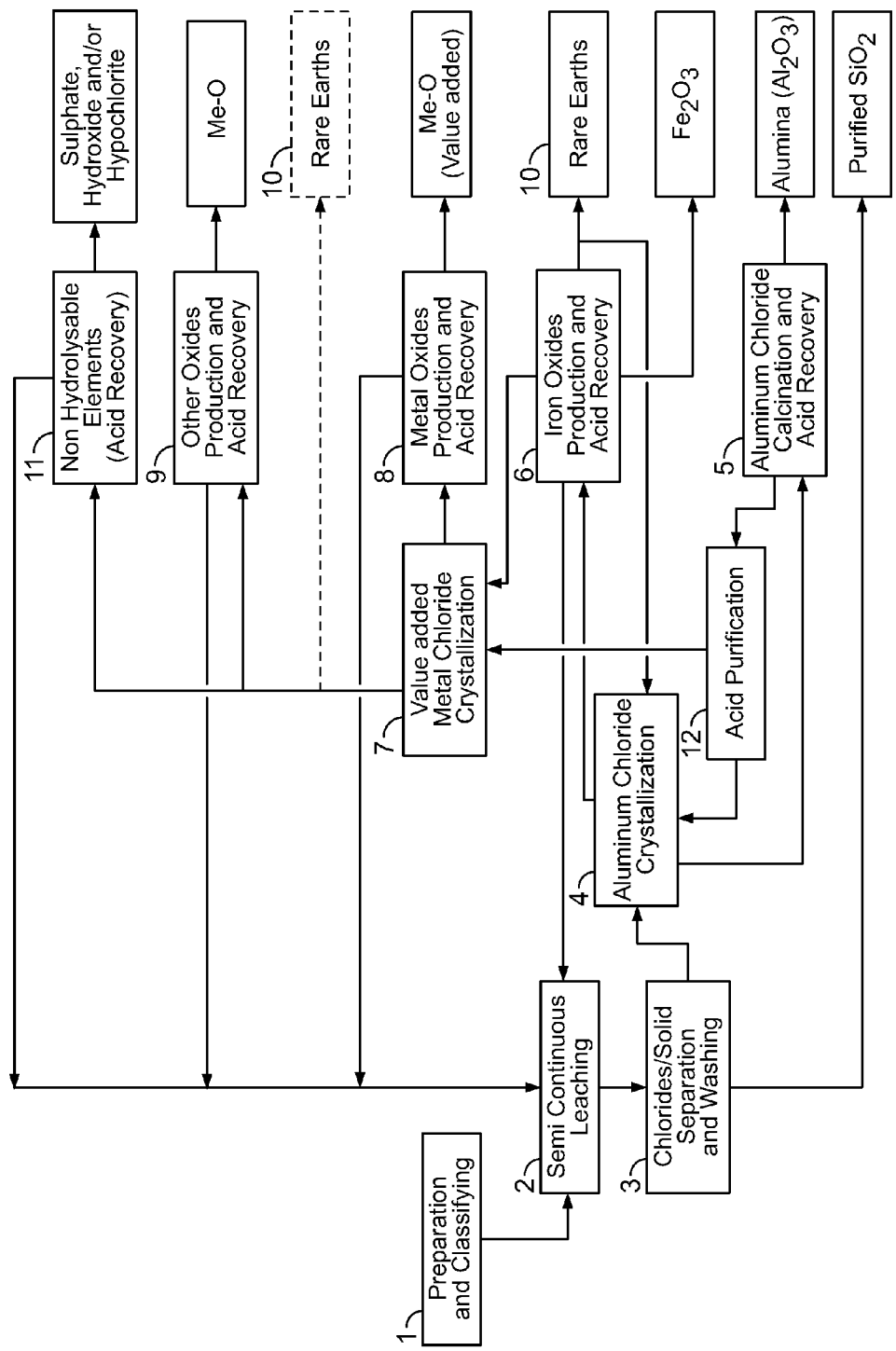
FIG. 3 shows a bloc diagram of another example of process for preparing alumina and various other products according to the present disclosure.

According to another example as shown in FIG. 3, the processes can be similar to the example shown in FIG. 1 but can comprise some variants as below discussed.

In fact, as shown in FIG. 3, the processes can comprise (after step 6 or just before step 10) an internal recirculation back to the crystallization step 4. In such a case, The mother liquor from the hydrolyser (step 6) can be recirculated fully or partially to the crystallization of step 4 where a concentration increase will occur with respect to the non-hydrolysable elements including rare earth elements and/or rare metals.

Such a step can be useful for significantly increasing the concentration of rare earth elements and/or rare metals, thereby facilitating their extraction in step 10.

With respect to step 7, the solution rich in magnesium chloride and other non-hydrolysable products at low temperature is, as previously discussed, then brought up in concentration with dry and highly concentrated gaseous hydrogen chloride by sparging it into a crystallizer. This can result into the precipitation of magnesium chloride as an hexahydrate (for example after sodium and potassium chloride removal). This can also be accomplished with HCl in aqueous form.

As shown in FIG. 3, an extra step 11 can be added. Sodium chloride can undergo a chemical reaction with sulfuric acid so as to obtain sodium sulfate and regenerate hydrochloric acid at a concentration at or above the azeotropic point. Potassium chloride can undergo a chemical reaction with sulfuric acid so as to obtain potassium sulfate and regenerate hydrochloric acid at a concentration above the azeotropic concentration. Sodium and potassium chloride brine solution can be the feed material to adapted small chlor-alkali electrolysis cells In this latter case, common bases (NaOH and KOH) and bleach (NaOCl and KOCl) are produced and can be reused to some extent in other areas of the processes of the present disclosure (scrubber, etc.).

Figure 8:
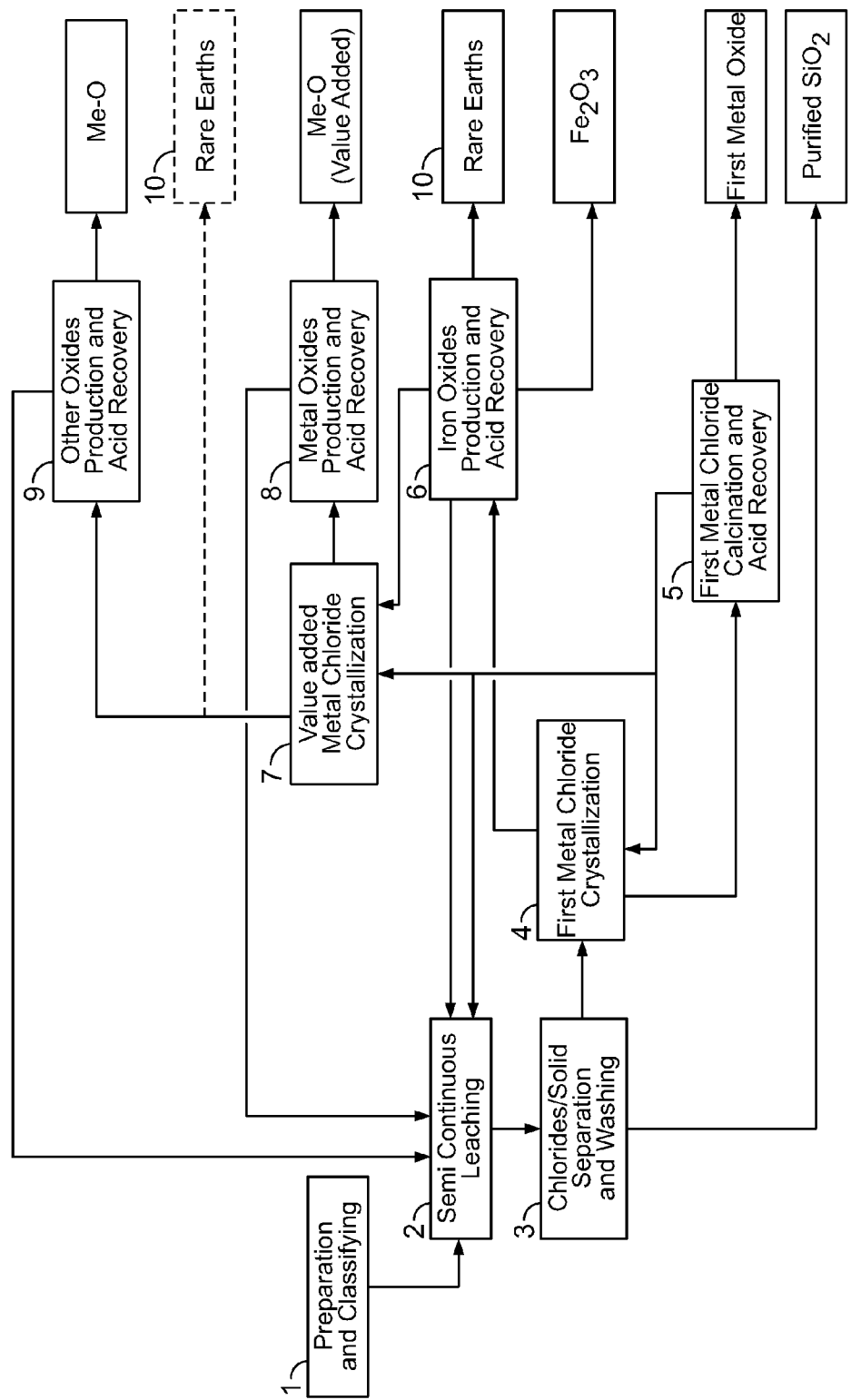
FIG. 8 shows another bloc diagram of an example of process for preparing various products according to the present disclosure.

The process of FIG. 8 is also similar to the process of FIG. 1. The differences between the two processes reside steps 4 and 5. In fact, in steps 4 and 5 of the process of FIG. 8, different metals can be converted into a chloride and crystallized (step 4 of FIG. 8) and converted into an oxide by means of a calcination (step 5 of FIG. 8). The person skilled in the art will thus understand that depending on the composition of the material to be treated and the conditions of the leaching stage, different metals can thus be crystallized (step 4 of FIG. 6) and go through a calcination stage (step 5 of FIG. 8).

The following are non-limitative examples.

Example 1

Preparation of Alumina and Various Other Products

As a starting material a sample of clay was obtained from the Grande Vallée area in Quebec, Canada.

These results represent an average of 80 tests carried out from samples of about 900 kg each.

Crude clay in the freshly mined state after grinding and classification had the following composition:
$Al_2O_3$: 15%-26%;
$SiO_2$: 45%-50%;
$Fe_2O_3$: 8%-9%;
MgO: 1%-2%;
Rare earth elements and/or rare metals: 0.04%-0.07%;
LOI: 5%-10%.

This material is thereafter leached in a two-stage procedure at 140-170° C. with 18-32 weight % HCl. The HCl solution was used in a stoichiometric excess of 10-20% based on the stoichiometric quantity required for the removal of the acid leachable constituents of the clay. In the first leaching stage of the semi-continuous operation (step 2), the clay was contacted for 2.5 hours with required amount or certain proportion of the total amount of hydrochloric acid. After removal of the spent acid, the clay was contacted again with a minimum 18 weight % hydrochloric acid solution for about 1.5 hour at same temperature and pressure.

Figure 2:
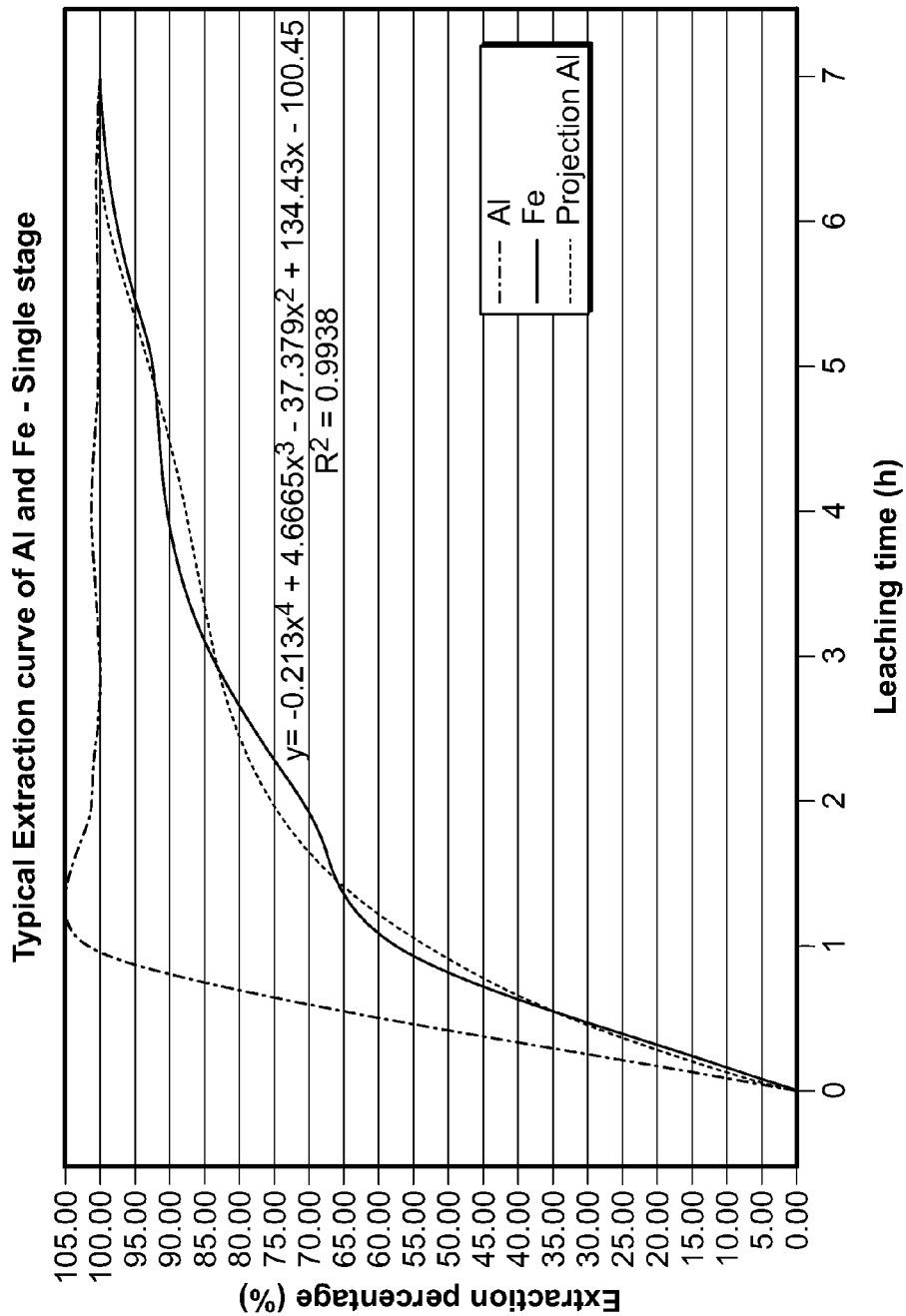
FIG. 2 is an extraction curve for Al and Fe in which the extraction percentage is expressed as a function of a leaching time in a process according to an example of the present application.

A typical extraction curve obtained for both iron and aluminum for a single stage leaching is shown in FIG. 2.

The leachate was filtered and the solid was washed with water and analyzed using conventional analysis techniques (see step 3 of FIG. 1). Purity of obtained silica was of 95.4% and it was free of any chlorides and of HCl.

In another example, the purity of the silica was 99.67% through an extra leaching step.

After the leaching and silica removal, the concentration of the various metal chlorides was:
$AlCl_3$: 15-20%;
$FeCl_2$: 4-6%;
$FeCl_3$: 0.5-2.0%;
$MgCl_2$: 0.5-2.0%;
REE-Cl: 0.1-2%
Free HCl: 5-50 g/l Spent acid was then crystallized using about 90 to about 98% pure dry hydrochloric acid in gas phase in two stages with less than 25 ppm iron in the aluminum chloride hexahydrate formed. The concentration of HCl in solution (aqueous phase) was about 22 to about 32% or 25 to about 32%, allowing 95.3% of $Al_2O_3$ recovery. The recovered crystallized material (hydrate form of $AlCl_3$ having a minimum purity of 99.8%) was then calcined at 930° C. or 1250° C., thus obtaining the α form of the alumina. Heating at 930° C. allows for obtaining the beta-form of alumina while heating at 1250° C. allows for obtaining the alpha-form.

Another example was carried out at low temperature (decomposition and calcination at about 350° C.) and the α form of the alumina was less than 2%.

HCl concentration in gas phase exiting the calcination stage was having a concentration greater than 30% and was used (recycled) for crystallization of the $AlCl_3$ and $MgCl_2$. Excess of hydrochloric acid is absorbed at the required and targeted concentration for the leaching steps.

Iron chloride (about 90-95% in ferric form) is then sent to a hydrothermal process in view of its extraction as pure hematite ($Fe_2O_3$). This can be done by using the technology described in WO 2009/153321 of low temperature hydrolysis with full heat recovery from calcining, pyrohydrolysis and leaching stage.

Rare earth elements and rare metals are extracted from the mother liquor of the hydrolyzer where silica, aluminum, iron and a great portion of water have been removed and following preconcentration from hydrolyser to crystallization. It was observed that rare earth elements can be concentrated by a factor of about 4.0 to 10.0 on average within the hydrolyzer itself on a single pass through it i.e. without concentration loop. The following concentration factors have been noted within the hydrolyzer (single pass):

Ce>6
La>9
Nd>7
Y>9

Remaining magnesium chloride is sparged with dry and highly concentrated hydrochloric acid and then calcinated to MgO while recovering high concentration acid (for example up to 38.4%).

Mixed oxides (Me-O) containing other non-hydrolysable components were then undergoing a pyrohydrolysis reaction at 700-800° C. and recovered acid (15-20.2% wt.) was rerouted for example to the leaching system.
Overall Yields Obtained:
$Al_2O_3$: 93.0-95.03% recovery;
$Fe_2O_3$: 92.65-99.5% recovery;
Rare earth elements: 95% minimum recovery (mixture);
MgO: 92.64-98.00% recovery;
Material discarded: 0-5% maximum;
HCl global recovery: 99.75% minimum;
HCl strength as feed to leaching 15-32% (aqueous); 95% (gas)
Red mud production: none.

Example 2

Preparation of Alumina and Various Other Products

A similar feed material (bauxite instead of clay) was processed as per in example 1 up to the leaching stage and revealed to be easily leachable under the conditions established in example 1. It provided an extraction percentage of 100% for the iron and over 90-95% for aluminum. The technology was found to be economically viable and no harmful by-products (red mud) were generated. Samples tested had various concentrations of $Al_2O_3$ (up to 51%), $Fe_2O_3$ (up to 27%) and MgO (up to 1.5%). Gallium extraction of 97.0% was observed. Scandium extraction was 95%.

Example 3

Figure 4:
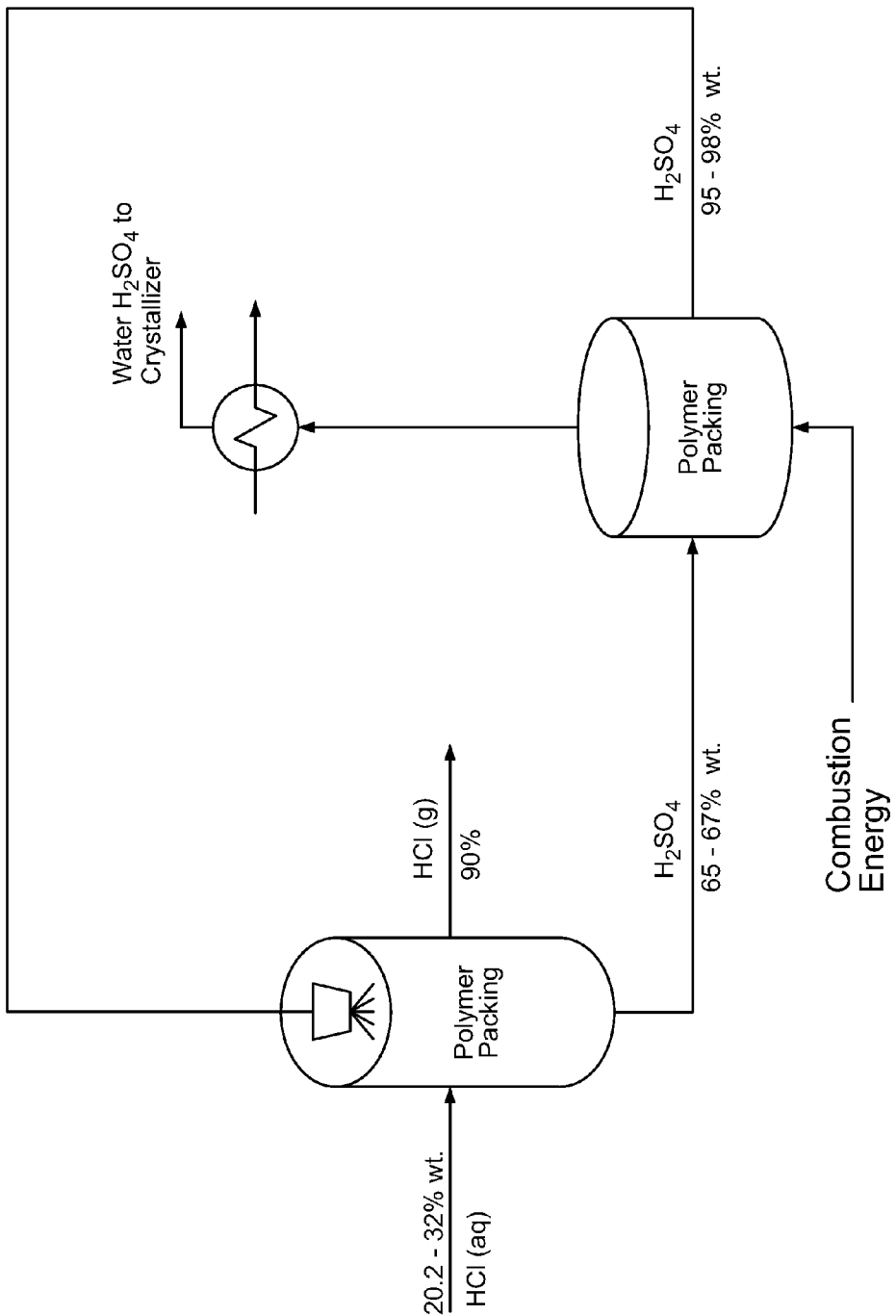
FIG. 4 is a schematic representation of an example of a process for purifying/concentrating HCl according to the present disclosure.

HCl Gas Enrichment and Purification: $H_2SO_4$ Route $H_2SO_4$ can be used for carrying out purification of HCl. It can be carried out by using a packing column with $H_2SO_4$ flowing counter currently (see FIG. 4). This allows for converting the recovered HCl into HCl having a concentration above the azeotropic point (20.1% wt) and increase its concentration by about 60 to about 70% at minimum.

Water is absorbed by $H_2SO_4$ and then $H_2SO_4$ regeneration is applied where $H_2SO_4$ is brought back to a concentration of about 95 to about 98% wt. Water release at this stage free of sulphur is recycled back and used for crystallization dissolution, etc. Packing of the column can comprise polypropylene or polytrimethylene terephthalate (PTT).

Combustion energy can be performed with off gas preheating air and oxygen enrichment. Oxygen enrichment: +2% represents flame temperature increase by: 400° C. maximum.

Example 4

HCl Gas Enrichment and Purification: Calcium Chloride to Calcium Chloride Hexahydrate (Absorption/Desorption Process)

Figure 5:
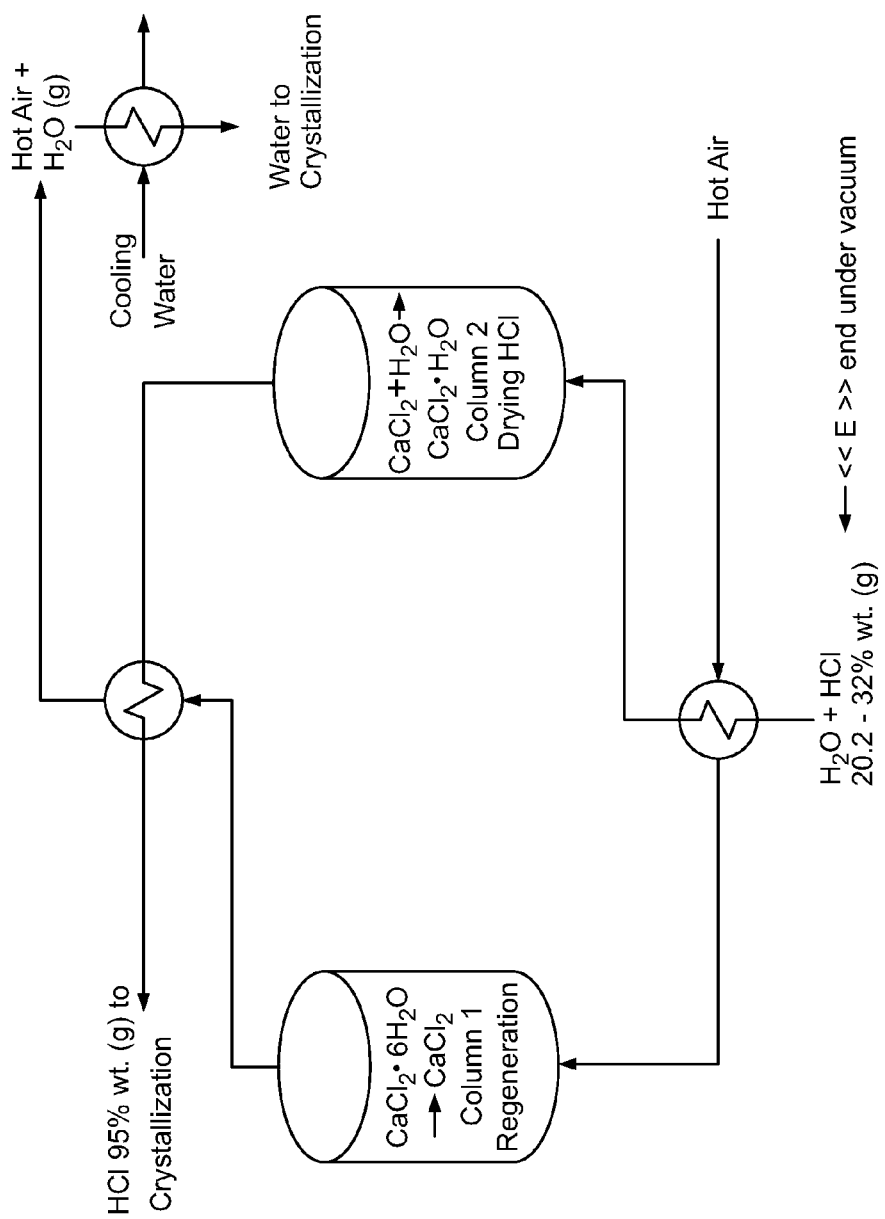
FIG. 5 is a schematic representation of an example of a process for purifying/concentrating HCl according to the present disclosure.

As shown in FIG. 5, $CaCl_2$ can be used for drying HCl. In fact, $CaCl_2$ can be used for absorbing water contained into HCl. In such a case, $CaCl_2$ is converted into its hexachloride form ($CaCl_2.H_2O$) and one saturated system is eventually switched into regeneration mode where hot air recovered from calcination off gas of alumina and magnesium oxide spray roasting is introduced to regenerate the fixed bed. Alternatively, other absorbing agent such as LiCl can be used instead of $CaCl_2$. Such an ion/exchange type process can be seen in FIG. 4 and the cycle can be inversed to switch from one column to another one.

The person skilled in the art would understand that the processes described in examples 3 and 4 can be used in various different manners. For example, these processes can be combined with the various processes presented in the present disclosure. For example, such purifications techniques can be integrated to the processes shown in FIGS. 1, 3, 6 to 8, 10A, 10B, 11A and 11B. For example, these techniques can be used downstream of at least one of step chosen from steps 5, 6, 8, 9, 10 and 11 (see FIGS. 1 and 3). They can also be used downstream of step 4 and/or step 7. They can also be used downstream of at least one of step chosen from steps 104 to 111 (see FIG. 6)

Example 5

Preparation of Alumina and Various Other Products

Figure 6:
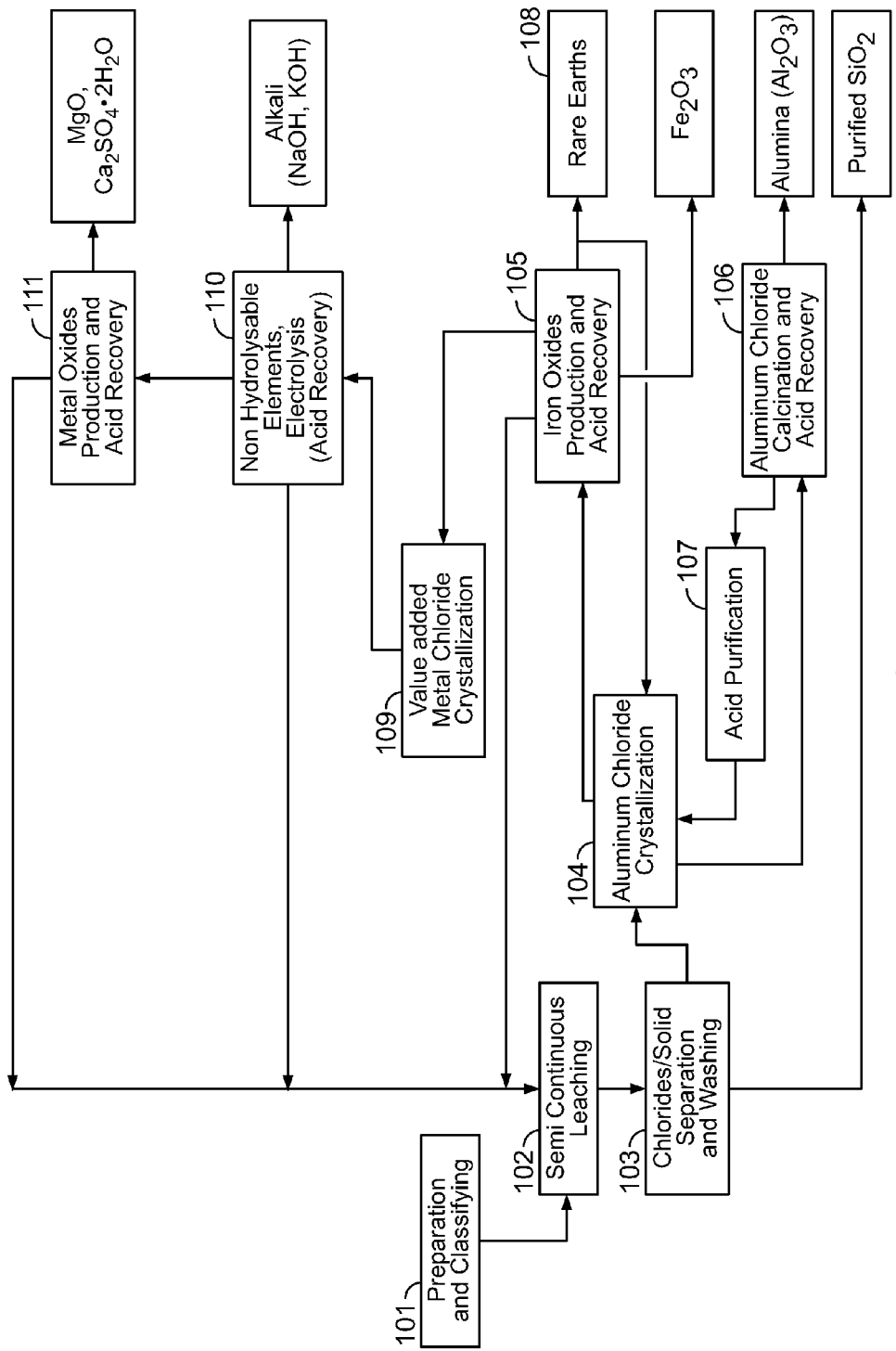
FIG. 6 shows another bloc diagram of an example of process for preparing alumina and various other products according to the present disclosure.
Figure 7:
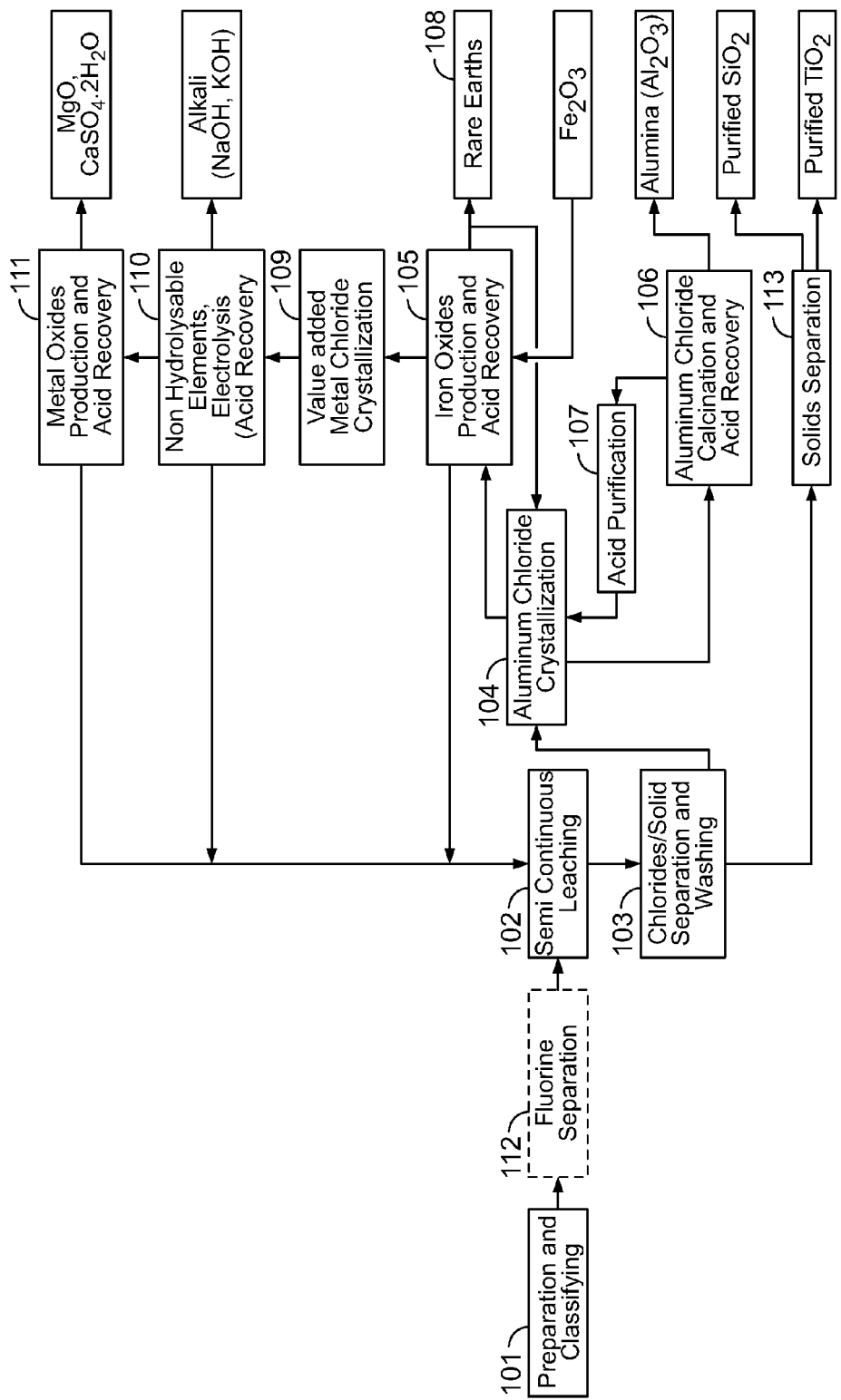
FIG. 7 shows another bloc diagram of an example of process for preparing alumina and various other products according to the present disclosure.

This example was carried out by using a process as represented in FIGS. 6 and 7. It should be noted that the processes represented in FIGS. 6 and 7 differ only by the fact that FIG. 7 show to additional stages i.e. stages 112 and 113.
Raw Material Preparation Raw material, clay for example, was processed in a secondary crusher in the clay preparation plant 101. Dry milling and classifying occurs on a dry basis in vertical roller mills (for example Fuller-Loesche LM 30.41). The clay preparation 101 included three roller mills; two running at a capacity of approximately 160-180 tph and one on standby. Raw material, if required, can be reduced to 85% less than 63 microns. Processed material was then stored in homogenization silos before being fed to the acid leaching plant 102. Below in Table 1 are shown results obtained during stage 101. If the ore contains the fluorine element, a special treatment can be applied before carrying out the 102 stage. In presence of hydrochloric acid, fluorine can produce hydrofluoric acid. This acid is extremely corrosive and damaging for human health. Thus, before leaching 102, an optional treatment fluorine separation 112 can be done. Stage 112 can comprise treating the processed material coming from stage 101 with an acid in a pre-leaching treatment so as to remove hydrofluoric acid. Therefore, depending on the composition of the raw material, a fluorine separation stage 112 (or pre-leaching stage 112) can be carried out.

TABLE 1

Clay preparation

| | | |
|---|---|---|
| Rate | 290 tph | |
| Composition feed (main constituents) | $SiO_2$: | 50.9% |
| | $Al_2O_3$: | 24.0% |
| | $Fe_2O_3$: | 8.51% |
| | CaO: | 0.48% |
| | MgO: | 1.33% |
| | $Na_2O$: | 1.06% |
| | $K_2O$: | 2.86% |
| | MnO: | 0.16% |
| | $Cr_2O_3$: | 0.01% |
| | $TiO_2$: | 0.85% |
| | $P_2O_5$: | 0.145% |
| | SrO: | 0.015% |
| | BaO: | 0.05% |
| | $V_2O_5$ | 0.0321% |
| | Other (including $H_2O$ and REE): | 9.63% |
| Obtained particle size | 85% < 63 μm | |
| Residual moisture | 0.5-0.7% | |
| Yield | 99.5% min | |

Acid Leaching

Next, acid leaching 102 was performed semi-continuously in an 80 m³ glass-lined reactor. Semi-continuous mode comprises replacing reacted acid 1/3 in the reaction period with higher concentration regenerated acid, which greatly improves reaction kinetics. The reactor arrangement comprises for example, a series of three reactors. Other examples have been carried out with a first leaching at 1 atm was carried out and then, a second and third semi-continuous or continuous leaching was carried out with aqueous or gaseous HCl.

Leaching was performed at high temperature and pressure (about 160 to about 195° C. and pressures of about 5 to about 8 barg) for a fixed period of time. Reaction time was a function of the reaction extent targeted (98% for $Al_2O_3$), leaching mode, acid strength, and temperature/pressure applied.

Spent acid recovered out of the acid leaching 102 was then filtered 103 from unreacted silica and titanium dioxide and washed through an automated filter press where all free HCl and chloride are recovered. This allows, for example, a maximum quantity of about 30 ppm $SiO_2$ going into spent liquor. Cleaned silica at a concentration of $\approx$96%+$SiO_2$ is then produced. Various options are possible at that point. For example, the 96% silica can undergo final neutralization through caustic bath, cleaning, and then bricketing before storage. According to another example, the silica purified by adding another leaching step followed by a solid separation step that ensures $TiO_2$ removal (see stage 113 in FIG. 7). In that specific case, high purity silica 99.5%+ is produced. In stage 113, titanium and silicium can be separated from one another in various manners. For example, the solid obtained from stage 103 can be leached in the presence of $MgCl_2$ at a temperature below 90 or 80° C. and at low acid concentration. For example, acid concentration can be below 25 or 20%. The acid can be HCl or $H_2SO_4$. In such a case, titanium remains soluble after such a leaching while titanium is still in a solid form. These solid and liquid obtained after stage 113 are thus separated to provide eventually $TiO_2$ and $SiO_2$. Water input and flow for silica cleaning is in a ratio of 1:1 (silica/water) (150 t/h $SiO_2$/150 t/h $H_2O$), but comprises of wash water circulation in closed loop in the process and limited amount of process water for final cleaning of the silica and recovery of all chlorides and free HCl generated at the leaching stage. Below in Table 2 are shown results obtained during stage 102.

TABLE 2

Acid Leaching

| | | |
|---|---|---|
| Equivalent solid feed rate | 259.6 tph | |
| Operation mode | Semi-continuous | |
| Acid to clay ratio | 3.10 @ 23% wt (Equivalent to 3.35 with semi-continuous at 18.0% wt) | |
| Regenerated acid concentration | 18.0-32.0% | |
| Operating temperature | 150-155° C. (Pilot) 165-200° C. (Plant) | |
| MAWP | 120 psig | |
| Typical chemical reactions | $Fe_2O_3 + 6\ HCl \rightarrow 2\ FeCl_3 + 3H_2O$ $Al_2O_3 + 6\ HCl \rightarrow 2\ AlCl_3 + 3\ H_2O$ $MgO + 2\ HCl \rightarrow MgCl_2 + H_2O$ $K_2O + 2\ HCl \rightarrow 2\ KCl + H_2O$ $Re_2O_3 + 6\ HCl \rightarrow 2\ ReCl_3 + 3H_2O$ | |
| Spent acid flow to crystallization | 600-1100 m³/h | |
| Practical chemical composition after step 102 without solid ($SiO_2$) | $FeCl_3$ | 4.33% |
| | $FeCl_2$ | 0.19% |
| | $AlCl_3$ | 16.6% |
| | $MgCl_2$ | 0.82% |
| | NaCl | 1.1% |
| | KCl | 1.2% |
| | $CaCl_2$ | 0.26% |
| Extraction yields | Iron | 100% |
| | $Al_2O_3$ | 98% |
| $SiO_2$ Recovery | 99.997% | |
| Energy consumption | Activation energy only and self-sustained exothermic reaction from 130° C. | |

$AlCl_3 \cdot 6H_2O$ Crystallization

Spent acid, with an aluminum chloride content of about 20 to about 30%, was then processed in the crystallization stage 104. Dry and highly concentrated HCl (>90% wt.) in gas phase was sparged in a two-stage crystallization reactor, which allows the crystallization of aluminum chloride hexahydrate.

The flow rate of acid through these reactors is about 600 to about 675 m³/h and the reactor was maintained at about 50 to about 60° C. during this highly exothermic reaction. Heat was recovered and exchanged to the acid purification 107 part of the plant thus ensuring proper heat transfer and minimizing heat consumption of the plant. Aluminum chloride solubility decreases rapidly, compared to other elements, with the increase in concentration of free HCl in the crystallization reactor. The concentration of $AlCl_3$ for precipitation/crystallization was about 30%

The HCl concentration during crystallization was thus about 30 to about 32% wt.

The aqueous solution from the crystallization stage 104 was then submitted to the hydrothermal acid recovery plant 105, while the crystals are processed through the decomposition/calcination stage in the calcination plant 106.

A one-step crystallization stage or a multi-step crystallization stage can be done. For example, a two-steps crystallization stage can be carried out.

Below in Tables 3A and 3B are shown results obtained during stage 104.

TABLE 3A

Aluminum chloride crystallization

| | |
|---|---|
| Number of crystallization steps | 2 |
| Operating temperature | 50-60° C. |
| Sparging HCl concentration | 90% (gaseous) |
| Typical chemicals formed | $AlCl_3 \cdot 6H_2O$ (s) |
| | Metal chlorides (aq) |
| $AlCl_3 \cdot 6H_2O$ residual | <5% (practical); 8% |

TABLE 3B

Typical crystals composition main constituents obtained at pilot scale and feeding calcination

| Component | Weight distribution (%) |
|---|---|
| $AlCl_3 \cdot 6H_2O$ | 99.978 |
| $BaCl_2 \cdot 2H_2O$ | 0.0000 |
| $CaCl_2 \cdot 6H_2O$ | 0.0009 |
| $CrCl_4$ | 0.0022 |
| $CuCl_2 \cdot 2H_2O$ | 0.0000 |
| $FeCl_3 \cdot 6H_2O$ | 0.0019 |
| KCl | 0.0063 |
| $MgCl_2 \cdot 6H_2O$ | 0.0093 |
| $MnCl_2 \cdot 4H_2O$ | 0.0011 |
| NaCl | 0.0021 |
| $SiCl_4$ | 0.0004 |
| $SrCl_2 \cdot 6H_2O$ | 0.0000 |
| $TiCl_4$ | 0.0001 |
| $VCl_4$ | 0.0000 |
| Free $Cl^-$ | 0.0000 |

Calcination and Hydrothermal Acid Recovery

The calcination 106 comprises the use of a two-stage circulating fluid bed (CFB) with preheating systems. The preheating system can comprise a plasma torch to heat up steam to process. It processes crystals in the decomposition/calcination stage. The majority of the hydrochloric acid was released in the first stage which was operated at a temperature of about 350° C., while the second stage performs the calcination itself. Acid from both stages (about 66 to about 68% of the recovered acid from the processes) was then recovered and sent to either to the acid leaching 102 or to the acid purification 107. In the second reactor, which was operated at a temperature of about 930° C., acid was recovered through the condensation and absorption into two columns using mainly wash water from the acid leaching sector 102. Latent heat from this sector was recovered at the same time as large amounts of water, which limits net water input.

In the iron oxides productions and acid recovery 105 system, which comprises, aqueous solution from the crystallization 104 first undergoes a pre-concentration stage followed by processing in the hydrolyzer reactor. Here, hematite was produced during low temperature processing (about 165° C.). A recirculation loop was then taken from the hydrolyzer and is recirculated to the pre-concentrator, allowing the concentration of REE, Mg, K, and other elements. This recirculation loop, allows rare earth element chlorides and/or rare metal chlorides and various metal chlorides concentration to increase without having these products precipitating with hematite up to a certain extent.

Depending on acid balance in the plant, recovered acid is sent either directly to the 102 or 107 stage. Table 4 shows results obtained in stage 105.

TABLE 4

| Hydrothermal acid recovery | |
|---|---|
| Flowrate from crystallization to HARP | 592 m³/h (design) |
| | 600 m³/h (design) |
| Operating hydrolyser temperature | 155-170° C. |
| Regenerated acid concentration | 27.4% |
| Regenerated acid flowrate | 205.2 tph HCl |
| Hematite total production rate | 24 TPH (design) |
| HCl recovery | >99.8% |
| Reflux (recirculation loop) rate in between hydrolyzer and preconcentrator | 56 tph |
| Rare earth element chlorides and/or rare metal chlorides rate in recirculation loop | ≈12.8 t/h |
| Hematite quality obtained and/or projected | |
| $Fe_2O_3$ purity | >99.5% |
| Hydrolysable chlorides | <0.2% |
| Moisture | Max 20% after filtration |
| PSD | 25-35 microns |
| Density (bulk) | 2-3 kg/l |
| Typical chemical reaction in stage 105 | |
| $2FeCl_3 + 3H_2O \rightarrow Fe_2O_3 + 6\,HCl$ | |
| 155-170° C. | |

Table 5 shows results obtained in stage 106.

TABLE 5

| Calcination Plant 106 | |
|---|---|
| Process characteristics: | Two-stage circulating fluid bed (CFB) with pre-heating system |
| | Two-stage hydrochloric acid regeneration |
| Production rate (practical) | About 66 tph |
| CFB feed rate | 371 tph @ 2-3% humidity* |
| Typical chemical reaction occurring | |
| $2(AlCl_3 \cdot 6\,H_2O) + Energy \rightarrow Al_2O_3 + 6\,HCl + 9H_2O$ | |
| Typical alumina chemical composition obtained from aluminum chloride hexahydrate crystals being fed to calcination | |

| Component | Weight distribution (%) |
|---|---|
| $Al_2O_3$ | 99.938 |
| $Fe_2O_3$ | 0.0033 |
| $SiO_2$ | 0.0032 |
| $Cr_2O_3$ | 0.0063 |
| $V_2O_5$ | 0.0077 |
| Na | 0.0190 |
| MgO | 0.0090 |
| $P_2O_5$ | 0.0039 |
| K | 0.0053 |
| Ca | 0.0020 |
| MnO | 0.0002 |
| Free $Cl^-$ | Undetectable |

Rare Earth Elements and Rare Metals Extractions

The stream that was taken out of 105 recirculation then was treated for rare earth elements and are metals extraction 108, in which the reduction of the remaining iron back to iron 2 ($Fe^{2+}$), followed by a series of solvent extraction stages, was performed. The reactants were oxalic acid, NaOH, DEHPA (Di-(2-ethylhexyl)phosphoric acid) and TBP (tri-n-butyl phosphate) organic solution, kerosene, and HCl were used to convert rare earth element chlorides and rare metals chlorides to hydroxides. Countercurrent organic solvent with stripping of solution using HCl before proceeding to specific calcination from the rare earth elements and rare metals in form of hydroxide and conversion to high purity individual oxides. A ion exchange technique is also capable of achieving same results as polytrimethylen terephtalate (PET) membrane.

Iron powder from 105, or scrap metal as FeO, can be used at a rate dependent on $Fe^{3+}$ concentration in the mother liquor. HCl (100% wt) at the rate of 1 tph can be required as the stripped solution in REE Solvent Extraction (SX) separation and re-leaching of rare earth elements and/or rare metals oxalates.

Water of very high quality, demineralized or nano, at the rate of 100 tph was added to the strip solution and washing of precipitates.

Oxalic acid as di-hydrate at a rate of 0.2 tph was added and contributes to the rare earth elements and rare metals oxalates precipitation. NaOH or MgOH at a rate of 0.5 tph can be used as a neutralization agent.

DEHPA SX organic solution at the rate of 500 g/h was used as active reagent in rare earth elements separation while TBP SX organic solution at the rate of 5 kg/h is used as the active reagent for gallium recovery and yttrium separation. Finally, a kerosene diluent was used at the rate of approximately 2 kg/h in all SX section. Calcination occurs in an electric rotary furnace via indirect heating to convert contents to $REE_2O_3$ (oxides form) and maintain product purity.

Results of various tests made regarding stage 108 are shown in Table 6.

One line divided in subsections (5) to isolate the following elements using solvent extraction:
$Ga_2O_3$
$Y_2O_3$
$SC_2O_3$
$Eu_2O_3+Er_2O_3+Dy_2O_3$
$Ce_2O_3+Nd_2O_3+Pr_2O_3$

| Equivalent output earths oxides | | 166.14 kg/h |
|---|---|---|
| Projected production as per pilot testing results | | |
| Feed | Incoming (kg/h) | Final extraction individual (kg/h) |
| $Ga_2O_3$ | 15.66 | 11.98 |
| $Sc_2O_3$ | 9.06 | 8.11 |
| $Y_2O_3$ | 22.56 | 20.22 |
| $La_2O_3$ | 32.24 | 25.67 |
| $Ce_2O_3$ | 61.37 | 51.82 |
| $Pr_2O_3$ | 8.08 | 6.18 |
| $Nd_2O_3$ | 30.3 | 27.24 |
| $Sm_2O_3$ | 5.7 | 4.51 |
| $Eu_2O_3$ | 1.06 | 0.95 |
| $Gd_2O_3$ | 4.5 | 4.06 |
| $Dy_2O_3$ | 3.9 | 3.55 |
| $Er_2O_3$ | 2.1 | 1.86 |
| Total | 196.55 | 166.14 |

Global yield: 84.53%

Alternatively, stage 108 can be carried out as described in PCT/CA2012/000253 and/or PCT/CA2012000419.

The solution after stages 108 and 109 contained mainly $MgCl_2$, NaCl, KCl, $CaCl_2$, $FeCl_2/FeCl_3$, and $AlCl_3$ (traces), and then undergoes the 111 stage. Na, K, Ca that follows the MgO can be extracted in stage 110 by crystallization in a specific order; Na first, followed by K, and then Ca. This technique can be employed for example in the Israeli Dead Sea salt processing plant to produce MgO and remove alkali from the raw material.

It was observed that the recirculation loop of FIG. 7 allows $GaCl_2$ and $ScCl_2$ to concentrate without precipitating with hematite. This stream then undergoes REE/RM extraction, followed by a series of solvent extraction stages and conversion to high purity individual oxides. Overall recovery yields of the REE elements reached 84% for Ga, 95% for Sc and 68% for the remaining REE present in low quantities.

HCl Regeneration

Alkali (Na, K), once crystallized, was sent and processed in the alkali hydrochloric acid regeneration plant 110 for recovering highly concentrated hydrochloric acid (HCl). The process chosen for the conversion can generate value-added products Various options are available to convert NaCl and KCl with intent of recovering HCl. One example can be to contact them with highly concentrated sulfuric acid ($H_2SO_4$), which generates sodium sulphate ($Na_2SO_4$) and potassium sulfate ($K_2SO_4$), respectively, and regenerates HCl at a concentration above 90% wt. Another example, is the use of a sodium and potassium chloride brine solution as the feed material to adapted small chlor-alkali electrolysis cells. In this latter case, common bases (NaOH and KOH) and bleach (NaOCl and KOCl) are produced. The electrolysis of both NaCl and KCl brine is done in different cells where the current is adjusted to meet the required chemical reaction. In both cases, it is a two-step process in which the brine is submitted to high current and base (NaOH or KOH) is produced with chlorine ($Cl_2$) and hydrogen ($H_2$). $H_2$ and $Cl_2$ are then submitted to a common flame where highly concentrated acid in gas (100% wt.) phase is produced and can be used directly in the crystallization stage 104, or to crystallization stages requiring dry highly concentrated acid.

Magnesium Oxide

The reduced flow, which was substantially free of most elements (for example $AlCl_3$, $FeCl_3$, REE-Cl, NaCl, KCl) and rich in $MgCl_2$, was then submitted to the magnesium oxides plant 111. In the MgO, pyrohydrolysis of $MgCl_2$ and any other leftover impurities were converted into oxide while regenerating acid. The first step was a pre-evaporator/crystallizer stage in which calcium is removed and converted into gypsum ($CaSO_4.2H_2O$) by a simple chemical reaction with sulfuric acid, for which separation of MgO is required. This increases the capacity of MgO roasting and also energy consumption slightly, while substantially recovering HCl. The next step was the specific pyrohydrolysis of MgO concentrated solution by spray roasting. Two (2) main products were generated; MgO that was further treated and HCl (about 18% wt.), which was either recycled back to the upstream leaching stage 102 or to the hydrochloric acid purification plant (107 The MgO-product derived from the spray roaster can require further washing, purification, and finally calcining depending on the quality targeted. The purification and calcining can comprise a washing-hydration step and standard calcining step.

The MgO from the spray roaster is highly chemically active and was directly charged into a water tank where it reacts with water to form magnesium hydroxide, which has poor solubility in water. The remaining traces of chlorides, like $MgCl_2$, NaCl, dissolved in water. The $Mg(OH)_2$ suspension, after settling in a thickener, was forwarded to vacuum drum filters, which remove the remaining water.

The cleaned $Mg(OH)_2$ is then forwarded into a calcination reactor where it is exposed to high temperatures in a vertical multi-stage furnace. Water from hydration is released and allows the transformation of the $Mg(OH)_2$ to MgO and water. At this point, the magnesium oxide was of high purity (>99%).

HCl Purification

The hydrochloric acid purification stage 107 is effective for purifying HCl regenerated from different sectors (for example 105, 106, 111) and to increase its purity for crystallization, whereas dry highly concentrated acid (>90% wt.) can be used as the sparging agent. Stage 107 also allowed for controlling the concentration of the acid going back to stage 102 (about 22 to about 32% wt.) and allows total acid and water balance. Total plant water balance is performed mainly by reusing wash water as absorption medium, as quench agent or as dissolution medium at the crystallization stages. For example, stage 107 can be carried out by using the processes shown in FIG. 4 or in FIG. 5.

For example, purification can be carried out by means of a membrane distillation process. The membrane distillation process applied here occurs when two aqueous liquids with different temperatures are separated through a hydrophobic membrane. The driving force of the process was supplied by the partial pressure vapour difference caused by the temperature gradient between these solutions. Vapour travels from the warm to the cold side. Without wishing to be bound to such a theory, the separation mechanism was based on the vapour/liquid equilibrium of the HCl/water liquid mixture. Practical application of such a technology has been applied to HCl/water, $H_2SO_4$/water systems and also on large commercial scales on aqueous solution of sodium chloride with the purpose of obtaining potable water from seawater and nano water production. Therefore membrane distillation was a separation process based on evaporation through a porous hydrophobic membrane. The process was performed at about 60° C. and was effective to recover heat from the 104 and 102 stage with an internal water circulation loop, in order to maintain a constant incoming temperature to the membranes. For example, eight membranes of 300,000 m² equivalent surface area can be used per membrane to obtain a concentration of HCl well above the azeotropic point (i.e. >36%) of the ≈750 m³/h and final 90% concentration is then obtained through pressure distillation (rectification column).

Purification of HCl by processing thus regenerated acid through hydrophobic membrane and separating water from HCl; therefore increasing HCl concentration up to about 36% (above azeotropic point) and therefore allowing with a single stage of rectification through a pressure stripping column to obtain >90% in gaseous phase, for crystallization stage (sparging); and therefore controlling acid concentration into crystallization stages up to 30-35%$_{(aq)}$.

As indicated stage 107 was operated at about 60° C. and heat input provided by heat recovery from stages 102 to 110. Rectification column was operated at about 140° C. in the reboiler part. Net energy requirement was neutral (negative in fact at −3.5 Gj/t $Al_2O_3$) since both systems were in equilibrium and in balance.

For example, the acid purification can be carried out by using adsorption technology over an activated alumina bed. In continuous mode, at least two adsorption columns are required to achieve either adsorption in one of them and regeneration in the other one. Regeneration can be performed by feeding in counter-current a hot or depressurized gas. This technology will result in a purified gas at 100% wt.

For example, the acid purification can be made by using calcium chloride as entrainer of water. A lean hydrochloric acid solution is contacted with a strong calcium chloride solution through a column. The water is then removed from the hydrochloric acid solution and 99.9% gaseous HCl comes out of the process. Cooling water and cryogenic coolant is used to condense water traces in the HCl. The weak $CaCl_2$ solution is concentrated by an evaporator that ensures the recuperation of calcium chloride. Depending on the impurities in the incoming HCl solution feed to the column, some metals can contaminate the calcium chloride concentrated solution. A precipitation with $Ca(OH)_2$ and a filtration allows the removal of those impurities. The column can operate for example at 0.5 barg. This technology can allow for the recuperation of 98% of the HCl.

Table 7 shows the results obtained concerning the process shown in FIG. 6.

| Composition | Stage 101 | Stage 102 | Stage 106 | Stage 105 | MgO | | Stage 107 | Stage 108 | TOTAL PRODUCED |
|---|---|---|---|---|---|---|---|---|---|
| (% wt) | Yield (%) | Yield (%) | Yield (%) | Yield (%) | tpy | Yield (%) | Yield (%) | Yield (%) | Yield (%) |
| Main constituents | | | | | | | | | |
| $SiO_2$ | — | 99.997% | — | — | — | — | — | — | 99.997% |
| Al | — | 98.02% | 95.03% | — | — | — | — | — | 95.03% |
| Fe | — | 100.00% | — | 92.65% | — | — | — | — | 92.65% |
| Mg | — | 99.998% | — | — | 29,756 | 92.64% | — | — | 92.64% |
| Ca | — | 99.998% | — | — | — | — | — | — | 98.28% |
| Na | — | 99.998% | — | — | — | — | — | — | 92.76% |
| K | — | 100.00% | — | — | — | — | — | — | 93.97% |
| Others ind•$H_2O$ | — | — | — | — | — | — | — | — | — |
| RE/RM | — | 99.80% | — | 92.32% | — | — | — | 84.67% | 84.67% |
| By-Products | | | | | | | | | |
| NaOH | — | — | — | — | 68,556 | — | — | — | — |
| NaOCl | — | — | — | — | 9,269 | — | — | — | — |
| KOH | — | — | — | — | 73,211 | — | — | — | — |
| KOCl | — | — | — | — | 9,586 | — | — | — | — |
| $CaSO_4$ | — | — | — | — | 46,837 | — | — | — | — |
| Reactants | | | | | | | | | |
| $H_2SO_4$ (*) | — | — | — | — | 19,204 | — | — | — | — |
| Fresh HCl M-UP | — | — | — | — | — | — | 99.75% | — | 99.75% |
| Total | — | 98.55% | 95.03% | | 256.419 | 92.64% | 99.75% | 84.67% | |

Tables 8 to 26 show results obtained concerning the products made in accordance with the process shown in FIG. 6 in comparison with standard of the industry.

TABLE 8

Chemical composition of obtained alumina

| Element | % Weight* | Standard used in industry |
|---|---|---|
| $Al_2O_3$ | 99.938 | 98.35 min |
| $Fe_2O_3$ | 0.0033 | 0.0100 |
| $SiO_2$ | 0.0032 | 0.0150 |
| $TiO_2$ | 0.0003 | 0.0030 |
| $V_2O_5$ | 0.0008 | 0.0020 |
| ZnO | 0.0005 | 0.0030 |
| $Cr_2O_3$ | 0.0003 | N/A |
| MgO | 0.0090 | N/A |
| MnO | 0.0002 | N/A |
| $P_2O_5$ | 0.0039 | 0.0010 |
| Cu | 0.0030 | N/A |
| Ca | 0.0020 | 0.0030 |
| Na | 0.0190 | 0.4000 |
| K | 0.0053 | 0.0150 |
| Li | 0.0009 | N/A |
| Ba | <0.00001 | 0.0000 |
| Th | <0.000001 | 0.0000 |
| U | <0.000001 | 0.0000 |
| Free $Cl^-$ | Not detectable | 0.0000 |
| LOI | <1.0000 | <1.0000 |

$P_2O_5$ removal technique can include, for example, after leaching, phosphorous precipitation using zirconium sulphate. It can be provided, for example, in a solution heated at 80 to about 90° C. or about 85 to about 95° C., under vacuum.

TABLE 9

Physical properties of obtained alumina

| Property | Orbite Alumina | Standard used in industry |
|---|---|---|
| PSD < 20 μm | 5-10% | N/A |
| PSD < 45 μm | 10-12% | <10% |
| PSD > 75 μm | 50-60% | N/A |
| SSA ($m^2/g$) | 60-85 | 60-80 |
| Att. Index | 10-12% | <10% |
| α $Al_2O_3$ | 2-5% | <7-9% |

TABLE 10

Chemical composition of obtained hematite

| Element | % Weight |
|---|---|
| $Fe_2O_3$ | >99.5% |
| Hydrolysable elements | <0.2% |

TABLE 11

Physical properties of obtained hematite*

| Property | Orbite hematite |
|---|---|
| $PSD_{mean}$ | 25-35 μm |
| Density (bulk) | 2000-3000 kg/$m^3$ |
| Humidity after filtration | <10% |

*Material can be produced as brickets

TABLE 12

Chemical composition of obtained silica

| Element | % Weight |
|---|---|
| $SiO_2$ | >99.7 |
| $Al_2O_3$ | <0.25% |
| MgO | ≈0.1% |
| $Fe_2O_3$ | ≈0.1% |
| CaO | ≈0.01% |
| $Na_2O$ | <0.1% |
| $K_2O$ | <0.1% |

Note:
Product may have unbleached cellulose fiber filter aid. Cellulose wood flour.

TABLE 13

Physical properties of obtained silica

| Property | Orbite silica |
|---|---|
| $PSD_{mean}$ | 10-20 μm |
| Specific surface area | 34 $m^2/g$ |
| Density (bulk) | 2000-2500 kg/$m^3$ |
| Humidity after filtration | <30% |

TABLE 14

Purity of obtained rare earth element oxides

| Element | Purity (%) |
|---|---|
| $Ga_2O_3$ | >99% |
| $Sc_2O_3$ | |
| $Y_2O_3$ | |
| $La_2O_3$ | |
| $Ce_2O_3$ | |
| $Pr_2O_3$ | |
| $Nd_2O_3$ | |
| $Sm_2O_3$ | |
| $Eu_2O_3$ | |
| $Gd_2O_3$ | |
| $Dy_2O_3$ | |
| $Er_2O_3$ | |

Physical properties of obtained REE-O/RM-O

| Property | Orbite REE-O/RM-O |
|---|---|
| $PSD_{mean}$ | 2-30 μm |
| Density | 5500-13000 kg/$m^3$ |
| LOI | <1% |

TABLE 15

Chemical composition of obtained MgO

| Element | Typical | Specification |
|---|---|---|
| MgO | 99.0+ | 98.35 min |
| CaO | 0.0020 | 0.83 |
| $SiO_2$ | 0.0000 | 0.20 max |
| $B_2O_3$ | 0.0000 | 0.02 max |
| $Al_2O_3$ | 0.0300 | 0.12 max |
| $Fe_2O_3$ | 0.0160 | 0.57 max |
| $MnO_2$ | <0.14 | 0.14 max |
| LOI | 0.7% | <1% |

TABLE 16

Physical properties of obtained MgO

| Property | Orbite MgO |
|---|---|
| $PSD_{mean}$ | 10 μm |
| Density | N/A |
| LOI | 650 kg/m³ |

TABLE 17

Chemical composition of obtained NaOH

| Element | % Weight |
|---|---|
| Sodium hydroxide | 32% |
| Water | 68% |

TABLE 18

Physical properties of obtained NaOH

| Property | Sodium hydroxide (NaOH) |
|---|---|
| Physical state | Liquid |
| Vapour pressure | 14 mmHg |
| Viscosity | >1 |
| Boiling point | 100° C. |
| Melting point | 0° C. |
| Specific gravity | 1.0 |

TABLE 19

Chemical composition of obtained sodium hypochlorite (bleach)

| Element | % Weight |
|---|---|
| Sodium hypochlorite | 12% |
| Sodium hydroxide | <1% |
| Water | >80% |

TABLE 20

Physical properties of obtained NaOCl

| Property | Sodium hypochlorite (NaOCl) |
|---|---|
| Physical state | Liquid |
| Vapour pressure | 1.6 kPa |
| Viscosity | N/A |
| Boiling point | 100° C. |
| Melting point | −3° C. |
| Specific gravity | 1.2 |

TABLE 21

Chemical composition of obtained potassium hydroxide

| Element | % Weight |
|---|---|
| Potassium hydroxide | 32% |
| Water | 68% |

TABLE 22

Physical properties of obtained potassium hydroxide

| Property | KOH |
|---|---|
| Physical state | Liquid |
| Vapour pressure | 17.5 mmHg |
| Viscosity | N/A |
| Boiling point | 100° C. |
| Melting point | N/A |
| Specific gravity | 1.18 |

TABLE 23

Chemical composition of obtained potassium hypochlorite (KOCl)

| Element | % Weight |
|---|---|
| Potassium hypochlorite | 12% |
| Potassium hydroxide | <1% |
| Water | >80% |

TABLE 24

Physical properties of obtained potassium hypochlorite

| Property | KOCl |
|---|---|
| Physical state | Liquid |
| Vapour pressure | N/A |
| Viscosity | N/A |
| Boiling point | 103° C. |
| Melting point | N/A |
| Specific gravity | >1.0 |

TABLE 25

Chemical composition of obtained calcium sulphate dihydrate

| Element | % Weight |
|---|---|
| Calcium sulphate dihydrate | 100% |

TABLE 26

Physical properties of obtained calcium sulphate dehydrate

| Property | Orbite $CaSO_4 \cdot 2H_2O$ |
|---|---|
| Physical state | Solid |
| Specific gravity | 2.32 |

In order to demonstrate the versatility of the processes of the present disclosure, several other tests have been made so as to shown that these processes can be applied to various sources of starting material.

Example 6

Another starting material has been used for preparing acidic compositions comprising various components. In fact, a material that is a concentrate of rare earth elements and rare metals (particularly rich in zirconium) has been tested. Table 27 shows the results of the leaching carried out on such a starting material using a similar process as shown in FIGS. 1, 3, 6 and 7 and as detailed in Examples 1, 2 and 5. It can thus be inferred from the results shown in Table 27 that the various components present in the leaching (various metals such as aluminum, iron, magnesium as well as rare earth elements and rare metals) can be extracted from the obtained leaching composition and that they can eventually be isolated by the processes of the present disclosure such as, for example, those presented in Examples 1, 2 and 5.

Example 7

Other tests have been made in a similar manner as described in Example 6. In the present example, carbonatite has been used as a starting material. (see Table 28 below).

TABLE 27

Tests made on a zirconium rich material.

| Raw material | Composition measure and/ or evaluated (% wt.) | Average measured for testing (% wt.) | Extraction rate measured (ALP) (%) | O All Orbite process recovery (%) |
|---|---|---|---|---|
| $Al_2O_3$ | 6.12 | 6.12 | 89.65 | 86.97 |
| $Fe_2O_3$ | 15.80 | 15.80 | 99.50 | 97.51 |
| $SiO_2$ | 36.00 | 36.00 | 0.000 | 99.997 |
| MgO | 3.08 | 3.08 | 99.75 | 92.66 |
| $Na_2O$ | 1.13 | 1.13 | 99.50 | 99.50 |
| $K_2O$ | 2.12 | 2.12 | 99.50 | 99.50 |
| CaO | 6.10 | 6.10 | 99.50 | 99.00 |
| S total | 0.22 | 0.22 | | 100.00 |
| F | 1.98 | 1.98 | 99.50 | 99.00 |
| $TiO_2$ | 0.13 | 0.13 | 0.000 | 99.03 |
| $V_2O_5$ | 0.00 | 0.00 | 98.00 | 96.04 |
| $P_2O_5$ | 1.10 | 1.10 | 98.00 | 96.04 |
| MnO | 0.43 | 0.43 | 98.00 | 96.04 |
| $ZrO_2$ | 12.43 | 12.43 | 22.70 | 20.43 |
| $Cr_2O_3$ | 0.00 | 0.00 | 0.00 | 0.00 |
| $Ce_2O_3$ | 3.05 | 3.045 | 97.31 | 92.98 |
| $La_2O_3$ | 1.34 | 1.337 | 99.55 | 92.68 |
| $Nd_2O_3$ | 1.55 | 1.551 | 98.40 | 94.79 |
| $Pr_2O_3$ | 0.37 | 0.375 | 99.75 | 97.52 |
| $Sm_2O_3$ | 0.15 | 0.151 | 88.75 | 84.80 |
| $Dy_2O_3$ | 0.09 | 0.089 | 80.35 | 76.77 |
| $Er_2O_3$ | 0.03 | 0.030 | 72.60 | 69.37 |
| $Eu_2O_3$ | 0.03 | 0.027 | 85.57 | 81.76 |
| $Gd_2O_3$ | 0.21 | 0.205 | 82.85 | 79.16 |
| $Ho_2O_3$ | 0.01 | 0.013 | 77.10 | 73.67 |
| $Lu_2O_3$ | 0.00 | 0.003 | 60.15 | 57.47 |
| $Tb_2O_3$ | 0.02 | 0.022 | 78.05 | 74.58 |
| Th | 0.02 | 0.022 | 88.10 | 84.18 |
| $Tm_2O_3$ | 0.00 | 0.004 | 66.85 | 63.88 |
| U | 0.01 | 0.014 | 81.90 | 78.26 |
| $Y_2O_3$ | 0.30 | 0.300 | 72.70 | 69.46 |
| $Yb_2O_3$ | 0.02 | 0.023 | 62.80 | 60.01 |
| $Ga_2O_3$ | 0.02 | 0.016 | 96.90 | 92.59 |
| $Sc_2O_3$ | 0.00 | 0.003 | 95.00 | 90.77 |
| LOI (inc. water) | 6.122023973 | 6.12 | | |

TABLE 28

Tests made on carbonatite

| Raw material | Composition measure and/ or evaluated (% wt.) | Average measured for testing (% wt.) | Extraction rate measured (ALP) (%) | O All Orbite process recovery (%) |
|---|---|---|---|---|
| $Al_2O_3$ | 0.70 | 0.70 | 84.31 | 81.61 |
| $Fe_2O_3$ | 11.22 | 11.22 | 94.14 | 92.15 |
| $SiO_2$ | 2.11 | 2.11 | 0.00003 | 99.997 |
| MgO | 6.50 | 6.500 | 100 | 96.25 |
| $Na_2O$ | 0.07 | 0.07 | 92.54 | 90.55 |
| $K_2O$ | 0.18 | 0.181 | 37.33 | 37.33 |
| CaO | 16.51 | 16.51 | 100 | 98.00 |
| $TiO_2$ | 0.00 | 0.000 | 0.00000 | 100.000 |
| $V_2O_5$ | 0.00 | 0.000 | 0 | 100.000 |
| $P_2O_5$ | 0.00 | 0.000 | 0 | 100.000 |
| MnO | 0.00 | 0.000 | 0 | 100.000 |
| $ZrO_2$ | 0.00 | 0.000 | 0 | 100.000 |
| $Cr_2O_3$ | 0.00 | 0.000 | 0 | 100.000 |
| $Ce_2O_3$ | 1.19 | 1.195 | 64.04 | 61.190 |
| $La_2O_3$ | 0.46 | 0.463 | 63.86 | 61.018 |
| $Nd_2O_3$ | 0.45 | 0.448 | 81.46 | 77.835 |
| $Pr_2O_3$ | 0.14 | 0.142 | 67.59 | 64.582 |
| $Sm_2O_3$ | 0.03 | 0.033 | 65.32 | 62.413 |
| $Dy_2O_3$ | 0.00 | 0.000 | 78.12 | 74.644 |
| $Er_2O_3$ | 0.00 | 0.000 | 86.15 | 82.316 |
| $Eu_2O_3$ | 0.01 | 0.007 | 66.45 | 63.493 |
| $Gd_2O_3$ | 0.01 | 0.013 | 54.46 | 52.037 |
| $Ho_2O_3$ | 0.00 | 0.000 | 83.12 | 79.421 |
| $Lu_2O_3$ | 0.00 | 0.000 | 88.86 | 84.906 |
| $Tb_2O_3$ | 0.00 | 0.001 | 41.42 | 39.577 |
| Th | 0.06 | 0.065 | | |
| $Tm_2O_3$ | 0.00 | 0.000 | 90.70 | 86.664 |
| U | 0.01 | 0.007 | | |
| $Y_2O_3$ | 0.00 | 0.000 | 84.68 | 80.912 |
| $Yb_2O_3$ | 0.00 | 0.000 | 85.11 | 81.323 |
| $Ga_2O_3$ | 0.00 | 0.000 | 0 | 0.000 |
| $Sc_2O_3$ | 0.00 | 0.000 | 0 | 0.000 |
| LOI (inc. water) | | 60.33 | | |

It can thus be inferred from the results shown in Table 28 that the various metals, rare earth elements and rare metals extracted present in the obtained leaching composition can eventually be isolated by the processes of the present disclosure such as, for example, those presented in Examples 1, 2 and 5. In such cases, the starting material used for the processes of FIG. 1, 3, 6, 7, 8, 10A, 10B, 11A or 11B.

Example 8

Tests have been made for using red mud as starting material. HCl at a concentration of 6 M was used for leaching the red mud (RM) samples. The results are shown below in Tables 29 to 35.

TABLE 29

Red mud leaching conditions
Leaching Operating Conditions

| Pressure | Temperature | Processing Time | Acid Ratio | Reactor Volume |
|---|---|---|---|---|
| 70-80 psi | 145-160° C. | 420 minutes | Stoichiometry + 30% | 16 gallons |

TABLE 30

Red mud leaching results

Recovery Yield

|    | RM A   | RM B   | RM C    | RM 1   | RM 1(2) | RM 1 (3) | RM 1 (4) | RM 1 (5) | RM 1 (6) |
|----|--------|--------|---------|--------|---------|----------|----------|----------|----------|
| Al | 99.45% | 99.63% | 99.91%  | 99.11% | 97.54%  | 98.58%   | 98.58%   | 98.29%   | 99.30%   |
| Si | 68.99% | 79.72% | 92.68%  | 89.16% | 55.59%  | 61.31%   | 46.74%   | 47.33%   | 48.52%   |
| Fe | 99.21% | 99.54% | 99.93%  | 99.80% | 99.40%  | 99.44%   | 99.79%   | 98.67%   | 99.24%   |
| Ca | 78.57% | 99.80% | 99.95%  | 96.83% | 91.26%  | 99.09%   | 99.84%   | 98.81%   | 99.57%   |
| K  | 59.56% | 94.20% | 98.54%  | 67.44% | 10.30%  | 89.83%   | 98.14%   | 85.06%   | 82.50%   |
| Mg | 91.91% | 98.07% | 99.51%  | 97.29% | 92.52%  | 95.63%   | 96.89%   | 84.00%   | 99.14%   |
| Na | 99.82% | 99.99% | 100.00% | 99.44% | 98.45%  | 99.42%   | 99.27%   | 99.09%   | 99.43%   |
| Ti | 67.65% | 75.21% | 98.67%  | 92.03% | 73.82%  | 93.29%   | 94.62%   | 89.17%   | 28.19%   |

Recovery Yield

|    | RM 2   | RM 2 (2) | RM 2 (3) | RM 2 (4) | RM 2 (5) | RM 2 (6) | RM 2 (7) | Average |
|----|--------|----------|----------|----------|----------|----------|----------|---------|
| Al | 98.95% | 99.23%   | 99.27%   | 98.92%   | 99.29%   | 98.61%   | 98.86%   | 98.91%  |
| Si | 77.25% | 74.49%   | 50.01%   | 52.78%   | 43.09%   | 50.64%   | 60.25%   | 61.91%  |
| Fe | 98.70% | 99.29%   | 99.75%   | 99.48%   | 99.80%   | 98.15%   | 98.75%   | 99.31%  |
| Ca | 99.47% | 99.41%   | 99.75%   | 99.40%   | 99.73%   | 99.46%   | 99.20%   | 97.51%  |
| K  | 75.08% | 91.51%   | 89.58%   | 69.28%   | 77.23%   | 65.22%   | 77.15%   | 75.66%  |
| Mg | 97.23% | 97.17%   | 95.62%   | 96.59%   | 95.13%   | 96.14%   | 96.19%   | 95.50%  |
| Na | 99.56% | 99.51%   | 99.84%   | 99.53%   | 99.93%   | 95.52%   | 99.39%   | 99.54%  |
| Ti | 83.04% | 93.45%   | 39.23%   | 93.51%   | 92.50%   | 43.81%   | 52.50%   | 75.73%  |

TABLE 31

Composition of RM A

|    | Al      | Si       | Fe       | Ca       | K       | Mg      | Na       | Ti      |
|----|---------|----------|----------|----------|---------|---------|----------|---------|
| %  | 10.2    | 4.59     | 16.4     | 2.71     | 0.01    | 0.02    | 3.07     | 2.6     |
| Kg | 80.9166 | 36.41247 | 130.1012 | 21.49843 | 0.07933 | 0.15866 | 24.35431 | 20.6258 |

TABLE 32

Composition of RM B

|    | Al      | Si       | Fe       | Ca       | K       | Mg      | Na       | Ti       |
|----|---------|----------|----------|----------|---------|---------|----------|----------|
| %  | 10.9    | 5.66     | 17.2     | 1.72     | 0.01    | 0.03    | 5.05     | 2.62     |
| Kg | 86.4697 | 44.90078 | 136.4476 | 13.64476 | 0.07933 | 0.23799 | 40.06165 | 20.78446 |
| %  | 0.69    | 19.8     | 1.37     | 0.06     | 0.01    | 0.01    | 0.01     | 11.2     |

TABLE 33

Composition of RM 1

|    | Al      | Si       | Fe     | Ca      | K     | Mg     | Na      | Ti      |
|----|---------|----------|--------|---------|-------|--------|---------|---------|
| %  | 8.85    | 4.76     | 18.5   | 4.04    | 0.05  | 0.03   | 2.82    | 2.36    |
| Kg | 213.108 | 114.6208 | 445.48 | 97.2832 | 1.204 | 0.7224 | 67.9056 | 56.8288 |

TABLE 34

Composition of RM 1(2); RM 1(3); RM 1(4); RM 1(5) and RM 1(6)

|    | Al      | Si       | Fe     | Ca      | K     | Mg     | Na      | Ti     |
|----|---------|----------|--------|---------|-------|--------|---------|--------|
| %  | 8.85    | 4.76     | 18.5   | 4.04    | 0.05  | 0.03   | 2.82    | 2.6    |
| Kg | 213.108 | 114.6208 | 445.48 | 97.2832 | 1.204 | 0.7224 | 67.9056 | 62.608 |

TABLE 35

Composition of RM 2; RM 2(2); RM 2(3); RM 2(4); RM 2(5); RM 2(6); and RM 2(7)

|    | Al      | Si       | Fe      | Ca      | K      | Mg     | Na       | Ti      |
|----|---------|----------|---------|---------|--------|--------|----------|---------|
| %  | 10.9    | 5.66     | 17.2    | 1.72    | 0.01   | 0.03   | 5.05     | 2.62    |
| Kg | 230.971 | 119.9354 | 364.468 | 36.4468 | 0.2119 | 0.6357 | 107.0095 | 55.5178 |

Example 9

Tables 36 and 37 summarizes the overall range of chemistry for the residues processed (red mud from different countries). These analyses were performed by an independent and certified laboratory.

TABLE 36

| Raw material | Composition measured and/or evaluated (% wt.) |
|---|---|
| $Al_2O_3$ | 12.55-21.80 |
| $Fe_2O_3$ | 32.80-44.90 |
| $SiO_2$ | 7.16-11.32 |
| MgO | 0.04-2.80 |
| $Na_2O$ | 3.06-6.36 |
| $K_2O$ | 0.00-0.12 |
| CaO | 2.48-12.1 |
| S total | 0.10-3.50 |
| $TiO_2$ | 3.46-4.76 |
| $V_2O_5$ | 0.08-0.16 |
| $P_2O_5$ | 0.08-0.70 |
| MnO | 0.015-0.100 |
| ZrO | 0.06-0.20 |
| Cr | 0.098-0.380 |
| Co | 2-40 ppm |
| Cd | 0.39-56 ppm |
| Zn | 50-253 ppm |
| Ni | 6.9-130 ppm |
| Cu | 6.9-140 ppm |
| Pb | 60-80 ppm |
| As | 0.5-170 ppm |
| $Ga_2O_3$ | 88-93 ppm |
| $Sc_2O_3$ | 10-14 ppm |
| $Re_2O_3$ | 61-100 ppm |

TABLE 37

| Red mud constituents | Average measured for testing (% wt.) |
|---|---|
| $Al_2O_3$ | 21.10 |
| $Fe_2O_3$ | 33.60 |
| $SiO_2$ | 10.25 |
| MgO | 0.05 |
| $Na_2O$ | 5.12 |
| $K_2O$ | 0.06 |
| CaO | 3.10 |
| S total | 2.20 |
| $TiO_2$ | 3.47 |
| $V_2O_5$ | 0.10 |
| $P_2O_5$ | 0.08 |
| MnO | 0.015 |
| ZrO | 0.065 |
| Cr | 0.11 |
| Co | 2 ppm |
| Cd | 0.4 ppm |
| Zn | 249 ppm |
| Ni | 24 ppm |
| Cu | 19 ppm |
| Pb | 47 ppm |
| As | 31 ppm |
| $Ga_2O_3$ | 90 ppm |
| $Sc_2O_3$ | 12 ppm |

TABLE 37-continued

| Red mud constituents | Average measured for testing (% wt.) |
|---|---|
| $Re_2O_3$ | 66 ppm |
| LOI (inc. water) | 20.63 |

It can thus be seen that red mud has been successfully leached with HCl, thereby allowing for good yields with respect to the recovery of the various components present in red mud. These various products or components present in the obtained leachate can thus be all isolated and eventually transformed as previously indicated in the processes of the present disclosure. The obtained leachate can then be treated as described in the processes of the present disclosure. The leaching stage of example 8 can be considered, for example, as the leaching stage 2 of FIG. 1 or FIG. 3; the leaching stage 102 of FIG. 6 or FIG. 7; the leaching stage 2 of FIG. 8, the leaching 202 of FIG. 10A, the leaching 302 of FIG. 11A etc. For example, the leachate obtained in Example 8 can then be treated as shown in FIGS. 1, 3, 6 to 8, 10A, 10B, 11A and 11B. For example, the leachate can be treated as described in Examples 1, 2 and 5.

Figure 9:
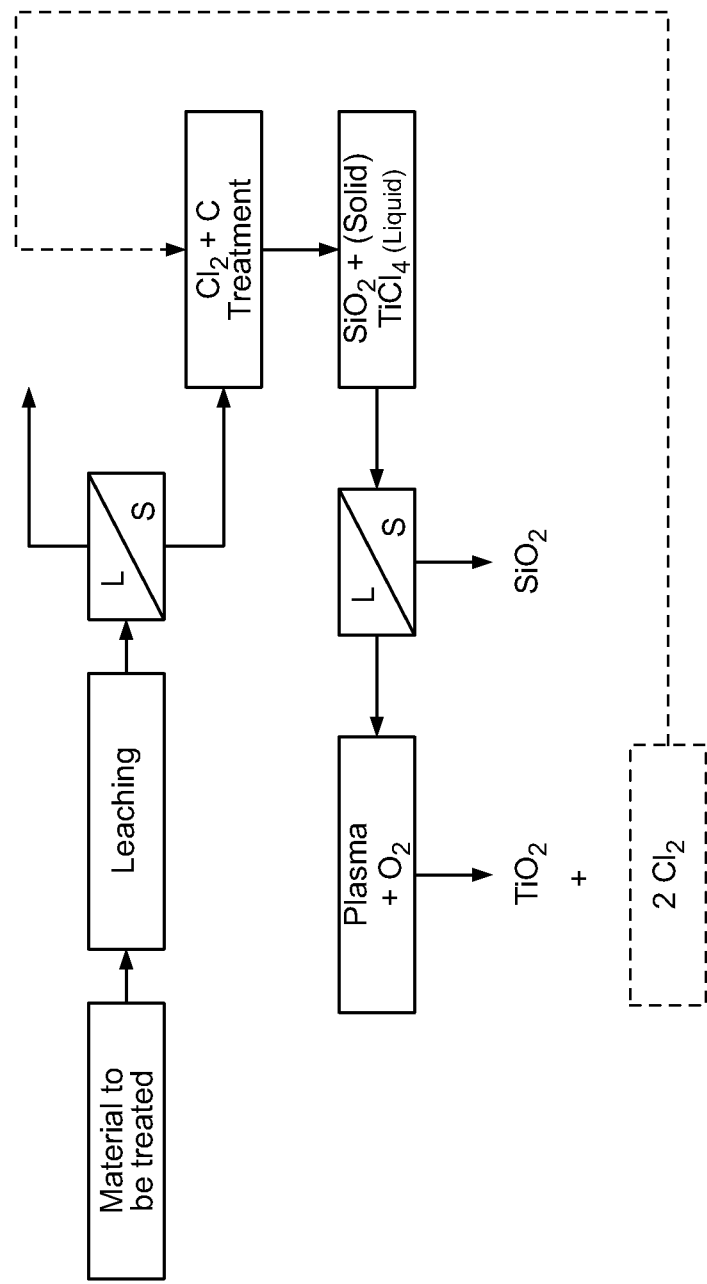
FIG. 9 shows another bloc diagram of an example of a process preparing titanium chloride and/or titanium oxide according to the present disclosure.

FIG. 9 shows a method for separating Si from Ti. For example, when using an ore as starting material, leaching can be carried out in the presence of $Cl_2$ so as to maintain Ti under the form of $TiCl_4$ since in remains in solution while Si remains solid ($SiO_2$). Then, Ti can be injected into a plasma torch for being purified.

Such a method for purifying Si and Ti can be used in all the processes of the present disclosure when there is a need for separating these two entities. For example, see stage 113 in FIG. 7

Figure 10A:
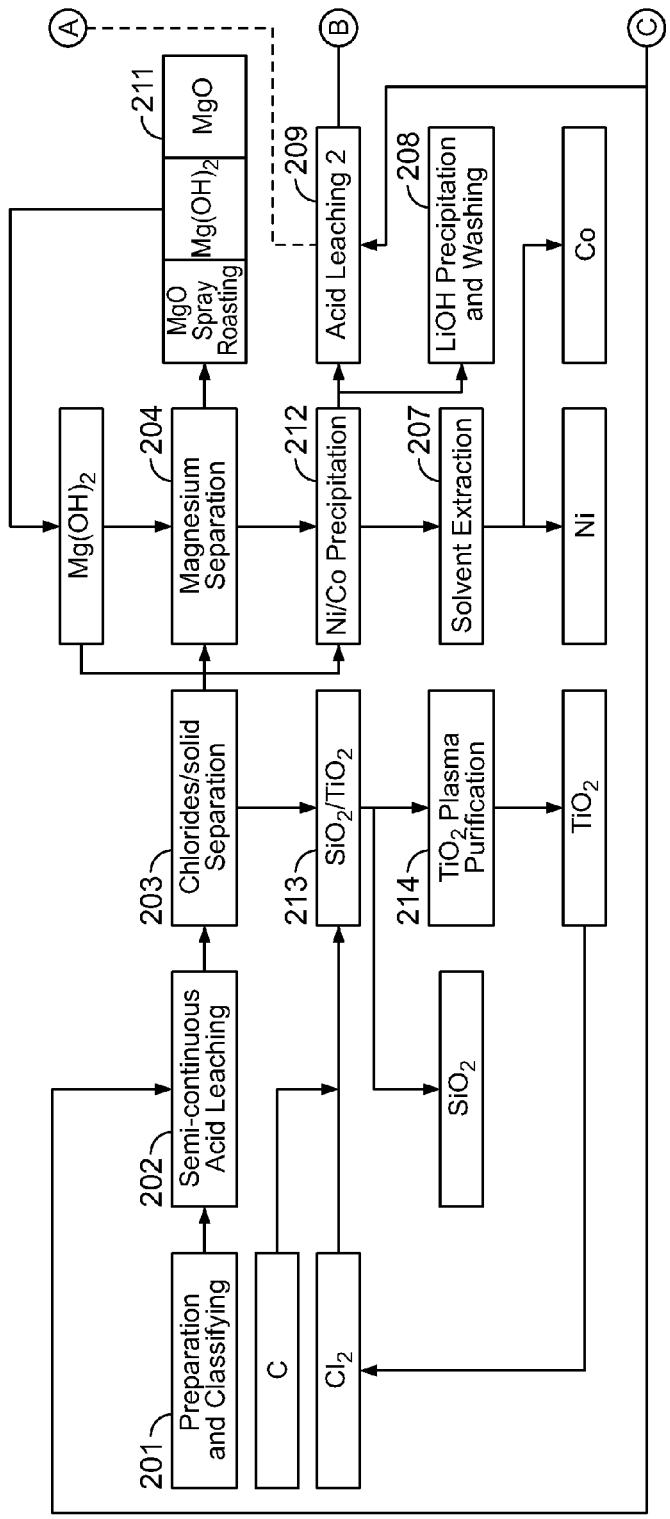
FIGS. 10A and 10B show a further bloc diagram of an example of process according to the present disclosure.
Figure 10B:
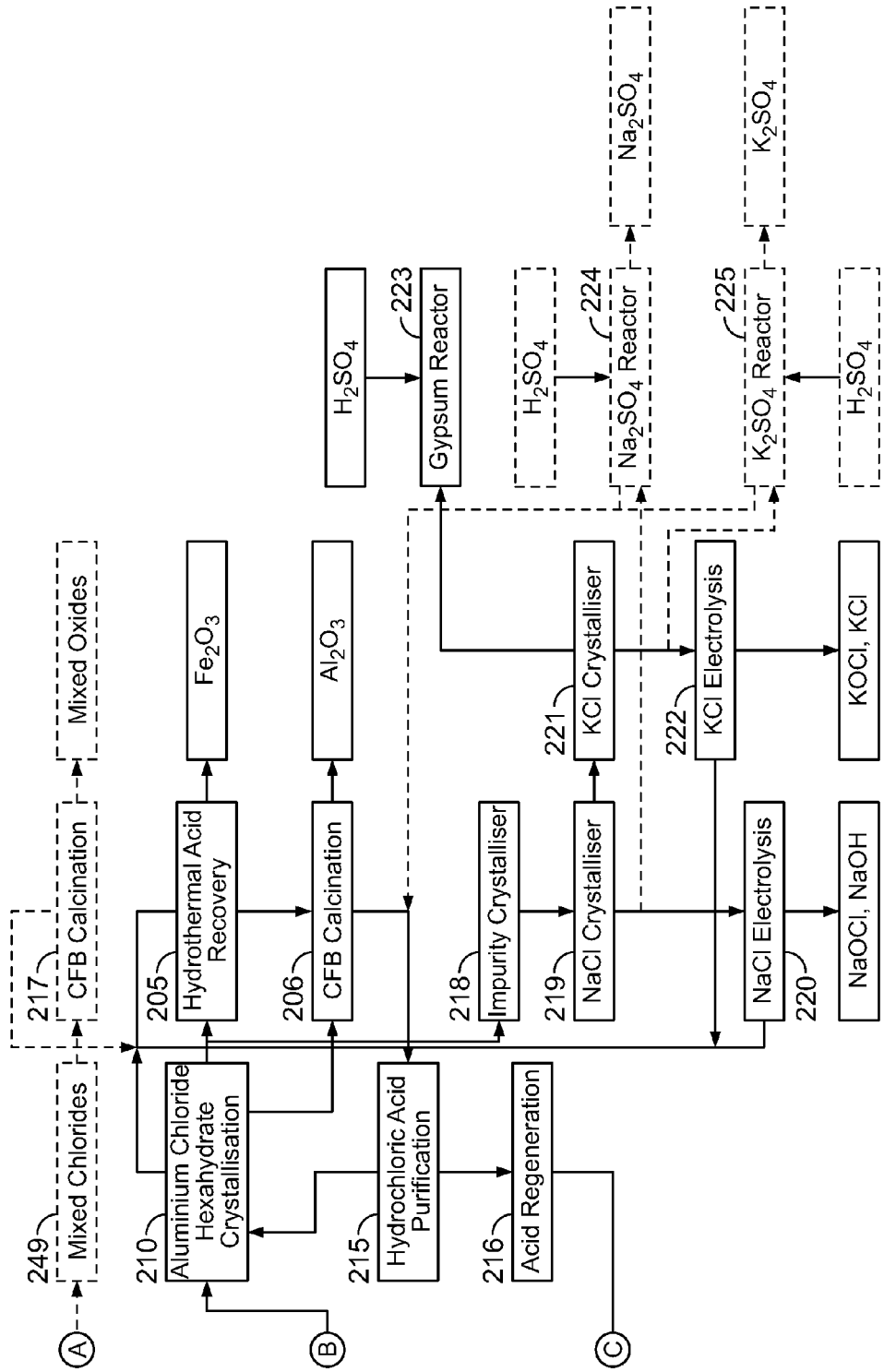
Figure 11A:
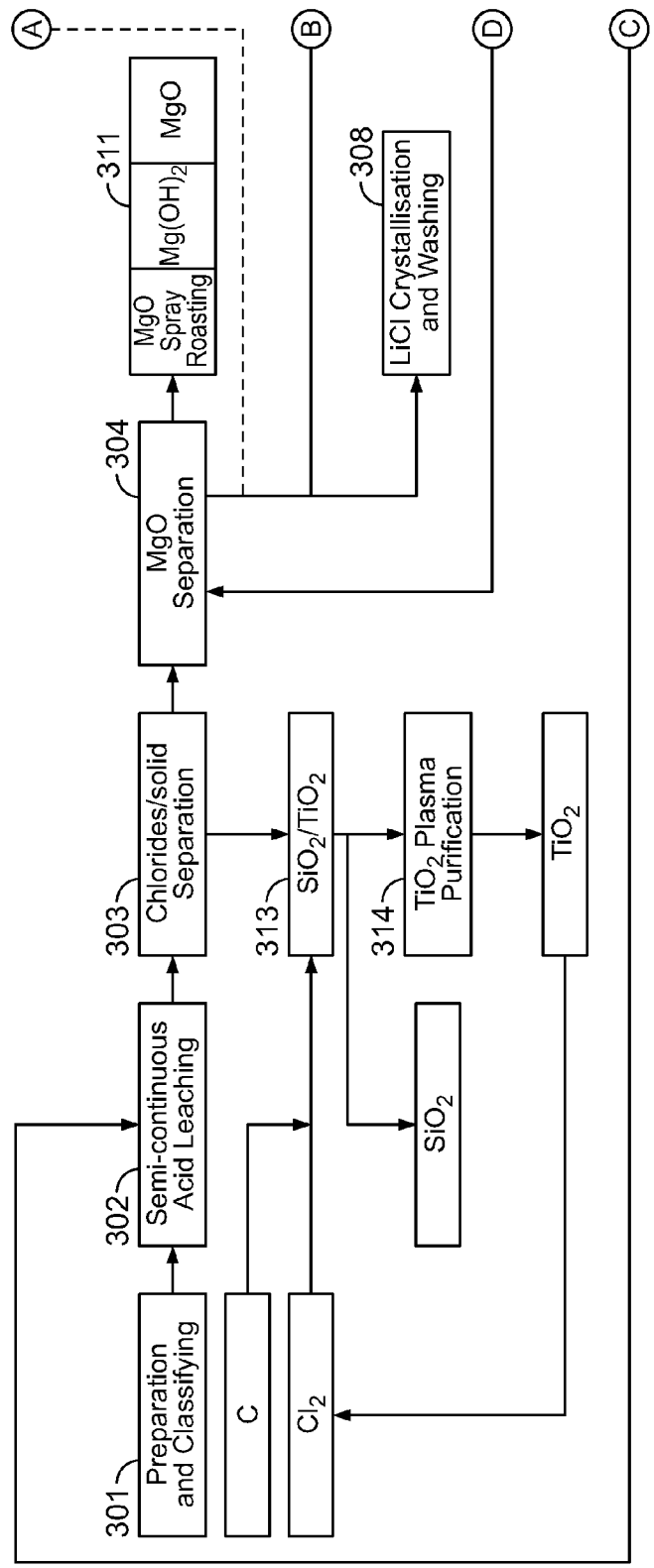
FIGS. 11A and 11B shows a another bloc diagram of an example of process according to the present disclosure.
Figure 11B:
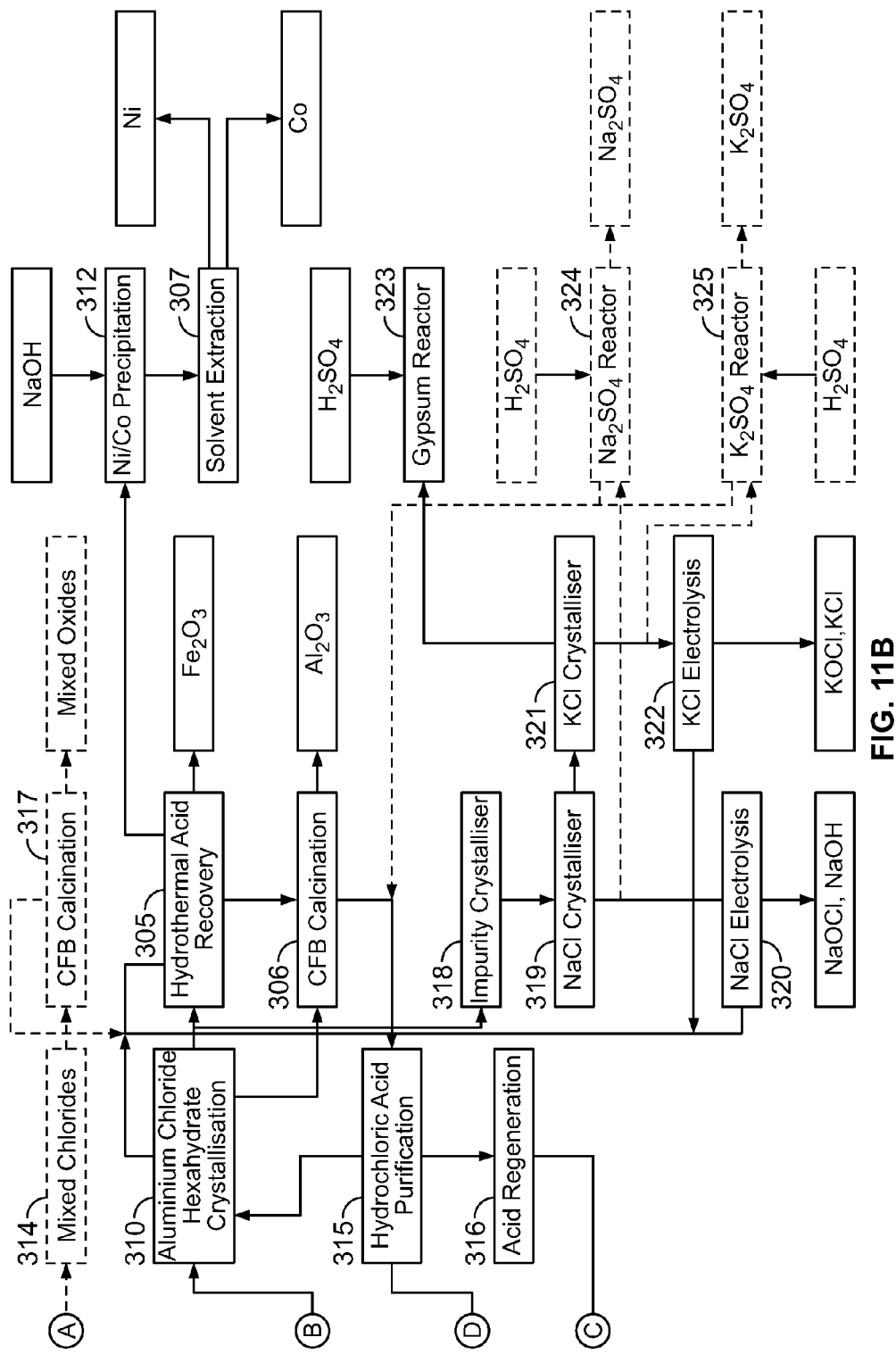

The processes shown in FIGS. 10A/10B and 11A/11B are processes that can be useful for treating various materials that comprise, for example, Mg and other metals such as Ni and/or Co. These materials can also comprise other metals such as aluminum, iron etc. These processes can thus be effective for treating red mud. The processes of FIGS. 10A/10B and FIGS. 11A/11B are similar, with the exception that magnesium remains in solution after step 204 in FIGS. 10A/10B (see step 211) while magnesium is precipitated after step 304 in FIGS. 11A/11B (see step 311).

Certain steps carried out in the processes of FIGS. 10A/10B and 11A/11B are similar to the steps of other processes described in the present disclosure.

For example, steps 201 and 301 are similar to step 101 of FIGS. 6 and 7. Moreover, steps 202 and 302 of FIGS. 10A/10B and 11A/10B are similar to step 102 of FIGS. 6 and 7.

Steps 203 and 303 of FIGS. 10A/B and 11A/B are similar to step 103 of FIGS. 6 and 7.

Steps 213 and 313 of FIGS. 11 and 12 are similar to step 113 of FIG. 7. With respect to steps 214 and 314, $TiO_2$ can eventually be purified by means of a plasma torch.

Eventually, $CaSO_4.2H_2O$ (gypsum) can be produced as detailed in steps 223 and 323. Finally, pursuant to steps 224, 324, 225 and 325 $Na_2SO_4$ and $K_2SO_4$ can be produced.

With respects to steps 213 and 313, $TiO_2$ can be converted into titanium chloride so as to solubilize the titanium in a liquid phase. For example, this can be done by reacting $TiO_2$ with $Cl_2$ and carbon (C). Therefore, $SiO_2$ and titanium can be separated from one another since $SiO_2$ remains solid while titanium chloride will be solubilized. For example, steps 213, 313, 214 and 314 can be carried out as detailed in FIG. 9.

Such processes are also efficient for achieving whole recovery of HCl.

Pursuant to Ni and/or Co precipitation (step 212) LiOH can be precipitated and eventually washed in steps 208. Ni and Co are then purified by means of solvent extraction 207. The person skilled in the art would thus be able to select appropriate conditions for separating these two metals. Examples of such different manners of separating Ni from Co are disclosed in US 2011/0283838, hereby incorporated by reference in its entirety. Then, a further leaching can be carried out in step 209 so as to extract further metals.

After step 304 related to the MgO separation, LiCl can be crystallized an washed (stage 308). After step 305, Hematite is obtained and Ni and Co are precipitated (stage 312). Ni and Co can then be separated from one another by using the above-mentioned techniques (solvent extraction) referred to when describing stage 207.

For example, if the starting material to be used in the processes of FIGS. 10A, 10B, 11A and 11B contains aluminum, steps 210 and 310 can be carried out so as to precipitate $AlCl_3$. Such a step (210 or 310) is similar to step 104 carried out in FIGS. 6 and 7. In an analogous manner, steps 205 and 305 of FIGS. 10A, 10B, 11A and 11B are similar to step 105 of FIGS. 6 and 7. Steps 206 and 306 of FIGS. 10A, 10B, 11A and 11B are similar to step 106 of FIGS. 6 and 7. HCl purification carried out in steps 215 and 315 is similar to step 107 carried out in FIGS. 6 and 7. As it can be seen in FIGS. 10A, 10B, 11A and 11B 216 and 316, HCl is thus regenerated.

Alternatively, pursuant to step 209, and depending on the composition of the starting material used for the processes of FIGS. 10A, 10B, 11A and 11B, steps 210 and 310 can be omitted or bypassed. Therefore, if substantially no aluminum is comprised within the starting material, or if the content in aluminum is considerably low after step 209, step 249 can be carried out. Then, pursuant to steps 249 and 349 of FIGS. 10A, 10B, 11A and 11B, in which a mixture of various metal chlorides are obtained, calcination can be carried out in steps 217 and 317 so as to eventually obtain a mixture of various metal oxides.

Impurities obtained in steps 210 and 310 can be crystallized in steps 218 and 318. By doing so, NaCl (steps 219 and 319) and KCl (steps 221 and 321) can be crystallized. An electrolysis of NaCl (steps 220 and 320) and KCl (steps 222 and 322) can be carried out as previously indicated in the present disclosure.

The processes of the present disclosure provide a plurality of advantages and distinction over the known processes The processes of the present disclosure provide fully continuous and economical solutions that can successfully extract alumina from various type of materials while providing ultra pure secondary products of high added value including highly concentrated rare earth elements and rare metals. The technology described in the present disclosure allows for an innovative amount of total acid recovery and also for a ultra high concentration of recovered acid. When combing it to the fact that combined with a semi-continuous leaching approach that favors very high extraction yields and allows a specific method of crystallization of the aluminum chloride and concentration of other value added elements. These processes also allow for preparing aluminum with such a produced alumina.

A further advantage of the processes of the present disclosure is the combined high temperature and high incoming hydrochloric acid concentration. Combined with a semi continuous operation where the free HCl driving force is used systematically, iron and aluminum extraction yields do respectively reach 100% and 98% in less than about 40% of the reference time of a basic batch process. Another advantage of higher HCl concentration than the concentration at azeotropic point is the potential of capacity increase. Again a higher HCl concentration than the concentration of HCl at the azeotropic point and the semi-continuous approach represent a substantial advance in the art.

Another advantage in that technique used for the mother liquor separation from the silica after the leaching stage countercurrent wash, is that band filters provide ultra pure silica with expected purity exceeding 96%.

The crystallization of $AlCl_3$ into $AlCl_3.6H_2O$ using dried, cleaned and highly concentrated gaseous HCl as the sparging agent allows for a pure aluminum chloride hexahydrate with only few parts per million of iron and other impurities. A minimal number of stages can be required to allow proper crystal growth.

The direct interconnection with the calcination of $AlCl_3.6H_2O$ into $Al_2O_3$ which does produce very high concentration of gas allows the exact adjustment in continuous of the HCl concentration within the crystallizer and thus proper control of the crystal growth and crystallization process.

The applicant has thus demonstrated that their processes are effective to separates the individual valuable and marketable components of the red mud (or the selected material to be treated) sequentially and recycles the acid used. These processes therefore allow the recovery of a large part of the alumina normally wasted in the Bayer process.

The processes of the present disclosure thus offer a unique solution to these large red mud ponds, remediation, while allowing a quick return on investment due to the recovery of alumina and other value added products separated and purified through the acid regeneration stage. These results demonstrate that the processes of the present disclosure represent an innovative and economical technology is not only a viable alternative for alumina production from a variety of aluminous ores without generating red mud but also a means to remediate the existing red mud toxic residues that represent an environmental liability for the alumina and aluminium industries.

Although the initial composition of red mud can vary depending on the bauxite origin, the operating conditions, etc.; the processes of the present disclosure have the flexibility to process raw material feed of various compositions. This enables the treatment of red mud coming out of any alumina plant. Different sources of red mud from different areas in the world were successfully tested.

The applicant has now discovered fully integrated and continuous processes with substantially total hydrochloric acid recovery for the extraction of alumina and other value added products from various materials that contain aluminum (clay, bauxite, aluminosilicate materials, slag, red mud, fly ashes etc.) containing aluminum. In fact, the processes allows for the production of substantially pure alumina and other value added products purified such as purified silica, pure hematite, titanium oxide, pure other minerals (ex: magnesium oxide) rare earth elements, and rare metals products. In addition, the processes do not require thermal pre-treatment before the acid leach operation. Acid leach is carried out using semi-continuous techniques with high pressure and temperature conditions and very high regenerated hydrochloric acid concentration. In addition, the processes do not generate any residues not sellable, thus eliminating harmful residues to environment like in the case of alkaline processes.

The advantage of the high temperature calcination stage, in addition for allowing to control the α-form of alumina required, is effective for providing a concentration of hydrochloric acid in the aqueous form (>38%) that is higher than the concentration of HCl at the azeotropic point and thus providing a higher incoming HCl concentration to the leaching stage. The calcination stage hydrochloric acid network can be interconnected to two (2) crystallization systems and by pressure regulation excess HCl can be being absorbed at the highest possible aqueous concentration. The advantage of having a hexahydrate chloride with low moisture content (<2%) incoming feed allows for a continuous basis to recover acid at a concentration that is higher than the azeotropic concentration. This HCl balance and double usage into three (3) common parts of the processes and above azeotropic point is a substantial advance in the art.

Another advantage is the use of the incoming chemistry (ferric chloride) to the iron oxide and hydrochloric acid recovery unit where all excess heat load from any calcination part, pyrohydrolysis and leaching part is being recovered to preconcentrate the mother liquor in metal chloride, thus allowing, at very low temperature, the hydrolysis of the ferric chloride in the form of very pure hematite and the acid regeneration at the same concentration than at its azeotropic point.

A further major advantage of the instant process at the ferric chloride hydrolysis step is the possibility to concentrate rare earth elements in form of chlorides at very high concentration within the hydrolyser reactor through an internal loop between hydrolyzer and crystallization. The advantage in that the processes of the present disclosure benefit from the various steps where gradual concentration ratios are applied. Thus, at this stage, in addition to an internal concentration loop, having the silica, the aluminum, the iron and having in equilibrium a solution close to saturation (large amount of water evaporated, no presence of free hydrochloric acid) allows for taking rare earth elements and non-hydrolysable elements in parts per million into the incoming feed and to concentrate them in high percentage directly at the hydrolyser after ferric chloride removal Purification of the specific oxides (RE-O) can then be performed using various techniques when in percentage levels. The advantage is doubled here: concentration at very high level of rare earth elements using integrated process stages and most importantly the approach prevents from having the main stream (very diluted) of spent acid after the leaching step with the risk of contaminating the main aluminum chloride stream and thus affecting yields in $Al_2O_3$. Another improvement of the art is that on top of being fully integrated, selective removal of components allows for the concentration of rare earth elements to relatively high concentration (percentages).

Another advantage of the process is again a selective crystallization of $MgCl_2$ through the sparging of HCl from either the alumina calcination step or the magnesium oxide direct calcination where in both cases highly concentrated acid both in gaseous phase or in aqueous form are being generated. As per aluminum chloride specific crystallization, the direct interconnection with the calcination reactor, the HCl gas very high concentration (about 85 to about 95%, about 90 to 95% or about 90% by weight) allows for exact adjustment in continuous of the crystallizer based on quality of magnesium oxide targeted. Should this process step (MgO production or other value added metal oxide) be required based on incoming process feed chemistry, the rare earth elements and rare metals extraction point then be done after this additional step; the advantage being the extra concentration effect applied.

The pyrohydrolysis allows for the final conversion of any remaining chloride and the production of refined oxides that can be used (in case of clay as starting material) as a fertilizer and allowing the processing of large amount of wash water from the processes with the recovery hydrochloric acid in close loop at the azeotropic point for the leaching step. The advantage of this last step is related to the fact that it does totally close the process loop in terms of acid recovery and the insurance that no residues harmful to the environment are being generated while processing any type of raw material, as previously described.

A major contribution to the art is that the proposed fully integrated processes of the present disclosure is really allowing, among others, the processing of bauxite in an economic way while generating no red mud or harmful residues. In addition to the fact of being applicable to other natural of raw materials (any suitable aluminum-containing material or aluminous ores), the fact of using hydrochloric acid total recovery and a global concentration that is higher than the concentration at the azeotropic point (for example about 21% to about 38%), the selective extraction of value added secondary products and compliance (while remaining highly competitive on transformation cost) with environmental requirements, represent major advantages in the art.

It was thus demonstrated that the present disclosure provides fully integrated processes for the preparation of pure aluminum oxide using a hydrochloric acid treatment while producing high purity and high quality products (minerals) and extracting rare earth elements and rare metals.

While a description was made with particular reference to the specific embodiments, it will be understood that numerous modifications thereto will appear to those skilled in the art. Accordingly, the above description and accompanying drawings should be taken as specific examples and not in a limiting sense.

What is claimed is:

1. A process for preparing titanium oxide, said process comprising:
    leaching red mud with HCl to obtain a first leachate comprising ions from at least one metal and a solid, and separating said solid from said first leachate;
    at least substantially isolating said ions of said at least one metal from said first leachate;
    leaching said solid with HCl in the presence of a chloride chosen from alkali metal chlorides and alkaline earth metal chlorides to obtain a second leachate comprising titanium chloride; and
    converting said titanium chloride into titanium oxide.

2. The process of claim 1, wherein said chloride is chosen from alkaline earth metal chlorides.

3. The process of claim 1, wherein said chloride is calcium chloride or magnesium chloride.

4. The process of claim 1, wherein said chloride is magnesium chloride.

5. The process of claim 1, wherein said at least one metal comprises a first metal chosen from aluminum, iron, zinc, copper, gold, silver, molybdenum, cobalt, magnesium, lithium, manganese, nickel, palladium, platinum, thorium, phosphorus, uranium and titanium, at least one rare earth element or at least one rare metal.

6. The process of claim 5, wherein said first metal is aluminum.

7. The process of claim 6, wherein said process comprises reacting said first leachate with gaseous HCl as to obtain said liquid and said precipitate comprising aluminum ions, said precipitate being formed by crystallization of $AlCl_3.6H_2O$.

8. The process of claim 6, wherein said process comprises reacting said first leachate with dry gaseous HCl to obtain said liquid and said precipitate comprising aluminum ions, said precipitate being formed by crystallization of $AlCl_3.6H_2O$.

9. The process of claim 8, wherein said first leachate comprises Al ions and/or Fe ions.

10. The process of claim 8, wherein said Al ions are substantially selectively precipitated from said first leachate under the form of $AlCl_3$.

11. The process of claim 9, wherein said Fe ions are substantially selectively extracted by converting them into $Fe_2O_3$ via an hydrolysis.

12. A process for preparing titanium oxide, said process comprising:
   leaching red mud with HCl to obtain a first leachate comprising ions from at least one metal and a solid that comprises $TiO_2$ and $SiO_2$, and separating said solid from said first leachate;
   at least substantially isolating said ions of said at least one metal from said first leachate;
   reacting said solid with $Cl_2$ and a carbon source to obtain a liquid portion comprising titanium chloride and a solid portion, and separating said liquid portion from said solid portion;
   and
   converting said titanium chloride into titanium oxide.

13. The process of claim 12, wherein said leaching is carried out at a temperature of about 125 to about 225° C.

14. The process of claim 13, comprising heating titanium chloride to convert same into $TiO_2$.

* * * * *

UNITED STATES PATENT AND TRADEMARK OFFICE
CERTIFICATE OF CORRECTION

PATENT NO.       : 9,556,500 B2                                              Page 1 of 1
APPLICATION NO.  : 14/687909
DATED            : January 31, 2017
INVENTOR(S)      : Boudreault et al.

It is certified that error appears in the above-identified patent and that said Letters Patent is hereby corrected as shown below:

In the Claims

Claim 7, Column 49, Line 10, delete "HCl as to obtain" and insert -- HCl to obtain --

Signed and Sealed this
Fourth Day of April, 2017

Michelle K. Lee
*Director of the United States Patent and Trademark Office*